United States Patent
Yoshiura et al.

(10) Patent No.: US 8,803,466 B2
(45) Date of Patent: Aug. 12, 2014

(54) MOTOR CONTROL APPARATUS

(75) Inventors: Yasufumi Yoshiura, Kitakyushu (JP); Yasuhiko Kaku, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 124 days.

(21) Appl. No.: 13/571,352

(22) Filed: Aug. 10, 2012

(65) Prior Publication Data

US 2013/0057191 A1 Mar. 7, 2013

(30) Foreign Application Priority Data

Sep. 1, 2011 (JP) ................................. 2011-191142

(51) Int. Cl.
*G05B 19/29* (2006.01)

(52) U.S. Cl.
USPC ............................ 318/600; 318/610; 318/630

(58) Field of Classification Search
USPC ............ 318/600, 610, 560, 400.33, 490, 630, 318/432; 701/41
See application file for complete search history.

(56) References Cited

U.S. PATENT DOCUMENTS

| 7,345,443 B2 | 3/2008 | Yoshiura et al. | |
|---|---|---|---|
| 2007/0007072 A1* | 1/2007 | Ta et al. ...................... | 180/446 |
| 2007/0210731 A1 | 9/2007 | Yoshiura et al. | |

FOREIGN PATENT DOCUMENTS

| JP | 09-093972 | 4/1997 |
|---|---|---|
| JP | 2008-199759 | 8/2008 |
| WO | WO 2005/093939 | 10/2005 |

OTHER PUBLICATIONS

Japanese Office Action for corresponding JP Application No. 2011-191142, Feb. 12, 2013.
Japanese Office Action for corresponding JP Application No. 2013-059143, Feb. 25, 2014.

* cited by examiner

*Primary Examiner* — Karen Masih
(74) *Attorney, Agent, or Firm* — Mori & Ward, LLP

(57) ABSTRACT

A motor control apparatus includes a position detector to detect a position of a motor. A speed operator calculates a first speed of the motor. A position controller outputs a first speed command. A speed controller acquires a difference between the first speed command and a second speed of the motor to output a first torque/thrust command. A phase compensator includes a lowpass filter to advance a phase of the second speed, and acquires the first speed and the first torque/thrust command to output the second speed. An inertia variation inhibitor includes a disturbance observer estimating a disturbance torque/thrust. The inertia variation inhibitor acquires the first speed and a second torque/thrust command, and adds the disturbance torque/thrust to the first torque/thrust command to output the second torque/thrust command. A torque/thrust controller acquires the second torque/thrust command to control a motor torque/thrust.

20 Claims, 53 Drawing Sheets

Concept of feedback control of disturbance rejection control (comparative example)

First disturbance observer applied to two-inertia model (enlarged view around reference coordinates)

First disturbance observer applied to three-inertia model (enlarged view around reference coordinates)

Comparative example applying conventional disturbance observer to three-inertia model (enlarged view around reference coordinates) (instability observed with vibration)

Two-inertia model

Comparative example

Two-inertia model

Embodiment
(first disturbance observer + first phase compensator)

Three-inertia model

Embodiment
(first disturbance observer + first phase compensator)

Four-inertia model

Comparative example

Four-inertia model

Embodiment
(first disturbance observer + first phase compensator)

Rigid body load (0 times)

Comparative example

Rigid body load (0 times)

Embodiment
(first disturbance observer + first phase compensator)

Comparative example

Rigid body load (30 times)

Embodiment
(first disturbance observer + first phase compensator)

Rigid body load (30 times)

Standard P-PI control

Embodiment
(first disturbance observer + first phase compensator)

Two-inertia model

First modification
(first disturbance observer + first phase compensator
+ second phase compensator)

Three-inertia model

First modification
(first disturbance observer + first phase compensator
+ second phase compensator)

Four-inertia model

First modification
(first disturbance observer + first phase compensator
+ second phase compensator)

Comparative example

Moment-of-inertia ratio: approximately 2 times

First modification
(first disturbance observer + first phase compensator + second phase compensator)

Comparative example

Moment-of-inertia ratio: approximately 3.5 times

First modification
(first disturbance observer + first phase compensator + second phase compensator)

Comparative example

First modification
(first disturbance observer + first phase compensator + second phase compensator)

Two-inertia model

Second modification
(second disturbance observer + first phase compensator
+ second phase compensator)

Three-inertia model

Second modification
(second disturbance observer + first phase compensator
+ second phase compensator)

Second modification
(second disturbance observer + first phase compensator
+ second phase compensator)

Rigid body load (0 times)

First modification
(first disturbance observer + first phase compensator
+ second phase compensator)

Second modification
(second disturbance observer + first phase compensator
+ second phase compensator)

First modification
(first disturbance observer + first phase compensator
+ second phase compensator)

Rigid body load (30 times)

Second modification
(second disturbance observer + first phase compensator
+ second phase compensator)

First modification
(first disturbance observer + first phase compensator
+ second phase compensator)

Second modification
(second disturbance observer + first phase compensator
+ second phase compensator)

MOTOR CONTROL APPARATUS

CROSS-REFERENCE TO RELATED APPLICATIONS

The present application claims priority under 35 U.S.C. §119 to Japanese Patent Application No. 2011-191142, filed Sep. 1, 2011. The contents of this application are incorporated herein by reference in their entirety.

BACKGROUND OF THE INVENTION

1. Field of the Invention

The present invention relates to a motor control apparatus.

2. Discussion of the Background

Control apparatuses for alternating-current (AC) motors, specifically, servo controllers for AC motors, generally have a triple-loop configuration. Specifically, a feedback loop of a position control system and a feedback loop of a speed control system constitute a double-loop configuration, combined with a current feedback loop including power conversion by pulse width modulation (PWM) and d-q coordinate system conversion, resulting in a triple-loop configuration. In a current control system, in view of a torque of the motor developing in proportion to current, a torque command is input from the speed control system.

As disclosed in WO2005/093939, the disturbance rejection control system includes an inertia variation inhibitor to estimate a disturbance torque based on a first torque command and an actual detection speed of the motor. The inertia variation inhibitor then adds the disturbance torque to the first torque command and inputs the sum to the current control system as a second torque command. Attempts have been made to improve robustness against a greater moment-of-inertia ratio. Specifically, WO2005/093939 discloses a first phase compensator and a second phase compensator. The first phase compensator creates a new speed command having a phase advanced by introducing an initial speed command, and then outputs the new speed command. The second phase compensator creates a new speed command having a phase advanced by introducing a detection speed of the motor and a torque command, and then outputs the new speed command as an error target command.

SUMMARY OF THE INVENTION

According to one aspect of the present invention, a motor control apparatus includes a position detector, a speed operator, a position controller, a speed controller, a first phase compensator, an inertia variation inhibitor, and at least one of a torque controller and a thrust controller. The position detector is configured to detect a position of a motor configured to drive a drive mechanism. The speed operator is configured to acquire the position of the motor so as to calculate a first speed of the motor. The position controller is configured to acquire a difference between the position of the motor and a position command so as to generate and output a first speed command. The speed controller is configured to acquire a difference between the first speed command and a second speed of the motor so as to generate and output at least one of a first torque command and a first thrust command. The second speed of the motor includes a phase advanced relative to a phase of the first speed of the motor. The first phase compensator includes a first lowpass filter used to advance the phase of the second speed of the motor relative to the phase of the first speed of the motor. The first phase compensator is configured to acquire the first speed and the at least one of the first torque command and the first thrust command so as to output the second speed of the motor. The first lowpass filter includes a time constant calculated using a polynomial including a speed loop gain of the speed controller as an independent variable. The inertia variation inhibitor includes a disturbance observer including a resonance inhibition model configured to inhibit a mechanical resonance of the drive mechanism. The disturbance observer is configured to estimate at least one of a disturbance torque and a disturbance thrust. The inertia variation inhibitor is configured to acquire the first speed and at least one of a second torque command and a second thrust command, configured to add the disturbance torque to the first torque command so as to generate the second torque command or configured to add the disturbance thrust to the first thrust command so as to generate the second thrust command, and configured to output at least one of the second torque command and the second thrust command. The torque controller is configured to acquire the second torque command so as to control a torque of the motor. The thrust controller is configured to acquire the second thrust command so as to control a thrust of the motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
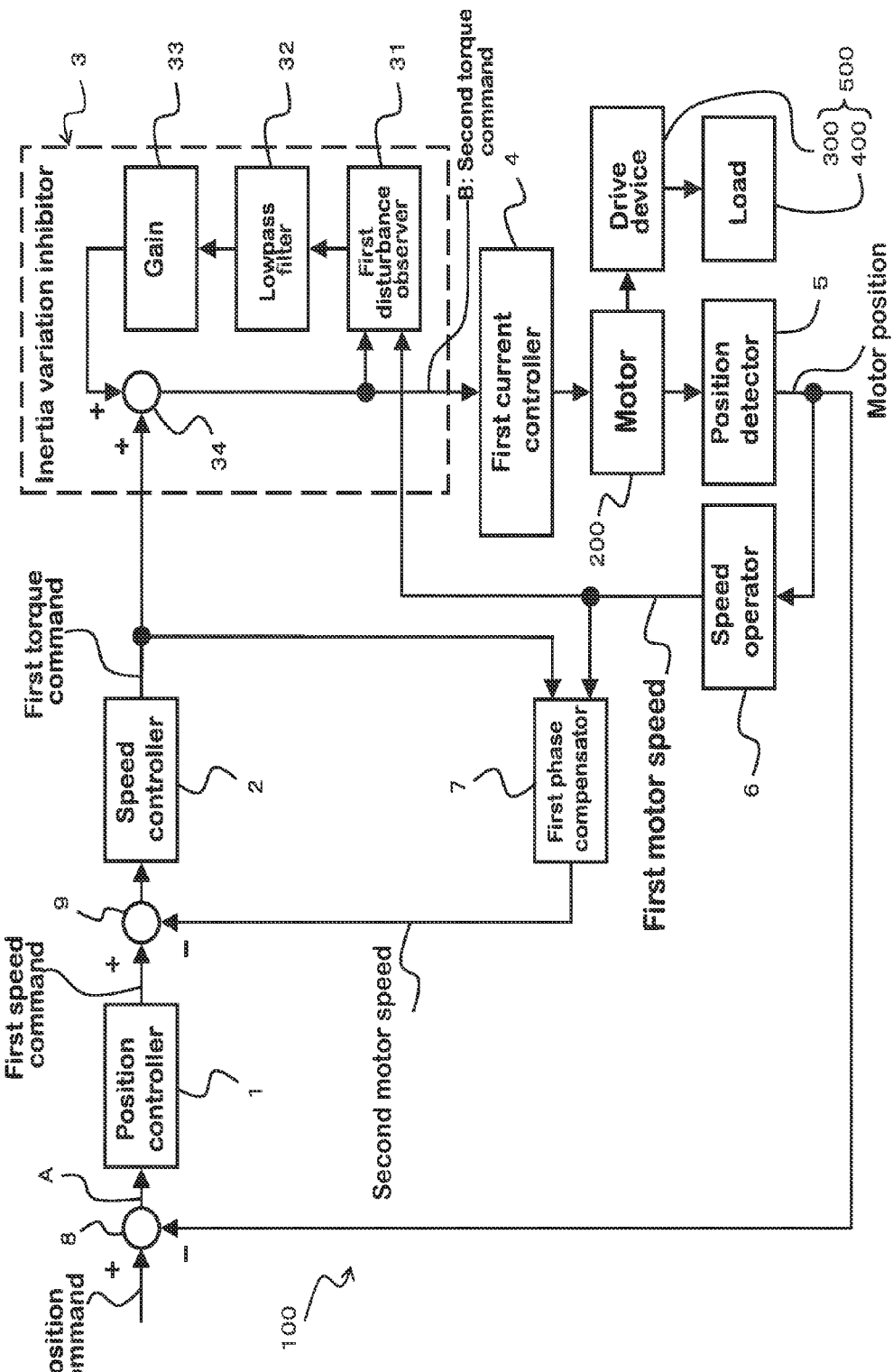
FIG. 1 is a block diagram illustrating an embodiment of the motor control apparatus in a transfer function form.

The embodiments will now be described with reference to the accompanying drawings, wherein like reference numerals designate corresponding or identical elements throughout the various drawings.

FIG. 1 shows a motor control apparatus according to this embodiment. The motor control apparatus controls a rotation position of a motor based on a position command input from a senior control apparatus, not shown (the rotation position being hereinafter referred to as motor position). The following illustrations and descriptions will be in a transfer function form. In this embodiment, the motor is a rotation motor.

Schematic Configuration of Electric Control Apparatus

As shown in FIG. 1, a motor control apparatus 100 according to this embodiment includes a position controller 1, a speed controller 2, an inertia variation inhibitor 3, a first current controller 4, a position detector 5, a speed operator 6, and a first phase compensator 7.

The position controller 1 acquires, from a subtractor 8, a position error between the position command and a motor position of a motor 200, which is detected by the position detector 5 as described later. Based on the position error, the position controller 1 outputs a speed command so as to reduce the position error.

The speed controller 2 acquires, from a subtractor 9, a speed error between the speed command from the position controller 1 and a second motor speed, which has a phase compensated by the first phase compensator 7 as described later. Based on the speed error, the speed controller 2 outputs a first torque command so as to reduce the speed error.

The inertia variation inhibitor 3 includes a first disturbance observer 31, a lowpass filter 32, a gain multiplier 33, and an adder 34. The first disturbance observer 31 calculates an estimate value of a disturbance torque based on a second torque command from the speed controller 2 and based on a rotation speed of the motor 200 output from the speed operator 6 as described later (the rotation speed being hereinafter referred to as first motor speed). The lowpass filter 32 removes high frequency noise from the output of the first disturbance observer 31. The gain multiplier 33 multiplies the output of the lowpass filter 32 by a predetermined gain and outputs a correction amount of an estimate disturbance torque. The adder 34 adds the correction amount of the estimate disturbance torque to the first torque command and outputs the sum as the second torque command.

Based on the second torque command from the inertia variation inhibitor 3, the first current controller 4 outputs, for example, a PWM-controlled drive current to the motor 200.

The motor 200 uses the drive current from the first current controller 4 to generate a torque with which to drive a load machine 400 through a drive device 300 including a gear. In this embodiment, the drive device 300 and the load machine 400, as driven by the motor 200, will be collectively referred to as a drive mechanism 500.

The position detector 5 is made up of, for example, a rotary encoder mechanically coupled to the rotor of the motor 200. The position detector 5 detects a motor position, which corresponds to a rotation position of the motor 200.

The speed operator 6 calculates a first motor speed of the motor 200 based on a change in the motor position of the motor 200 detected by the position detector 5. Specifically, the speed operator 6 may be a differentiator.

Based on the first motor speed of the motor 200 output from the speed operator 6 and based on the first torque command output from the speed controller 2, the first phase compensator 7 generates and outputs a new, second motor speed having a phase compensated to advance relative to the phase of the first motor speed.

The motor control apparatus 100 according to this embodiment thus configured has a triple-loop configuration including a feedback loop of a position control system, a feedback loop of a speed control system, and a feedback loop of a current control system. Specifically, once a position command is input from the senior control apparatus, not shown, a control signal and a detection signal are transmitted through the feedback loop of the position control system in the order: the position controller 1, the speed controller 2, the first current controller 4, the motor 200, and the position detector 5 (this loop being hereinafter referred to as position control system loop). Through the feedback loop of the speed control system, a control signal and a detection signal are transmitted in the order: the speed controller 2, the inertia variation inhibitor 3, the first current controller 4, the motor 200, the position detector 5, the speed operator 6, and the first phase compensator 7 (this loop being hereinafter referred to as speed control system loop).

In the loop of the speed control system, the inertia variation inhibitor 3 adjusts a torque command so as to reduce the influence of a disturbance added to the motor 200 through the drive mechanism 500. This ensures robustness in the response characteristic of the motor 200 even when the moment-of-inertia ratio of the drive mechanism 500 is unknown or changing.

First Disturbance Observer

Figure 2:
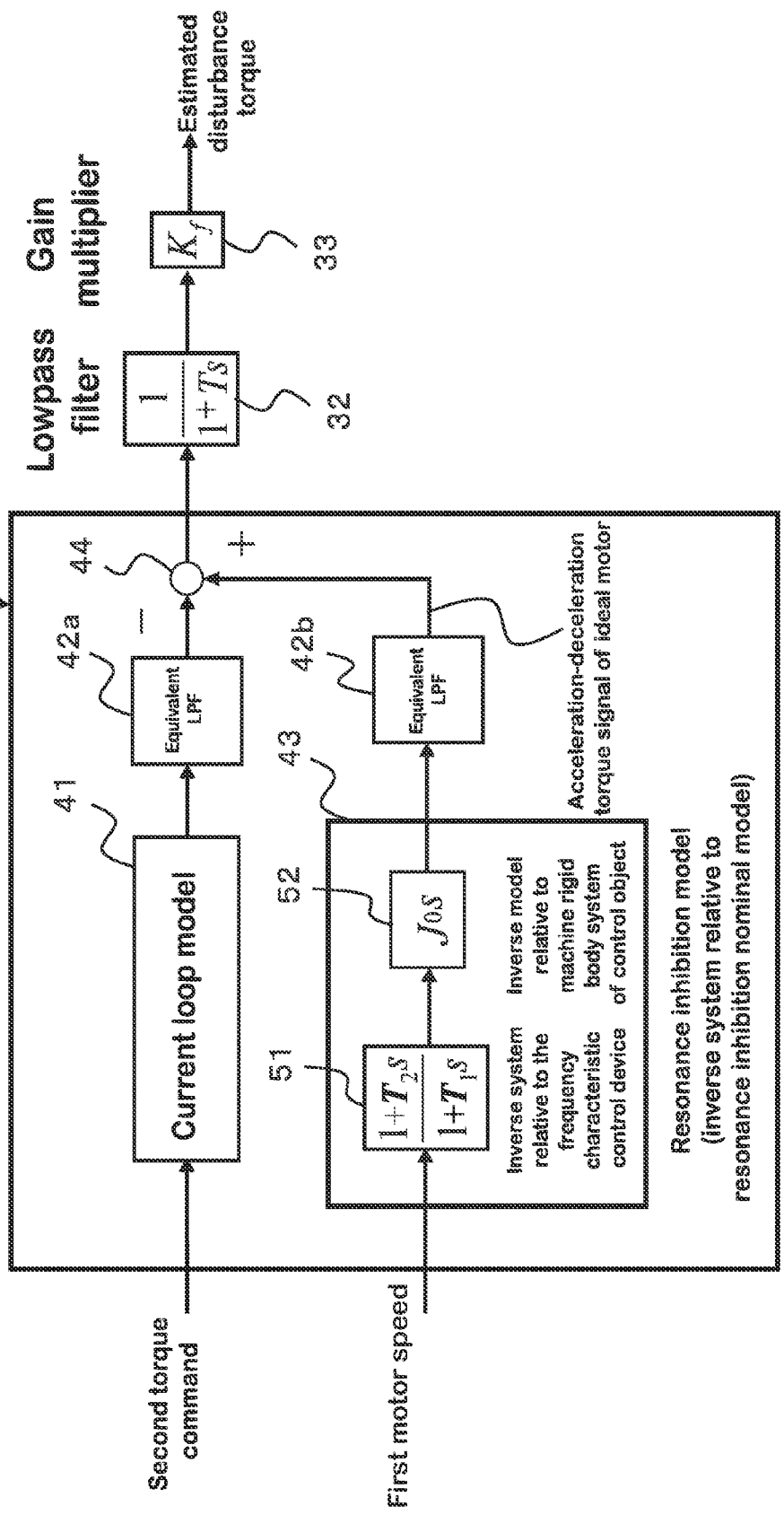
FIG. 2 is a detailed block diagram illustrating a first disturbance observer.

As shown in FIG. 2, the first disturbance observer 31 includes a current loop model 41, a resonance inhibition model 43, and equivalent lowpass filters 42a and 42b (each denoted "Equivalent LPF" in FIG. 2 for simplicity). In addition to the first disturbance observer 31, FIG. 2 shows the lowpass filter 32 to remove high frequency noise from the output of the first disturbance observer 31, and the gain multiplier 33 to multiply the output of the lowpass filter 32 by a predetermined gain and to output a correction amount of an estimate disturbance torque.

Figure 3:
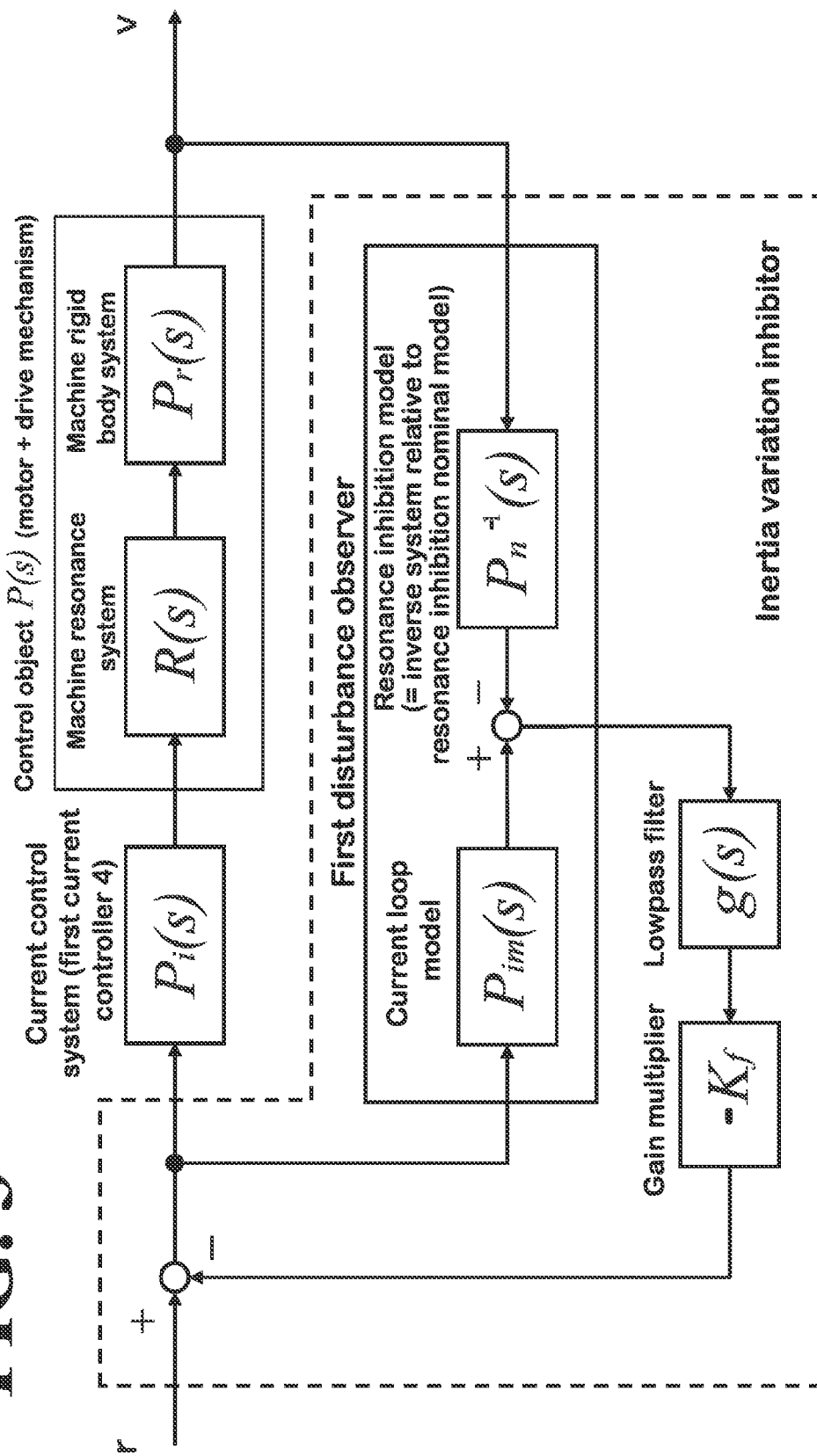
FIG. 3 is a diagram illustrating a disturbance rejection control system loop in a feedback control system model.

A positional relationship between the components of the first disturbance observer 31 will be described by referring to FIG. 3. FIG. 3 is a block diagram illustrating a feedback loop of a disturbance rejection control system, which includes the inertia variation inhibitor 3 (including the first disturbance observer 31 shown in FIG. 2), the first current controller 4, the motor 200, and the drive mechanism 500 (the drive device 300 and the load 400) shown in FIG. 1. A control object P(s) (corresponding to the motor 200 and the drive mechanism 500) is represented by the product of a mechanical resonance system R(s) and a mechanical rigid body system $P_r(s)$. The mechanical rigid body system $P_r(s)$ is $1/(J_m+J_L)s$, where $J_m$ denotes a motor inertia moment, $J_L$ denotes a load inertia moment, and $1/s$ denotes an integration element.

In this embodiment, the first disturbance observer 31 includes a current loop model $P_{im}(s)$, a resonance inhibition model $P_n^{-1}(s)$, and the equivalent lowpass filters 42a and 42b (each denoted "Equivalent LPF" in FIG. 2, and not shown in FIG. 3). The current loop model $P_{im}(s)$ is designed as a model equivalent to the first current controller 4 ($P_i(s)$) shown in FIG. 1. That is, $P_i(s)=P_{im}(s)$.

Generally, a disturbance observer design involves defining a nominal model (reference model), followed by determination of an inverse system relative to the nominal model. Thus, the resulting disturbance observer includes an inverse system relative to the nominal model. As used herein, the term inverse system refers to, for example, $G^{-1}(s)$ relative to system $G(s)$, where $G(s) \cdot G^{-1}(s) = 1$. The term nominal model (reference model) is defined as a model (a mathematical formula such as a transfer function) that idealizes the control object, which is the drive mechanism including the motor. It is important that the control object nominal model be as simple as possible. In view of this, this embodiment sets the mechanical rigid body system at $1/Js$, which corresponds to the rigid body part of the machine and to the motor.

As a specific control object nominal model, this embodiment employs a resonance inhibition nominal model $P_n(s)$. The resonance inhibition nominal model $P_n(s)$, not shown, of this embodiment is represented by the product of a frequency characteristic control device $(1+T_1s)/(1+T_2s)$ and a mechanical rigid body system model $1/J_0s$, which is the control object (the resonance inhibition nominal model being detailed later). The mechanical rigid body system model $1/J_0s$ of the control object may not necessarily match the mechanical rigid body system of the control object. In the mechanical rigid body system model $1/J_0s$ of the control object, its inertia moment $J_0$ may be set at, for example, an inertia moment $J_m$ of the motor alone (that is, it is possible that $J_0=J_m$).

The first disturbance observer 31 of this embodiment has a resonance model $P_n^{-1}(s)$. The resonance model $P_n^{-1}(s)$ is an inverse system relative to the resonance inhibition nominal model $P_n(s)$, and is an integration of an inverse system $(1+T_2s)/(1+T_1s)$ relative to the frequency characteristic control device and an inverse system $J_0s$ relative to the mechanical rigid body system model of the control object.

The feedback control system (disturbance rejection control system loop) shown in FIG. 3 has a loop transfer function $G_{Loop}$ represented by Equation (1). With the disturbance rejection control system assumed a closed loop, the entire closed loop from a torque command r to a motor speed v has a closed loop transfer function $G_{Close}$ represented by Equation (2).

$$G_{Loop}(s) = -K_f g(s) \left( P_{im}(s) - P_i(s)R(s) \frac{1}{(J_m+J_L)s} \frac{1+T_2s}{1+T_1s} J_m s \right) \quad (1)$$

$$= -K_f g(s) P_i(s) \left( 1 - R(s) \frac{J_m}{J_m+J_L} \frac{1+T_2s}{1+T_1s} \right)$$

$$G_{Close}(s) = \frac{P_i(s)R(s) \frac{1}{(J_m+J_L)s}}{1 - K_f g(s) P_i(s) \left( 1 - R(s) \frac{J_m}{J_L+J_m} \frac{1+T_2s}{1+T_1s} \right)} \quad (2)$$

In the disturbance rejection control system loop of this embodiment, setting the closed loop transfer function $G_{Close}$ in Equation (2) at appropriate values ensures inhibition control, in a wide frequency band, of mechanical resonance elements that can take various multi-inertia models. To describe a characteristic of the disturbance rejection control system in a low-frequency band, substitute 0 for s in Equation (2) (where $K_f$=1). In this case, $G_{LOOP}(s)$ results in $1/J_m s$, where the influence of the load inertia moment $J_L$ is removed. This ensures control to obtain a characteristic of the motor alone. (In a low-frequency band, g(0)=1, $P_t(0)$=1, and R(0)=1.) A characteristic of the disturbance rejection control system in a high-frequency band will be described later.

A general configuration of a disturbance observer will be described. A disturbance observer is designed as a state observer incorporating a disturbance model. An observer assuming that the disturbance is constant over time is referred to as a zero-order disturbance observer. For the order of the observer to be minimal, a minimal-order state observer is used. A disturbance observer in the form of a state equation can be represented by an inverse system relative to the nominal model and the lowpass filter of the observer (the lowpass filter being hereinafter referred to as equivalent lowpass filter). In a zero-order disturbance observer, the equivalent lowpass filter is a first-order lowpass filter, and its band is the frequency band of the disturbance observer.

The equivalent lowpass filter is a component of the disturbance observer, and this makes the structure of the filter determined accordingly. For example, in a first-order disturbance observer, the equivalent lowpass filter is a lowpass filter of second-order in the denominator and first-order in the numerator. Additionally, the equivalent lowpass filter has its parameters determined by the design of the disturbance observer, instead of being determined arbitrarily. In disturbance rejection control using an Nth-order disturbance observer, a higher order means higher disturbance rejection performance. However, extending the band of the disturbance observer, in an attempt to improve the disturbance rejection performance, may decrease the control stability of the disturbance rejection control system. This is because of the influence of dynamic characteristics of the first current controller (mainly because of a lowpass characteristic and a control time delay). The decreased control stability can cause a peak of frequency characteristic to appear in the high-frequency band. This can cause high-frequency noise from the motor. Additionally, the drive part of the machine driven by the motor has mechanical resonance characteristics. Due to the mechanical resonance characteristics, the dynamic characteristics of the first current controller may have a mechanical resonance influence on the disturbance rejection control system. This is addressed by the first disturbance observer 31 according to this embodiment, which includes the current loop model 41, the resonance inhibition model 43, and the equivalent lowpass filters 42a and 42b.

In the design of a disturbance observer used in disturbance rejection control, a torque command and a motor speed are used as input signals. In practice, a current controller exists between the torque command and the motor speed. In current control, the cut-off frequency is sufficiently high relative to the cut-off frequency in the speed control system. In view of this, the transfer function of the current controller may be set at "1" in the design of the disturbance observer. (The disturbance observer is required to be as low as possible in order, for software installment reasons.) When, however, the speed loop has a cut-off frequency of some tens of hertz and when the load inertia moment is approximately 30 times the motor inertia moment, the compensation of the operation of the drive mechanism requires the disturbance rejection control system to have high response characteristics. This, in turn, requires accurate estimation of the operation of the drive mechanism up to the high-frequency band. This, in turn, requires adding a model of the current controller to the control object, which has been disregarded in the design of the disturbance observer.

The current loop model 41 eliminates or minimizes an increase in gain of mechanical resonance due to the influence of the loop of the current control system. Specifically, upon input of a second torque command as shown in FIG. 2, the current loop model 41 outputs the torque signal generated by the motor taking into consideration an approximate delay of the loop of the current control system.

The resonance inhibition model 43 includes an inverse system 51 relative to the frequency characteristic control device, and a control object inverse model 52. The inverse system 51 relative to the frequency characteristic control device controls the frequency characteristic of the first motor speed of the motor 200. The control object inverse model 52 multiplies the output (which is the acceleration of the load driven by the motor) of the inverse system 51 relative to the frequency characteristic control device by the inertia moment $J_0$ of the rotor of the motor 200 and further by the operator s (which is equivalent to a differentiation). The resonance inhibition model 43 obtains an acceleration-deceleration torque signal of an ideal motor. (Specifically, the acceleration-deceleration torque signal is a torque component used in the acceleration/deceleration of an ideal motor estimated in the nominal model.)

The first disturbance observer 31, as a whole, obtains an acceleration-deceleration torque signal of an ideal motor at the resonance inhibition model 43 based on the first motor speed of the motor 200. Then, the first disturbance observer 31 passes the acceleration-deceleration torque signal through the equivalent lowpass filter 42b, and at a subtractor 44, subtracts this acceleration-deceleration torque signal from a torque command that is past the current loop model 41 and the equivalent lowpass filter 42a. Thus, the first disturbance observer 31 estimates a disturbance torque. The estimate disturbance torque is adjusted as necessary at the lowpass filter 32 and the gain multiplier 33. The lowpass filter 32 sets a time constant T and removes high frequency noise. The gain multiplier 33 has a predetermined gain. Then, the estimate disturbance torque is output. The equivalent lowpass filters 42a and 42b determine the frequency band of the first disturbance observer 31.

As described above, the resonance inhibition model 43 includes the inverse system 51 relative to the frequency characteristic control device, a multiplier to multiply the inertia moment $J_0$, and a differentiator represented an operator s. The differentiator including the operator s is a lead element, which cannot be directly installed on a digital circuit and software. In this case, combining the resonance inhibition model 43 with the equivalent lowpass filters 42a and 42b ensures that the denominator and numerator of the operator s are on the same order. Examples of the equivalent lowpass filters 42a and 42b include, but not limited to, second-order filters. The inverse system 51 relative to the frequency characteristic control device will be detailed later.

First Phase Compensator

Figure 4:
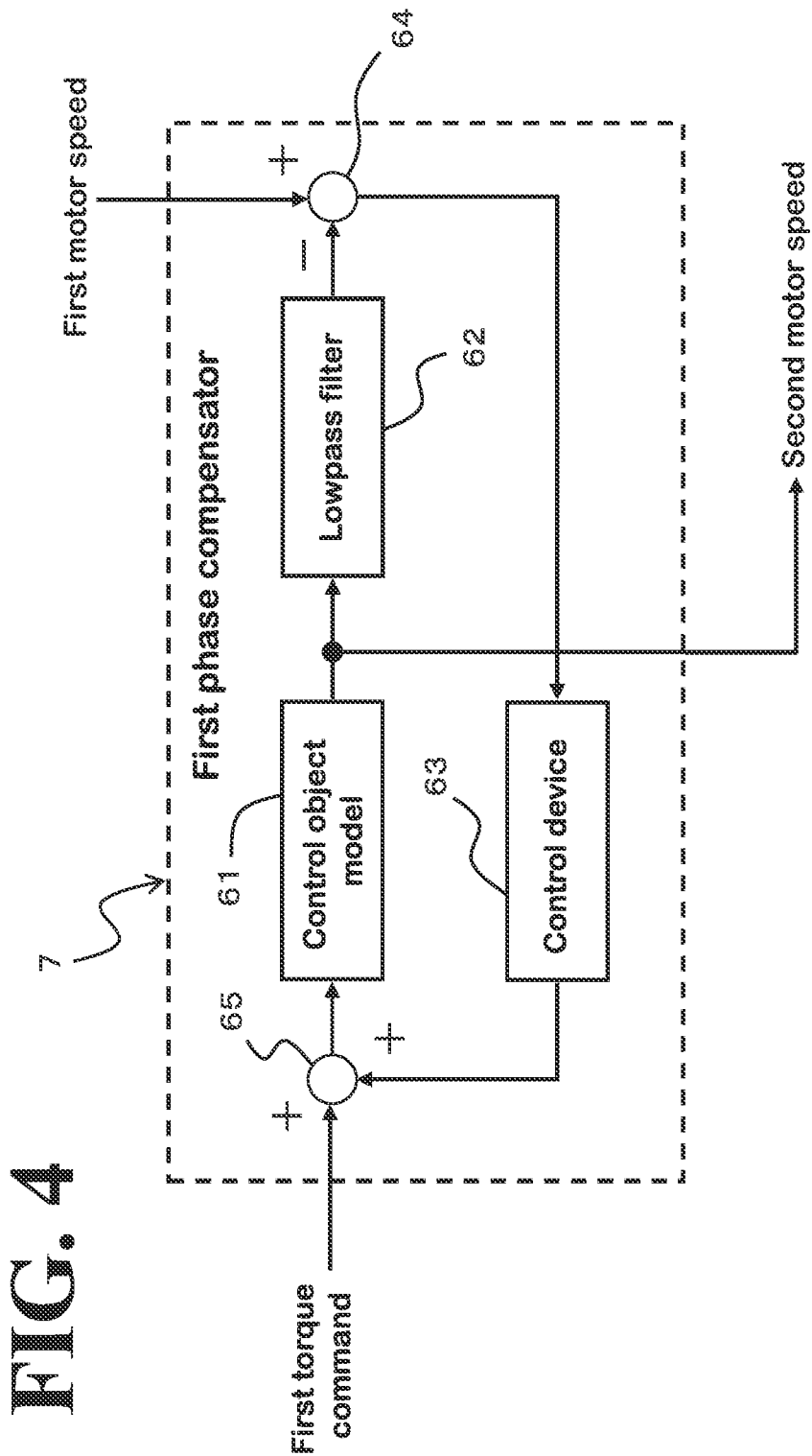
FIG. 4 is a detailed block diagram illustrating a first phase compensator.

As shown in FIG. 4, the first phase compensator 7 includes a control object model 61, a lowpass filter 62, and a control device 63. The first phase compensator 7 inputs the first torque command into the control object model 61 and passes its output through the lowpass filter 62 so as to generate a phase compensate signal. Then at a subtractor 64, the first phase compensator 7 subtracts the phase compensate signal from the first motor speed of the motor 200 so as to obtain an error. The first phase compensator 7 then passes the error through the control device 63, which feeds the error back to an adder 65 in which the first torque command is input. The first phase compensator 7 makes the signal output from the control object model 61 a new speed feedback signal, and outputs the new speed feedback signal as a second motor speed. The lowpass filter 62 corresponds to the first lowpass filter recited in the appended claims.

As shown FIG. 1, an error between the speed command output from the position controller 1 and the second motor speed output from the first phase compensator 7 is input into the speed controller 2. This defines the loop of the speed control system according to this embodiment. The first phase compensator 7, as well as estimating the motor speed of the motor 200, works as a phase compensation speed observer to advance the phase of its output. Hence, advancing the phase of the output in the loop of the speed control system by the first phase compensator 7 ensures an improved phase margin in the loop of the position control system. This ensures stabilize responses and an expanded inertia change range.

However, when the speed loop gain (not shown) in the speed controller 2 increases, a shift may occur to the phase that is to be compensated by the first phase compensator 7, causing vibration to occur. This necessitates re-adjustment of the phase to be compensated by the first phase compensator 7 in accordance with the speed loop gain in the speed controller 2.

For example, in this embodiment, which compensates the phase at the speed observer shown in FIG. 4, the degree of phase compensation may be set by adjusting the time constant of the lowpass filter 62 of the speed observer. Specifically, it is possible to conduct a simulation or an actual machine test so as to plot optimal values of the time constant of the lowpass filter 62 sequentially on a graph against changes in the speed loop gain in the speed controller 2 (the plotted values are not shown). Then, an approximation may be obtained interpolating the plotted measurement data.

For example, in this embodiment, which employs the disturbance observer as shown in FIG. 2, the speed observer has a lowpass filter time constant $T_{LPF}$. $T_{LPF}$ may be approximated by the linear function: $T_{LPF}=a \times K_v + b$, where $K_v$ denotes the speed loop gain. It is also possible to use a time constant that can be approximated by a quadratic function such as $T_{LPF}=a \times K_v^2 + b \times K_v + c$. These polynomials of approximation use the speed loop gain $K_v$ as an independent variable. This ensures that for example, when the speed loop gain $K_v$ in the speed controller 2 changes, the above-described functions appropriately change the time constant $T_{LPF}$ of the lowpass filter 62 of the first phase compensator 7, which works as a speed observer. This, in turn, ensures automatic re-adjustment of the compensation value of the phase.

A feature of this embodiment to be noted is as follows. A resonance inhibition nominal model is set with respect to the drive mechanism 500 driven by the motor 200. The inverse system 51 relative to the frequency characteristic control device is disposed in the resonance inhibition model 43 (which corresponds to an inverse system relative to the resonance inhibition nominal model) of the first disturbance observer 31. The inverse system 51 controls the frequency characteristic of the resonance inhibition nominal model so as to eliminate or minimize vibration caused by mechanical resonance of the motor 200 and the drive mechanism 500.

Figure 5:
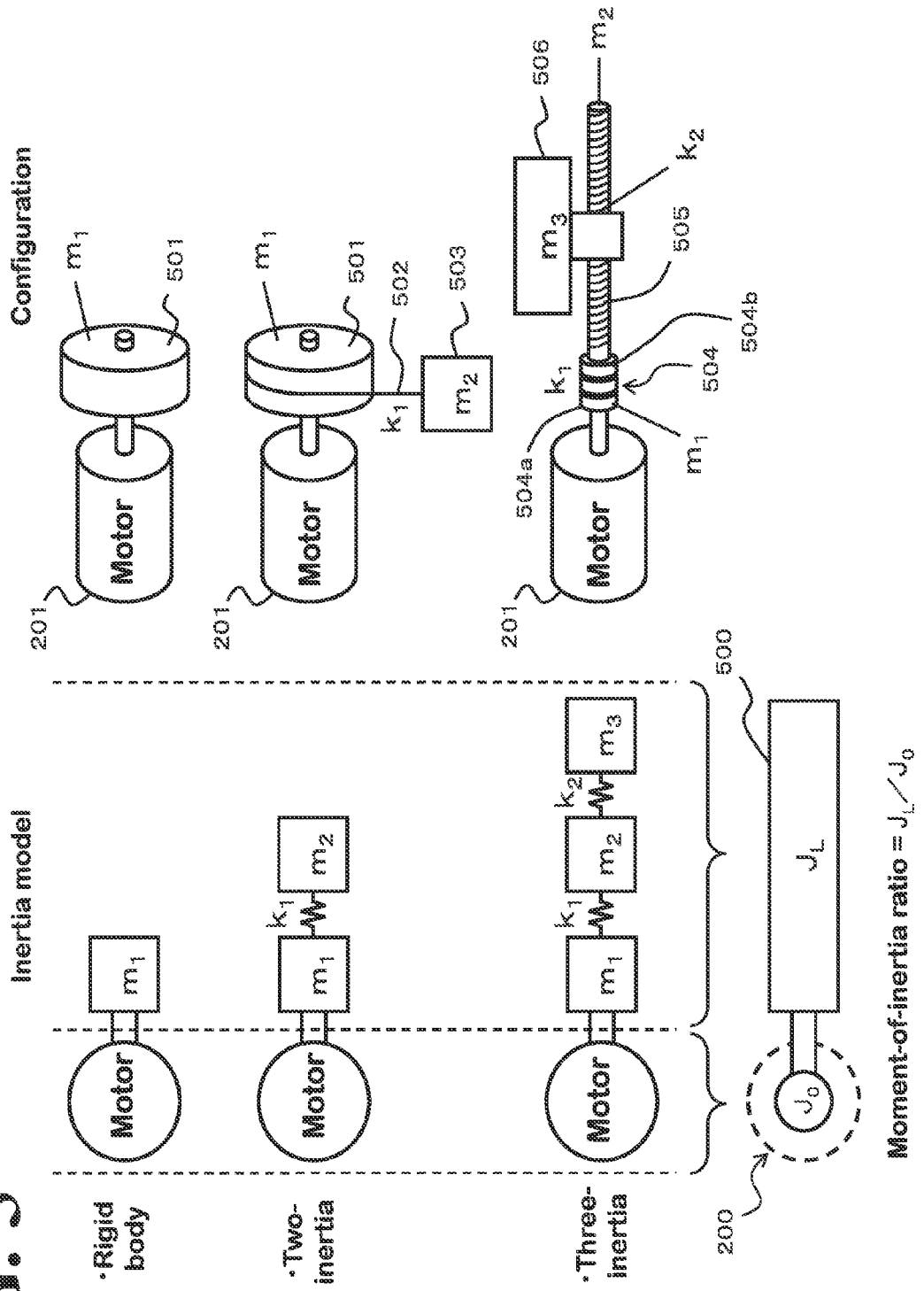
FIG. 5 is a diagram illustrating inertia models including a rigid body model, a two-inertia model, and a three-inertia model, and illustrating exemplary detailed configurations of the respective models.

Referring to FIG. 5, description will be first made with regard to a multi-inertia model that expresses characteristics of the mechanical resonance of the drive mechanism 500.

Multi-Inertia Model and its Frequency Characteristic

As used in this embodiment, the multi-inertia model is among abstract models classified according to the number of inertia elements disposed in the drive mechanism 500 and according to how the inertia elements are coupled together by elasticity elements disposed between the inertia elements. Various inertia models exist depending on the configuration of the drive mechanism 500. For example, FIG. 5 shows motors 201 of rotation motors. A motor 201 has its output shaft coupled to a rigid rotation plate 501 of $m_1$ mass alone as the drive mechanism 500. In this case, the inertia model of the drive mechanism 500 is a rigid body model. In this rigid body model, the drive mechanism 500 includes a single inertia element and no elasticity elements.

For example, a strap 502 is wound around the outer circumference of the rigid rotation plate 501 so as to hang an anchor 503 of $m_2$ mass. In this case, the inertia model of the drive mechanism 500 is a two-inertia model. Specifically, the rigid rotation plate 501 ($m_1$) and the anchor 503 ($m_2$) are inertia elements, which are coupled together by the strap 502 ($k_1$) as an elasticity element, resulting in a two-inertia model.

For example, a ball screw 505 is coupled to the output shaft of the rotation motor 201 through a coupling 504 so as to bring a feed table 506 into linear motion. In this case, the inertia model of the drive mechanism 500 is a three-inertia model. Specifically, the inertia elements are the ball screw 505 ($m_2$) including an element 504a ($m_1$) on the input side of the coupling and an element 504b on the output side of the coupling, and the feed table 506 ($m_3$). The elasticity elements are a coupling portion ($k_1$) between the coupling 504, and a rolling mechanism ($k_2$) between the ball screw 50 and the feed table 506. Thus, a three-inertia model is formed.

This embodiment deals with such models that the inertia elements and the elasticity elements are alternately disposed in series as described above. The term "n-inertia model" will refer to a model with n inertia elements. Also as used in this embodiment, the term moment-of-inertia ratio refers to a ratio, $J_L/J_0$, of an inertia moment $J_L$ of the entire drive mechanism 500 to the inertia moment $J_0$ of the rotor including the output shaft of the motor 200, as shown in FIG. 5. The inertia model and the moment-of-inertia ratio of the drive mechanism 500 may change depending on the configuration and application of the drive mechanism 500. Possible examples include when an object to be carried on the feed table of the three-inertia model shown in FIG. 5 has an inertia element and an elasticity element.

Figure 6:
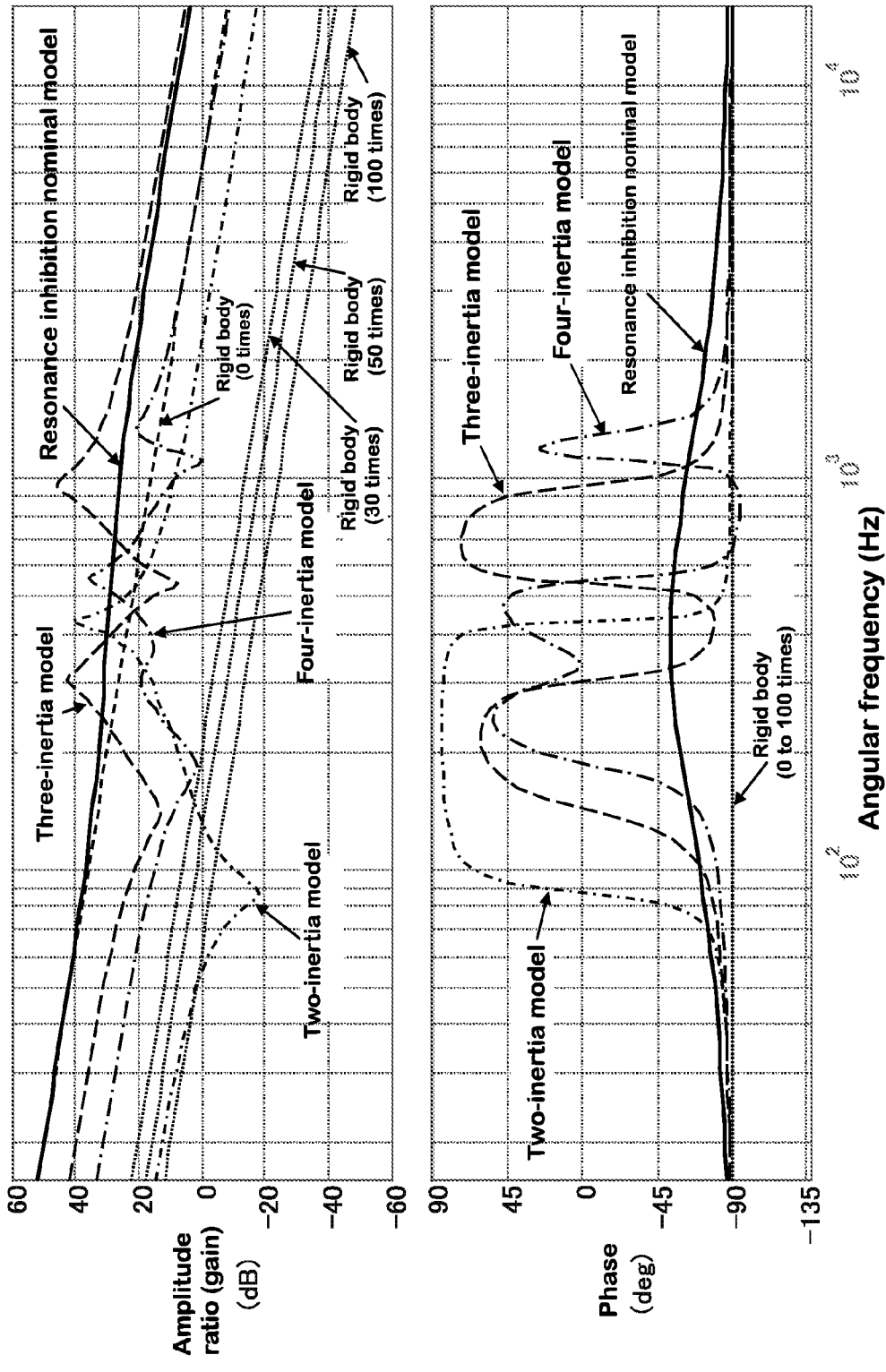
FIG. 6 is an exemplary graph of frequency characteristic illustrating a resonance inhibition nominal model of the first disturbance observer in relation to a mechanical resonance of a drive mechanism.

In the gain characteristic of the Bode diagram shown in FIG. 6, an n-inertia model forms a characteristic curve with (n−1) apex points and (n−1) bottom points. The apex points are resonance points, while the bottom points are anti-resonance points. A rigid body model forms a characteristic curve without apex points (resonance points) and bottom points (anti-resonance points), drawing a smoothly decreasing gain. A higher moment-of-inertia ratio means a lower gain characteristic (that is, on the decrease in the graph).

In the phase characteristic of the Bode diagram, an n-inertia model forms a characteristic curve with "n−1" phase advance regions. Specifically, the phase characteristic advances in the frequency band between the anti-resonance point and the next resonance point in the gain characteristic. The rigid body models of any moment-of-inertia ratios maintain a phase of minus 90 degrees in any frequency band.

In both the gain characteristic and the phase characteristic, the same n-inertia models may form different characteristic curves depending on the settings of the mass of the inertia elements and the elasticity coefficient of the elasticity elements. Still, the above-described curve characteristics remain unchanged.

As shown in FIG. 6, the resonance inhibition nominal model according to this embodiment is close to the characteristic of the rigid body model of a moment-of-inertia ratio of 0 (that is, close to a state without elasticity elements), among the characteristics of the inertia models shown in FIG. 6. Specifically, over the mid- to high-frequency band of the gain characteristic, the resonance inhibition nominal model is slightly higher than the characteristic of the rigid body model of a moment-of-inertia ratio of 0. In the phase characteristic, the resonance inhibition nominal model is set to form a characteristic curve with a phase slightly advanced in the center frequency band.

In this embodiment, a resonance inhibition nominal model having this characteristic is set conveniently. The first disturbance observer includes the resonance inhibition model 43, which is an inverse system relative to the set resonance inhibition nominal model. This eliminates or minimizes vibration caused by mechanical resonance of the drive mechanism 500. A principle of the mechanical resonance inhibition will be described below.

Principle of Mechanical Resonance Inhibition of this Embodiment

As described above, in the design of a conventional disturbance observer, a rigid body model is assumed as the nominal model. As in this design, employing a rigid body model as the nominal model minimizes the order of the operator s in the disturbance observer, facilitating its installation. An actual drive mechanism 500, however, oftentimes involves two-or-greater-inertia model, and therefore, the nominal model designed in the form of a rigid body model can easily vibrate due to the mechanical resonance characteristic of the actual drive mechanism 500. This can be addressed by adding a notch filter or a lowpass filter in the loop of the disturbance rejection control system including the inertia variation inhibitor 3. This diminishes the mechanical resonance characteristic and stabilizes the disturbance rejection control system. The notch filter, however, can cause a phase delay or the lowpass filter can cause gain decrease. This can decrease the disturbance rejection performance, which in turn decreases robustness in relation to changes in the moment-of-inertia ratio.

Figure 7:
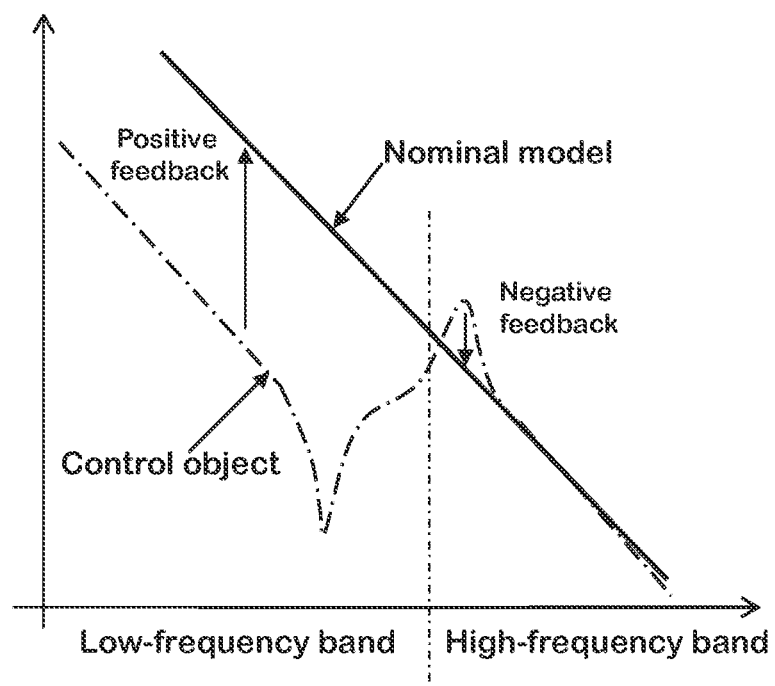
FIG. 7 is a conceptual diagram of feedback control of disturbance rejection control according to a comparative example.

In view of this, this embodiment is concerned with eliminating or minimizing, without a notch filter or a lowpass filter, the influence of mechanical resonance encountered in actual situations. To this end, we went back to basics and conducted a detailed theoretical analysis to determine why a mechanical resonance characteristic causes the disturbance rejection control system to vibrate. Specifically, we conducted analytical calculations and calculator simulations on the control systems. As a result, new findings were obtained as shown in FIG. 7.

Finding 1

The disturbance rejection control is a method of controlling the control object to match its characteristic with the nominal model. In this embodiment, a control parameter is set to make the gain characteristic (dashed line) of the control object lower than the nominal model (solid line), as in the low-frequency band shown in FIG. 7. In this case, the disturbance rejection control uses positive feedback to increase the gain. Stability is ensured in the positive feedback since the loop transfer characteristic $G_{Loop}$ shown in Equation (1) is set at less than 1. Thus, setting the loop transfer function $G_{Loop}$ shown in Equation (1) at less than 1 ensures continual stability against complicated changes in the gain characteristic and the phase characteristic of the control object in a region lower than the nominal model.

Finding 2

As in the high-frequency band shown in FIG. 7, the apex point of the mechanical resonance is above the nominal model. In this case, the disturbance rejection control uses negative feedback to lower the gain characteristic. On the part of the curve of the mechanical resonance above the nominal model, the loop transfer characteristic $G_{Loop}$ shown in Equation (1) is equal to or more than 1. In the high-frequency band, the phase inherently delays in the control systems and, at the same time, widely changes due to the mechanical resonance characteristic. The control systems can go unstable at some frequency at which the loop transfer characteristic $G_{Loop}$ shown in Equation (1) is equal to or more than 1, resulting in a vibration. This is a cause of vibration of the disturbance rejection control system due to the mechanical resonance characteristic of the control object.

Figure 8:
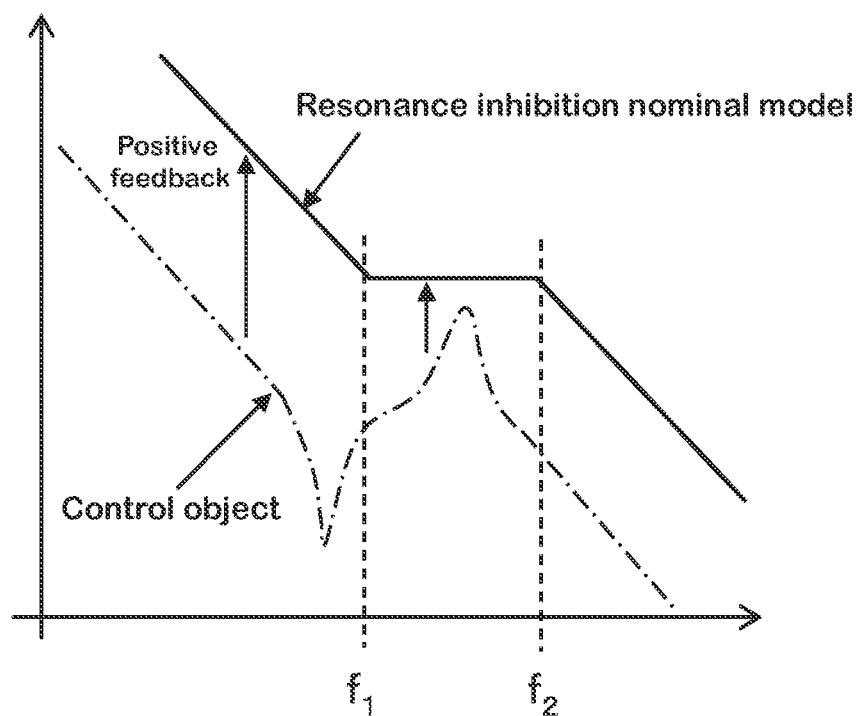
FIG. 8 is a conceptual diagram of feedback control of disturbance rejection control with an ideal modification of the resonance inhibition nominal model.

It can be seen that for stable operation of the disturbance rejection control system against a control object containing a mechanical resonance characteristic, the conditions specified in Finding 1 may be satisfied with respect to any frequency band. This is a novel concept distinguished from the conventional practice to merely use a filter for band restriction. This embodiment puts this concept into practice using a resonance inhibition nominal model as shown in FIG. 8, which is a modification of the nominal model. Specifically, the resonance inhibition nominal model has different inclinations from the nominal model at frequencies $f_1$ and $f_2$. This makes the gain of the mechanical resonance characteristic lower than the resonance inhibition nominal model. Appropriate frequencies $f_1$ and $f_2$ are selected to sandwich the apex point of the mechanical resonance characteristic. This ensures continual stability of the control systems against changes in the mechanical resonance characteristic. Additionally, this method only involves deformation of the nominal model, which eliminates or minimizes unnecessary delay in the control systems and maintains the robustness of the disturbance rejection control system. For the resonance inhibition nominal model according to this embodiment to have the above-described gain characteristic, the resonance inhibition nominal model may include the frequency characteristic control device $(1+T_1 s)/(1+T_2 s)$ and the mechanical rigid body system model $1/J_0 s$ of the control object. The inertia moment $J_0$ may be set at, for example, $J_m$ of the motor alone (that is, $J_0 = J_m$).

The resonance inhibition model is configured as an integration of an inverse system $(1+T_2 s)/(1+T_1 s)$ relative to the frequency characteristic control device and an inverse system $J_0 s$ that is relative to the mechanical rigid body system model of the control object and that is relative to the mechanical rigid body system.

This, however, is limited to ideal situations that can be dealt with only by changing the gain characteristic of the resonance inhibition nominal model. With actual control objects, no matter how the resonance inhibition nominal model is designed, the apex points of some mechanical resonance characteristics exceed above the resonance inhibition nominal model in narrow bands as shown in the gain characteristic diagram of FIG. 6.

As described above, the conditions under which a mechanical resonance can occur include when both the gain characteristic and the phase characteristic have low margins at the same time. This is, specifically, when the loop transfer characteristic $G_{Loop}$ shown in Equation (1) of the disturbance rejection control system loop including the inertia variation inhibitor 3 has a phase reaching minus 180 degrees, and when the gain is as high as in excess of 1, causing a vibration to occur. It is therefore difficult to design the resonance inhibition nominal model so that either the gain characteristic or the phase characteristic has a complete margin with respect to any frequency band. Still, such a design is possible that both the gain characteristic and the phase characteristic have margins approximately at the same time. Specifically, even when one of the gain characteristic and the phase characteristic may have a low margin locally in some frequency band, the other characteristic can secure a sufficient margin in the frequency band.

Exemplary Design of the Resonance Inhibition Nominal Model and its Stability

The resonance inhibition model 43 according to this embodiment includes the inverse system 51 relative to the frequency characteristic control device. The inverse system 51 controls the loop transfer characteristic $G_{Loop}$ shown in Equation (1) of the disturbance rejection control system loop to have a phase of minus 180 degrees and a gain of less than 1 in the low-frequency band. In a frequency domain of the high-frequency band providing a gain of equal to or greater than 1, the inverse system 51 controls the loop transfer characteristic $G_{Loop}$ to have a phase other than minus 180 degrees (that is, at a phase higher or lower than minus 180 degrees). An example of the inverse system 51 relative to the frequency characteristic control device according to this embodiment is represented by the transfer function $(1+T_2s)/(1+T_1s)$, as shown in FIG. 2. The two time constants $T_1$ and $T_2$ may be set conveniently taking into consideration any drive mechanisms 500 as possible control objects.

In the case of FIG. 8, the inverse system 51, $(1+T_2s)/(1+T_1s)$, relative to the frequency characteristic control device has the two time constants $T_1$ and $T_2$ respectively set at $1/2\pi f_1$ and $1/2\pi f_2$. Setting the spacing between $f_1$ and $f_2$ wide accommodates to changes in the mechanical resonance frequency to some degree, and also accommodates to control objects of various multi-inertia models. Thus, the time constants $T_1$ and $T_2$ of the inverse system 51 relative to the frequency characteristic control device are based on a nominal model of a rigid body. The time constants $T_1$ and $T_2$ are respectively determined by a plurality of frequency set values $f_1$ and $f_2$ used to change the change rate of gain of the frequency characteristic of the nominal model. When the gain characteristic of the resonance inhibition nominal model is excessively higher than the gain characteristic of the control object, the loop transfer characteristic $G_{Loop}$ can go unstable. In view of this, the gain characteristic of the resonance inhibition nominal model is set to maintain an appropriate difference of elevation (feedback amount) against the gain characteristic of the control object in any frequency band.

The resonance inhibition nominal model including the frequency characteristic control device has the frequency characteristic shown in FIG. 6. In the gain characteristic diagram of FIG. 6, the apex points of some mechanical resonance characteristics exceed above the resonance inhibition nominal model, thereby reducing its gain margin. In the phase characteristic diagram, however, the phase characteristic of the resonance inhibition nominal model advances to a large degree in the bands where the resonance inhibition nominal model is exceeded in the gain characteristic diagram. Thus, the reduced gain margins are compensated for on the part of the phase margin. With the inverse system 51 relative to the frequency characteristic control device designed in this manner, the resonance inhibition model 43 may estimate a disturbance torque. This ensures a gain margin and a phase margin that are sufficient as a whole with respect to any multi-inertia models, in eliminating or minimizing mechanical resonance.

Figure 9:
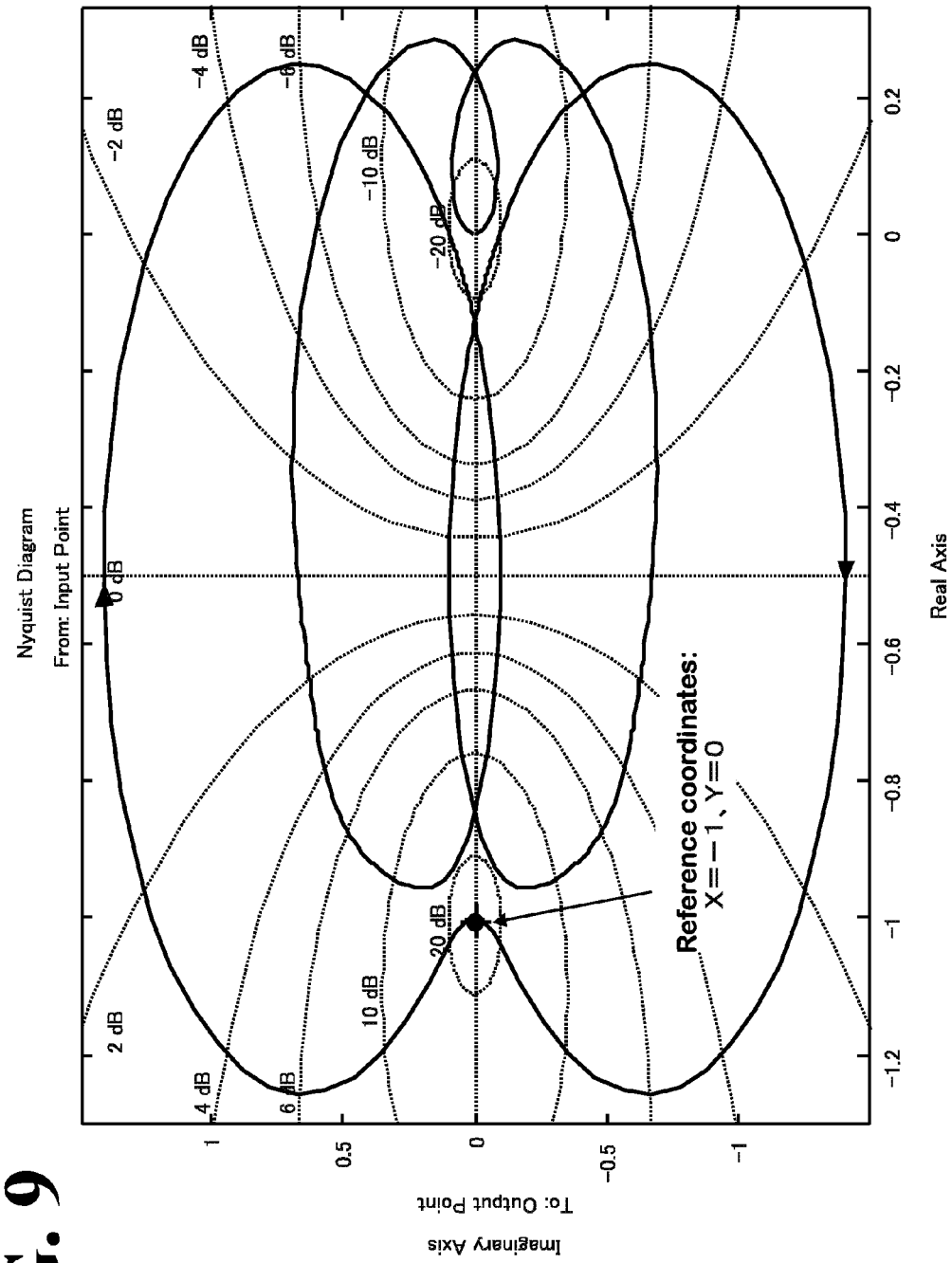
FIG. 9 is a Nyquist diagram of the two-inertia model subjected to disturbance rejection control according to the embodiment.
Figure 10:
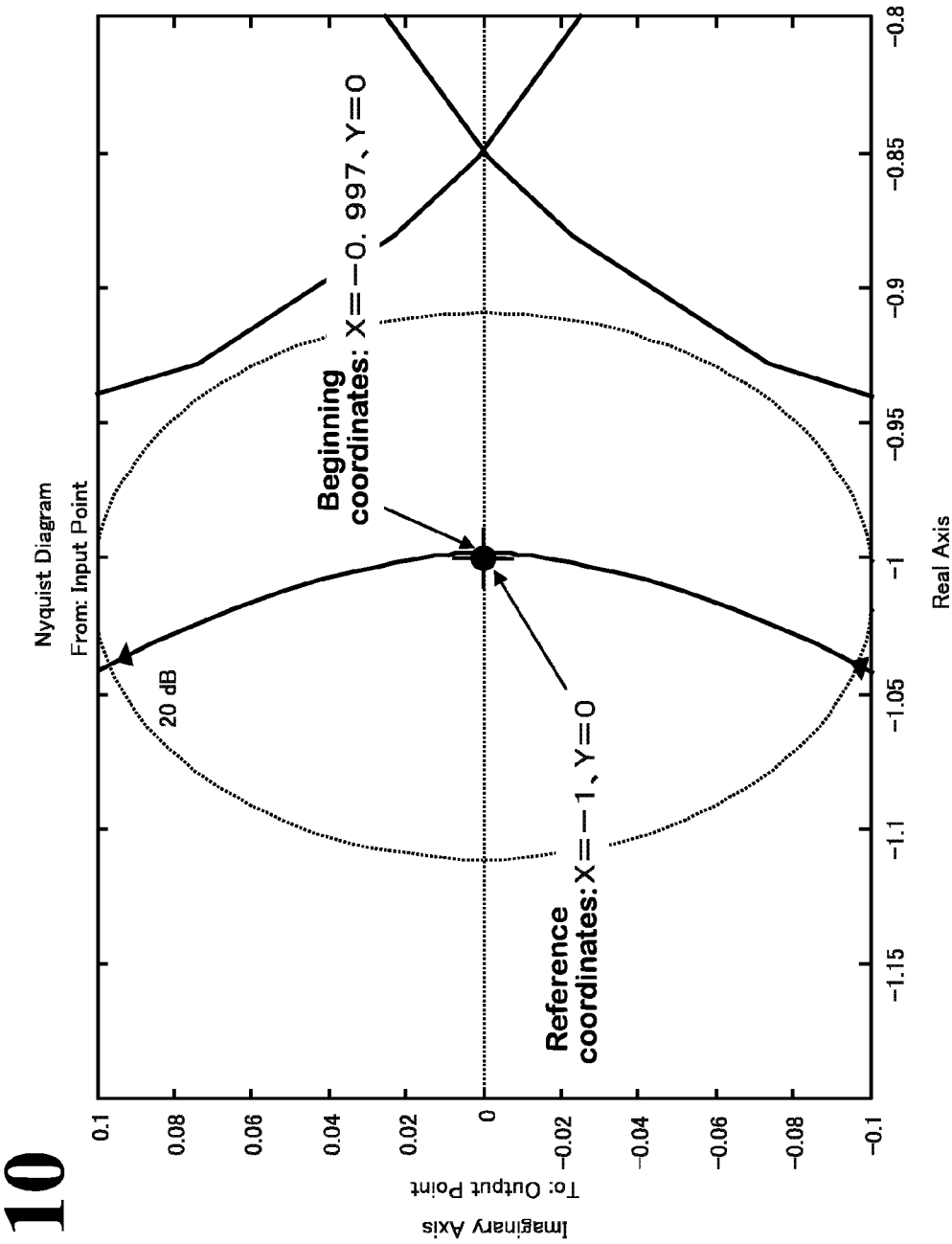
FIG. 10 is an enlarged view of FIG. 9 around reference coordinates.
Figure 11:
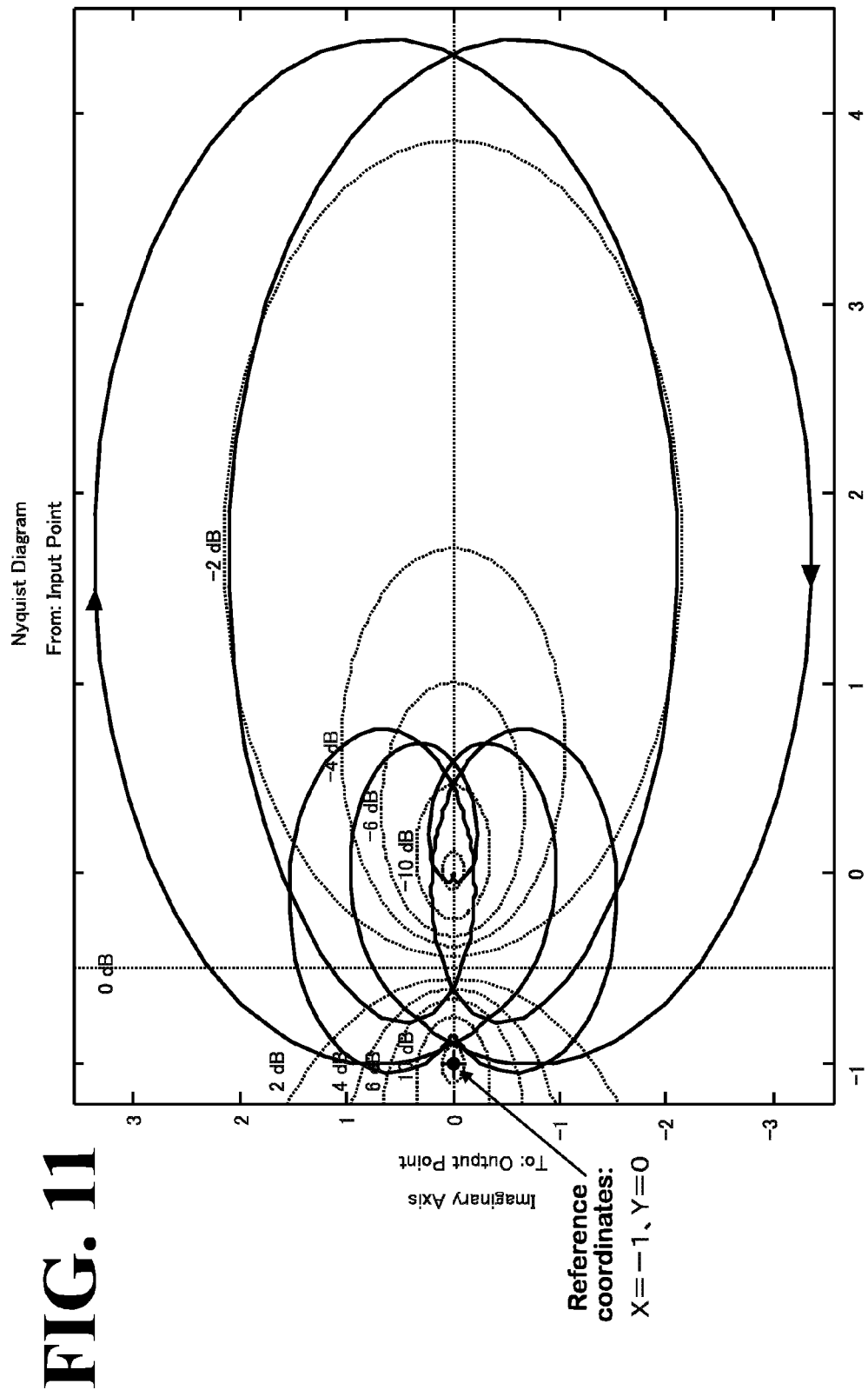
FIG. 11 is a Nyquist diagram of the three-inertia model subjected to disturbance rejection control according to the embodiment.
Figure 12:
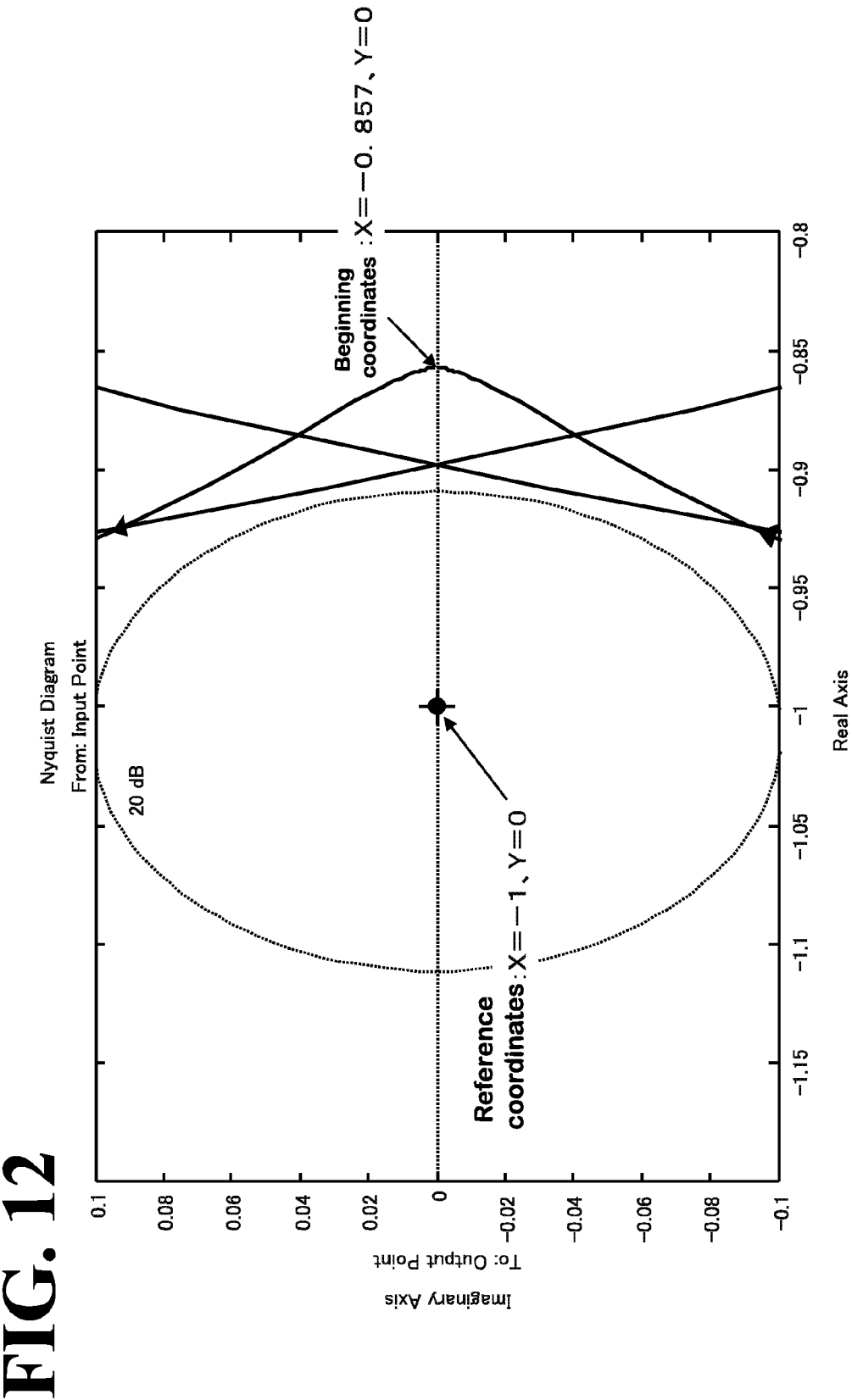
FIG. 12 is an enlarged view of FIG. 11 around reference coordinates.
Figure 13:
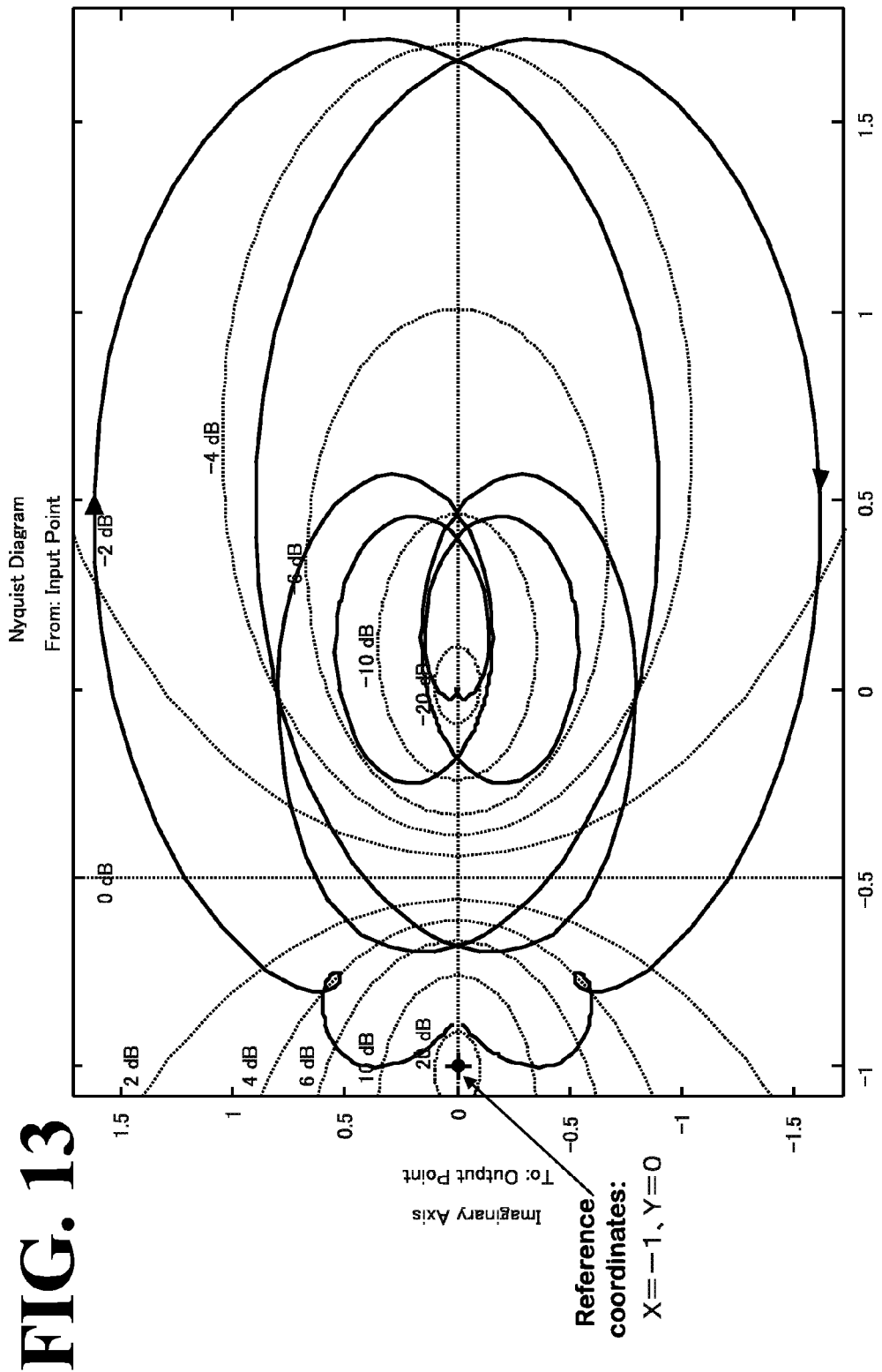
FIG. 13 is a Nyquist diagram of a four-inertia model subjected to disturbance rejection control according to the embodiment.
Figure 14:
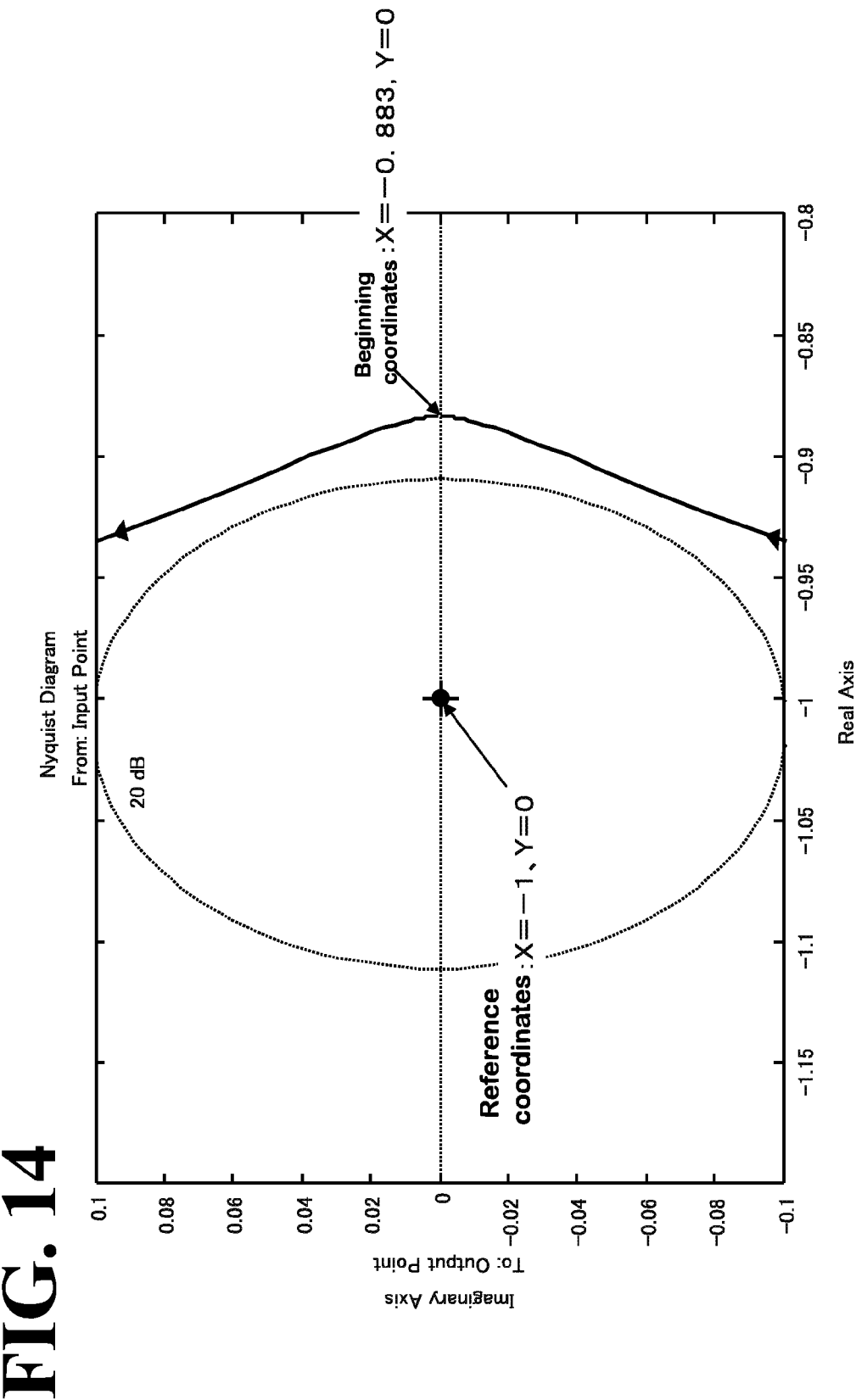
FIG. 14 is an enlarged view of FIG. 13 around reference coordinates.

The stability of the disturbance rejection control system loop according to this embodiment may be determined using Nyquist diagrams shown in FIGS. 9 to 14. The Nyquist diagrams of FIGS. 9, 11, and 13 indicate stability of the closed loop transfer function $G_{Close}$ shown in Equation (2) using polar coordinates on a complex plane of the frequency characteristic of the open loop transfer function shown in Equation (1). FIGS. 10, 12, and 14 are enlarged views respectively of FIGS. 9, 11, and 13 around reference coordinates (X=−1, Y=0; −1+j0). FIGS. 9 and 10 show the case of a two-inertia model. The vector locus crosses the negative real axis at (X=−0.997, Y=0). The reference coordinates are positioned to the left as viewed in the forward direction in which the angular frequency ω increases. This indicates stability of the feedback control system of the closed loop transfer function $G_{Close}$ applied to the two-inertia model. FIGS. 11 and 12 show the case of a three-inertia model, while FIGS. 13 and 14 show the case of a four-inertia model. FIGS. 11 and 12 and FIGS. 13 and 14 indicate that the control loop of the disturbance rejection control system is stable both in the three-inertia model and the four-inertia model, similarly to the two-inertia model. The feedback control systems in the Nyquist diagrams of FIGS. 9 to 14 are the same systems with the same control parameters. This indicates stability in any of the two- to four-inertia models without individual adjustments.

Figure 15:
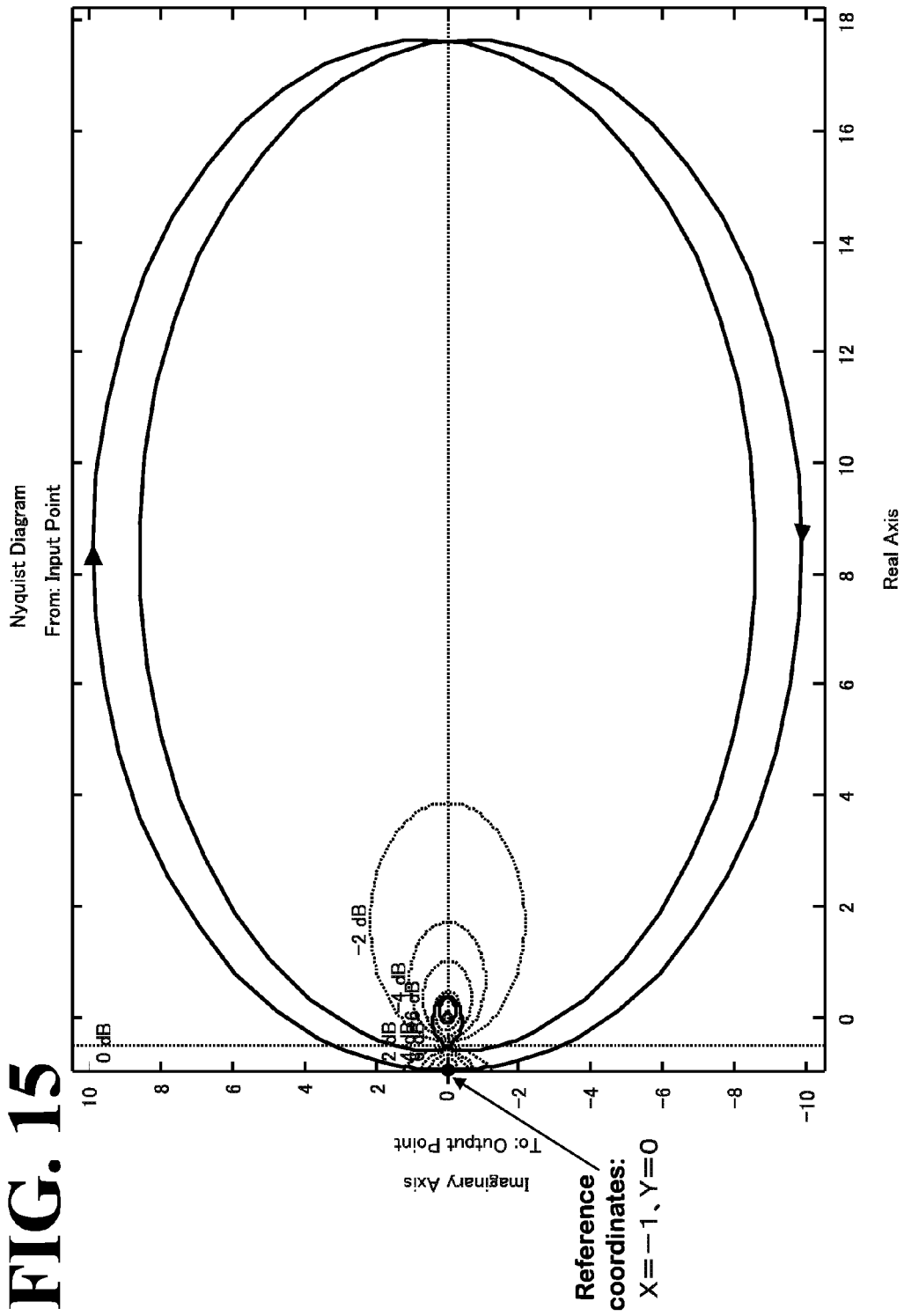
FIG. 15 is a Nyquist diagram of the two-inertia model subjected to conventional disturbance rejection control.
Figure 16:
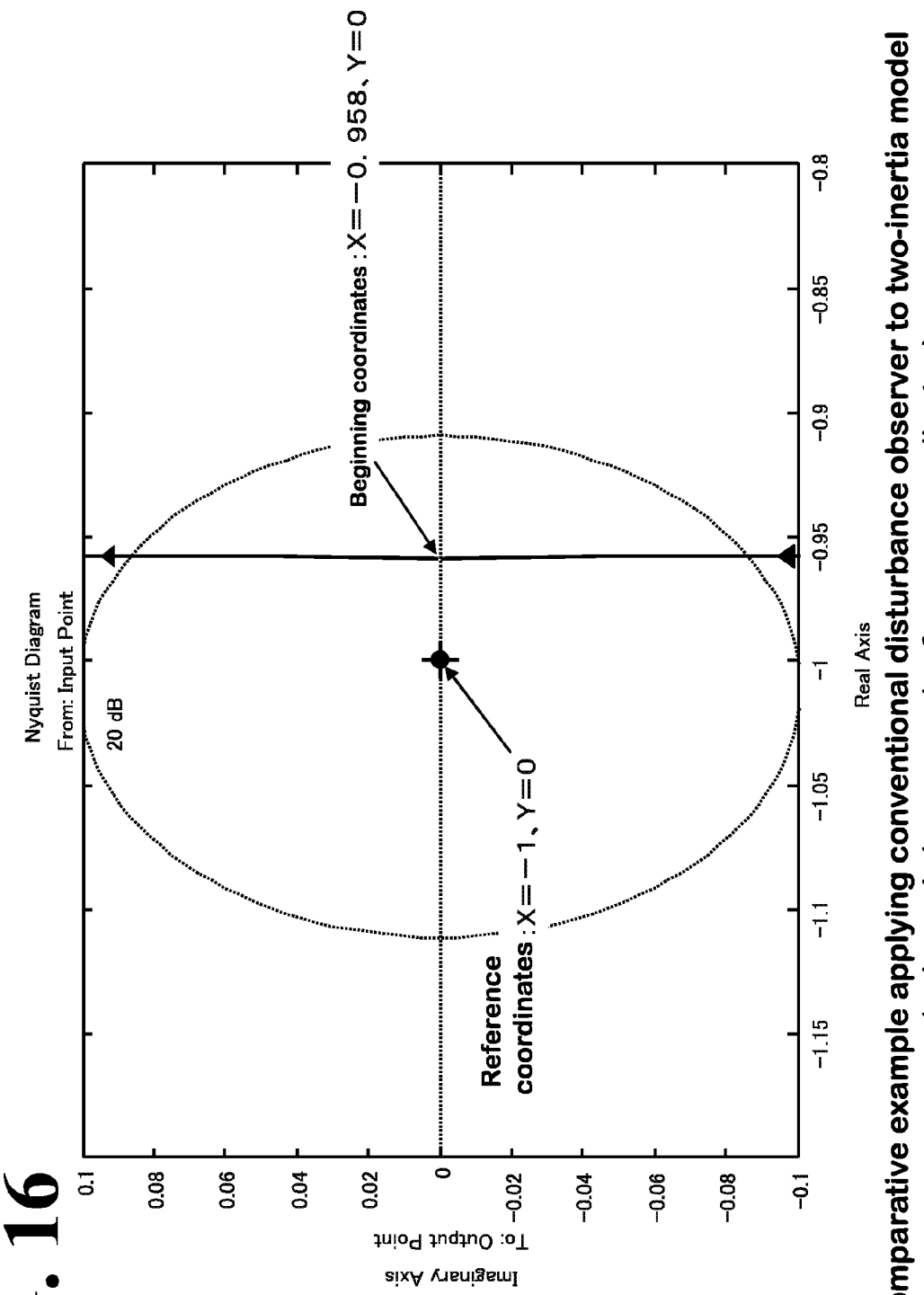
FIG. 16 is an enlarged view of FIG. 15 around reference coordinates.
Figure 17:
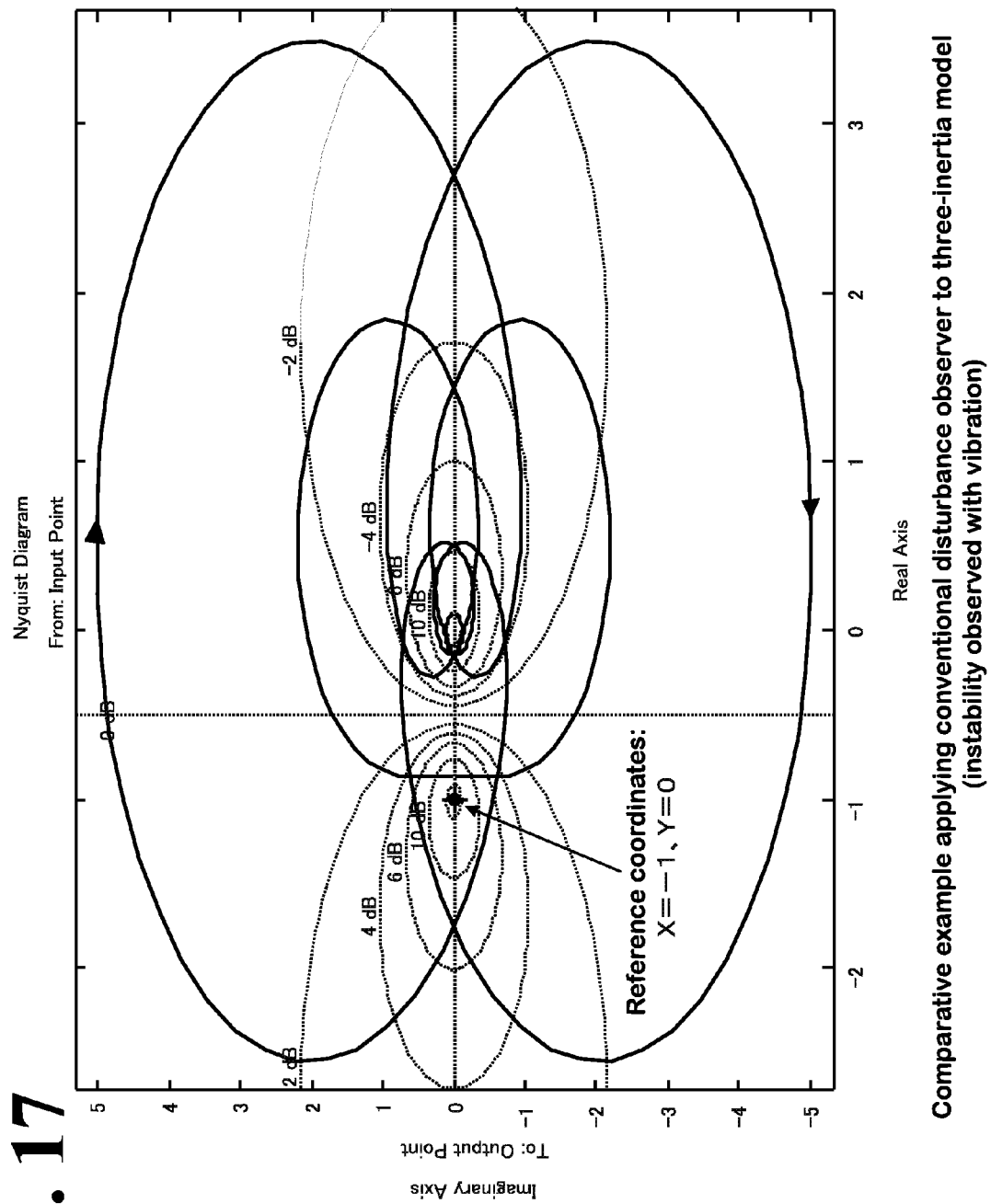
FIG. 17 is a Nyquist diagram of the three-inertia model subjected to conventional disturbance rejection control.
Figure 18:
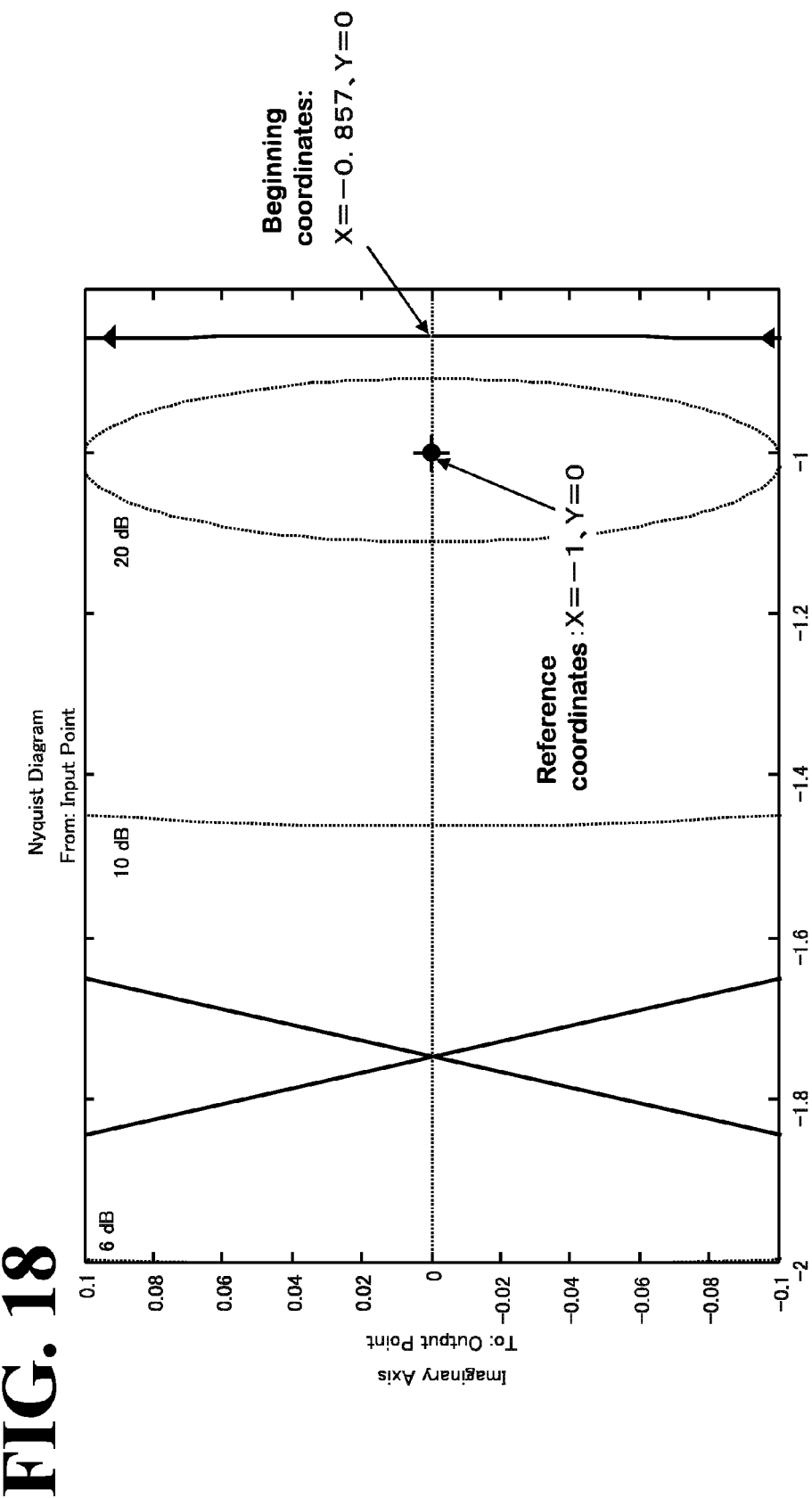
FIG. 18 is an enlarged view of FIG. 17 around reference coordinates.
Figure 19:
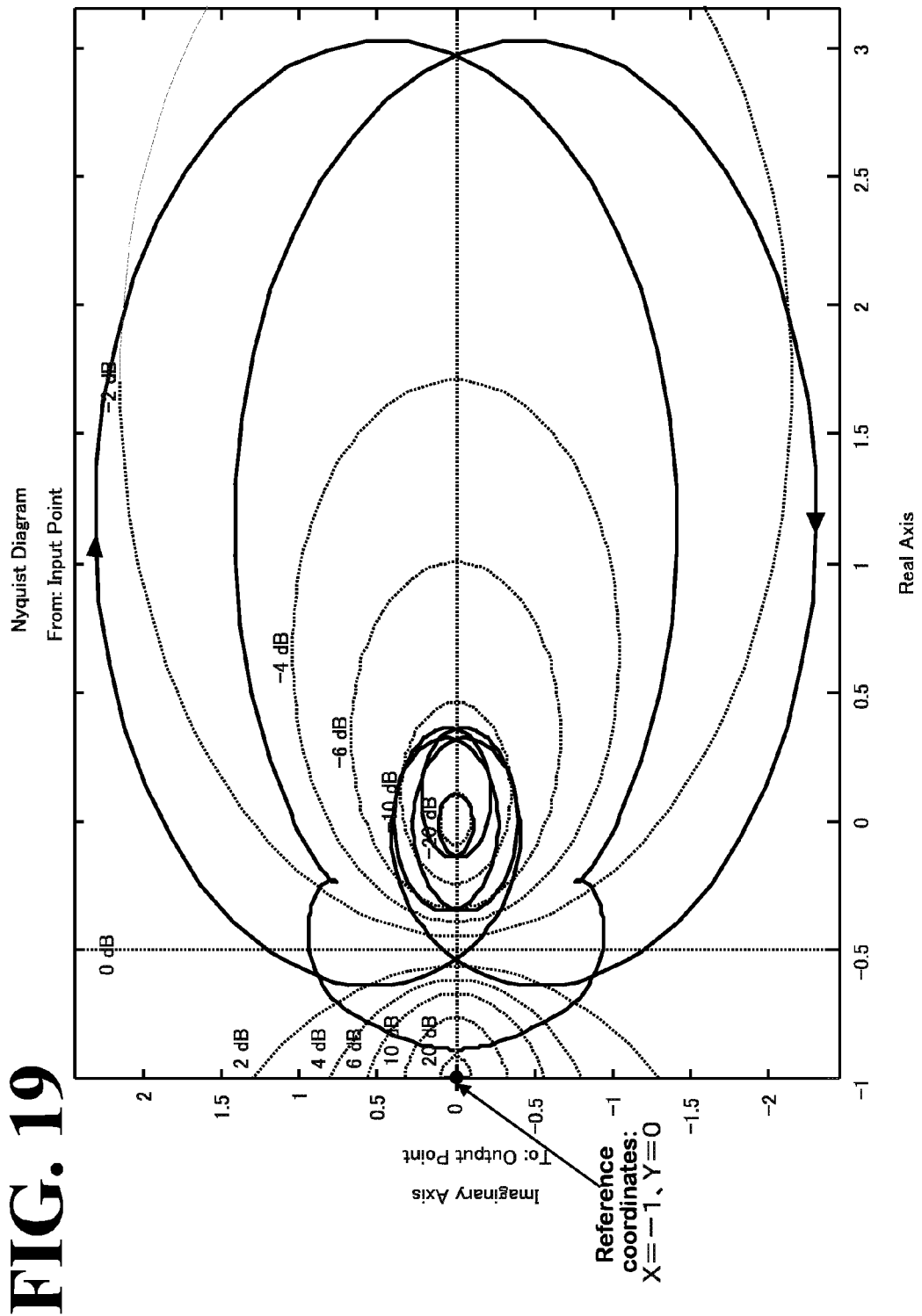
FIG. 19 is a Nyquist diagram of the four-inertia model subjected to conventional disturbance rejection control.
Figure 20:
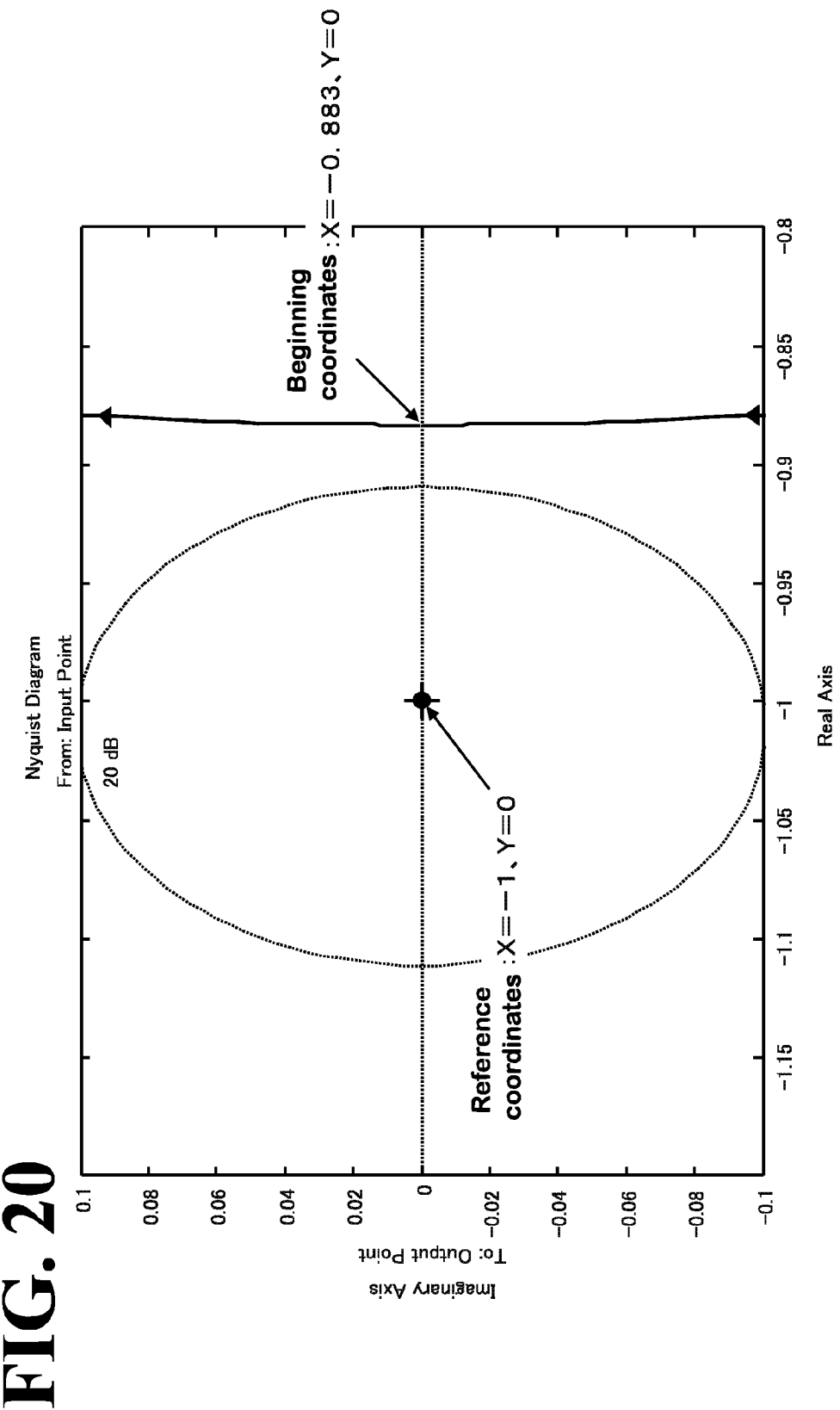
FIG. 20 is an enlarged view of FIG. 19 around reference coordinates.
Figure 21:
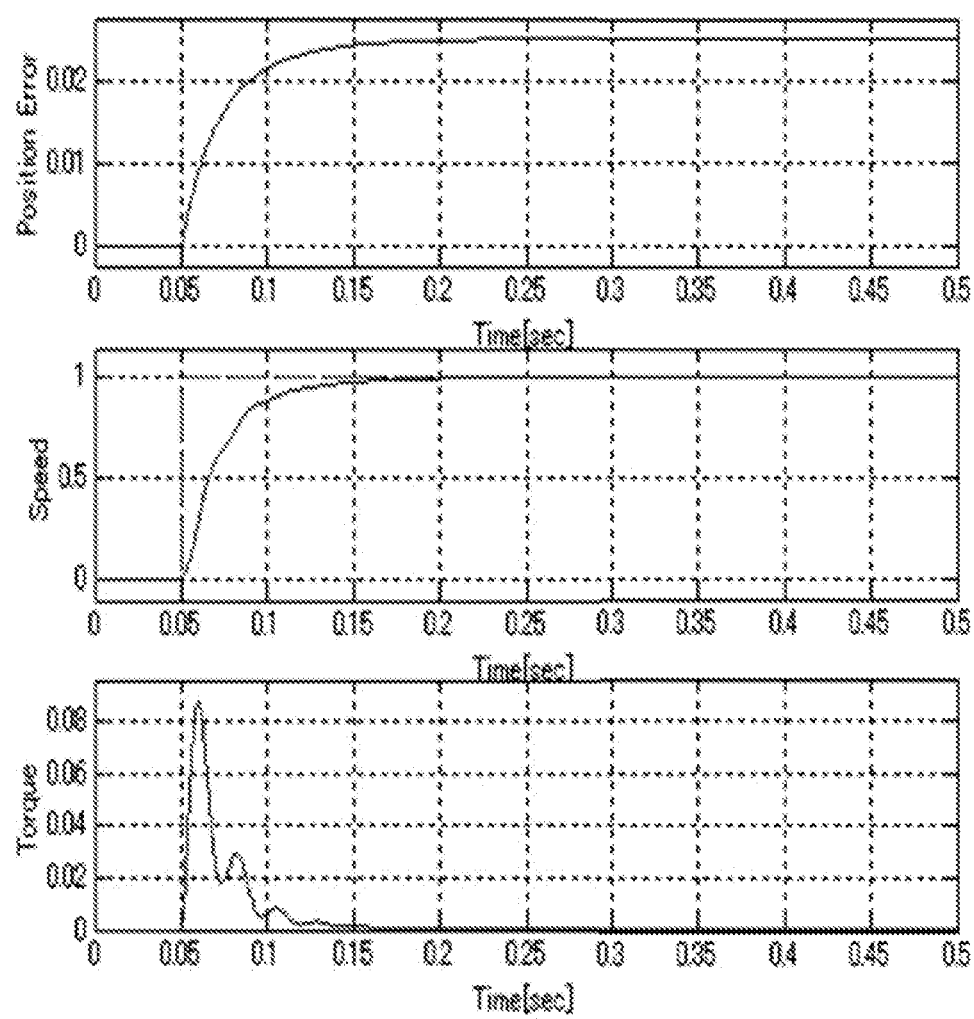
FIG. 21 shows graphs of a comparative simulation using the two-inertia model.

FIGS. 15 to 20 show Nyquist diagrams of conventional disturbance rejection control systems. FIGS. 15 and 16 show the case of a two-inertia model, while FIGS. 19 and 20 show the case of a four-inertia model, both ensuring stability. FIGS. 17 and 18 show the case of a three-inertia model. The vector locus surrounds the reference coordinates. The reference coordinates are positioned to the right with respect to the surrounding vector locus as viewed in the forward direction in which the angular frequency ω increases. This indicates that the conventional disturbance rejection control system loop applied to the three-inertia model goes unstable, causing a vibration.

Thus, the first disturbance observer 31 according to this embodiment and the resonance inhibition model 43 disposed in the first disturbance observer 31 have novel configurations distinguished from the background art. This enables the first disturbance observer 31 and the resonance inhibition model 43 to eliminate or minimize vibration caused by mechanical resonance.

Data as Proof of Disturbance Rejection Performance of this Embodiment

The validity of the motor control apparatus 100 according to this embodiment will be described by referring to FIGS. 21 to 26, which show specific step response data. The term "Position Error" shown in the graphs denotes an error between the position command from the senior control apparatus, not shown, and the motor position from the position detector 5. The error is a signal directly input into the position controller 1 (see A in FIG. 1, which applies throughout the description). The term "Speed" shown in the graphs denotes a speed component (differentiated value of the position command) of the position command that the motor control apparatus 100 acquires, and also denotes the first speed that the speed operator 6 outputs (which applies throughout the description). The term "Torque" shown in the graphs denotes the second torque command that is output by the inertia variation inhibitor 3 and is about to be input into the first current controller 4 (see B in FIG. 1, which applies throughout the description). The change inhibition effect of this embodiment with respect to the motor speed and the torque command might seem unclear in the comparison between the two-inertia model of this embodiment shown in FIG. 22 and the two-inertia model of the comparative example shown in FIG. 21. However, the change inhibition effect of this embodiment is clearly seen in the comparison between the three-inertia model of this embodiment shown in FIG. 24 and the three-inertia model of the comparative example shown in FIG. 23, and in the comparison between the four-inertia model of this embodiment shown in FIG. 26 and the four-inertia model of the comparative example shown in FIG. 25. This indicates that this embodiment improves robustness against mechanical resonance.

FIGS. 27 to 30 show graphs of simulations conducted at different moment-of-inertia ratios, for comparison between this embodiment and comparative examples. All the cases employ rigid body models. FIGS. 27 to 30 indicate that this embodiment exhibits a change inhibition effect with respect to the torque command irrespective of the moment-of-inertia ratio. Thus, this embodiment maintains robustness against the moment-of-inertia ratio.

Figure 30:
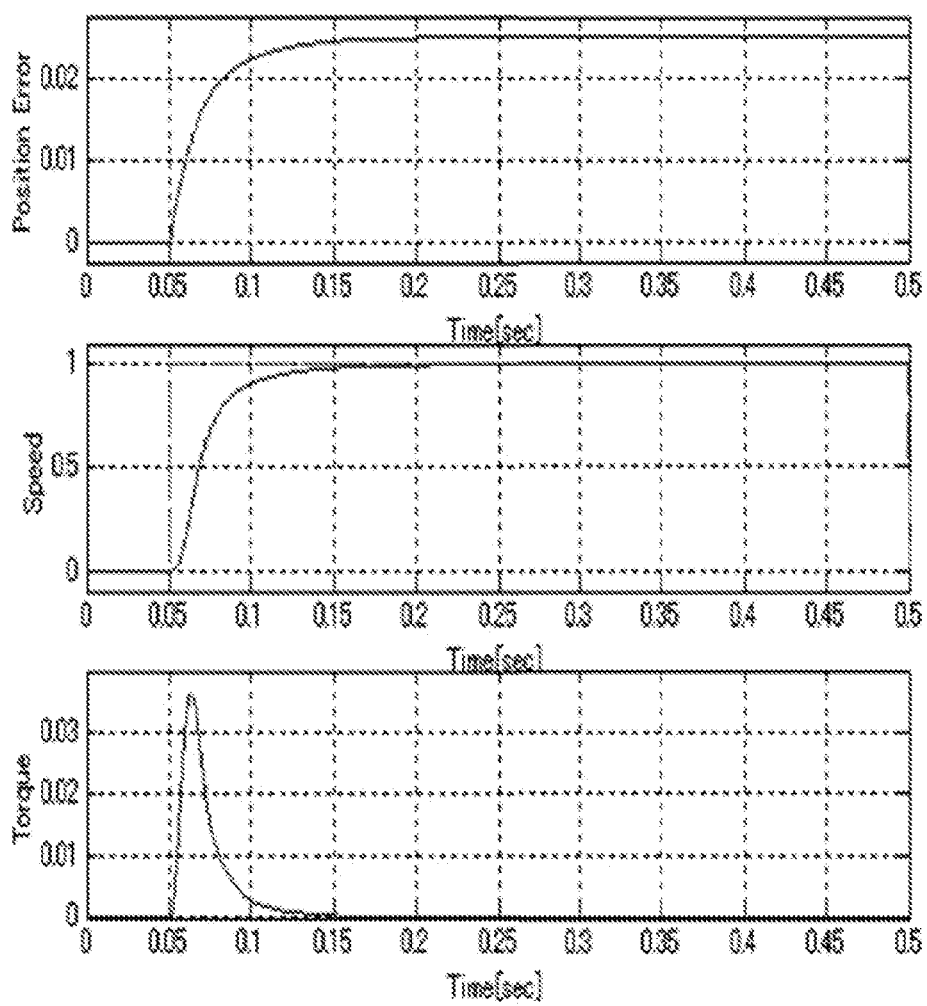
FIG. 30 shows graphs of a simulation conducted at a moment-of-inertia ratio of 30 according to the embodiment.
Figure 31:
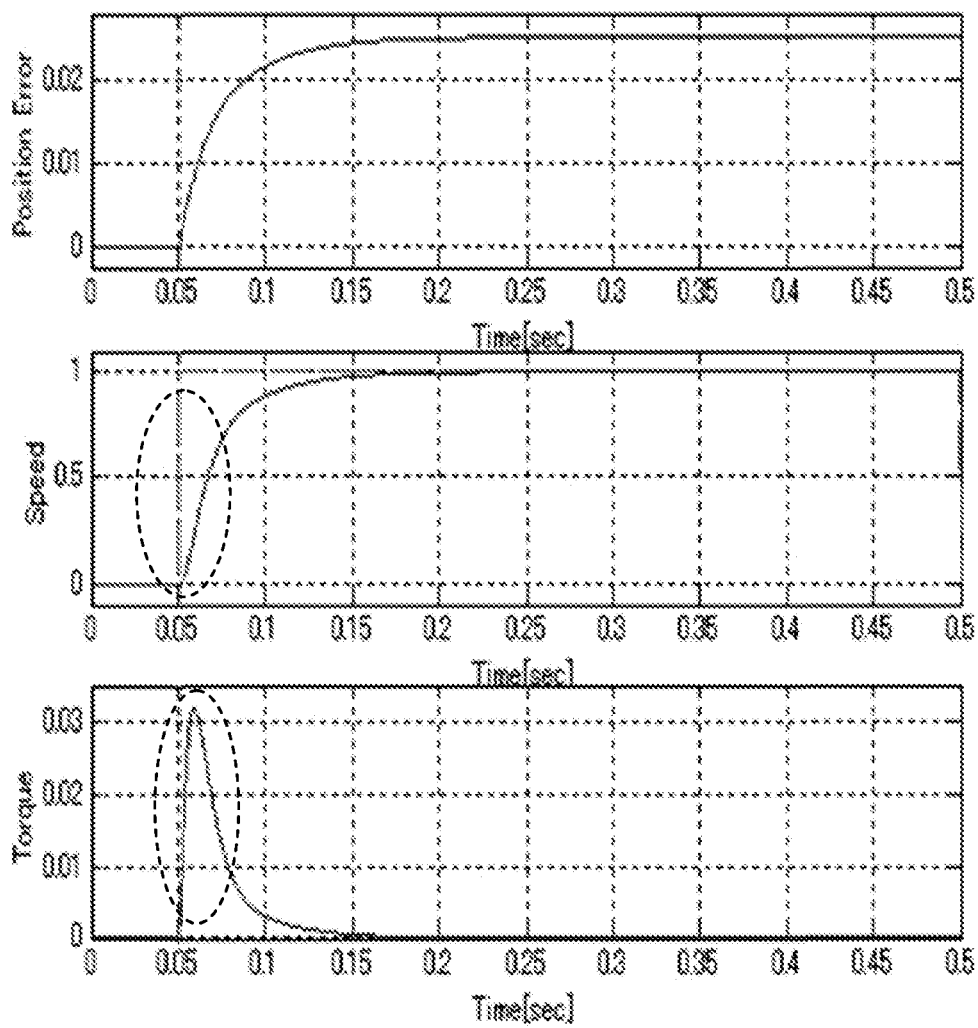
FIG. 31 shows graphs of a simulation of standard P-PI control at a moment-of-inertia ratio of 30.
Figure 32:
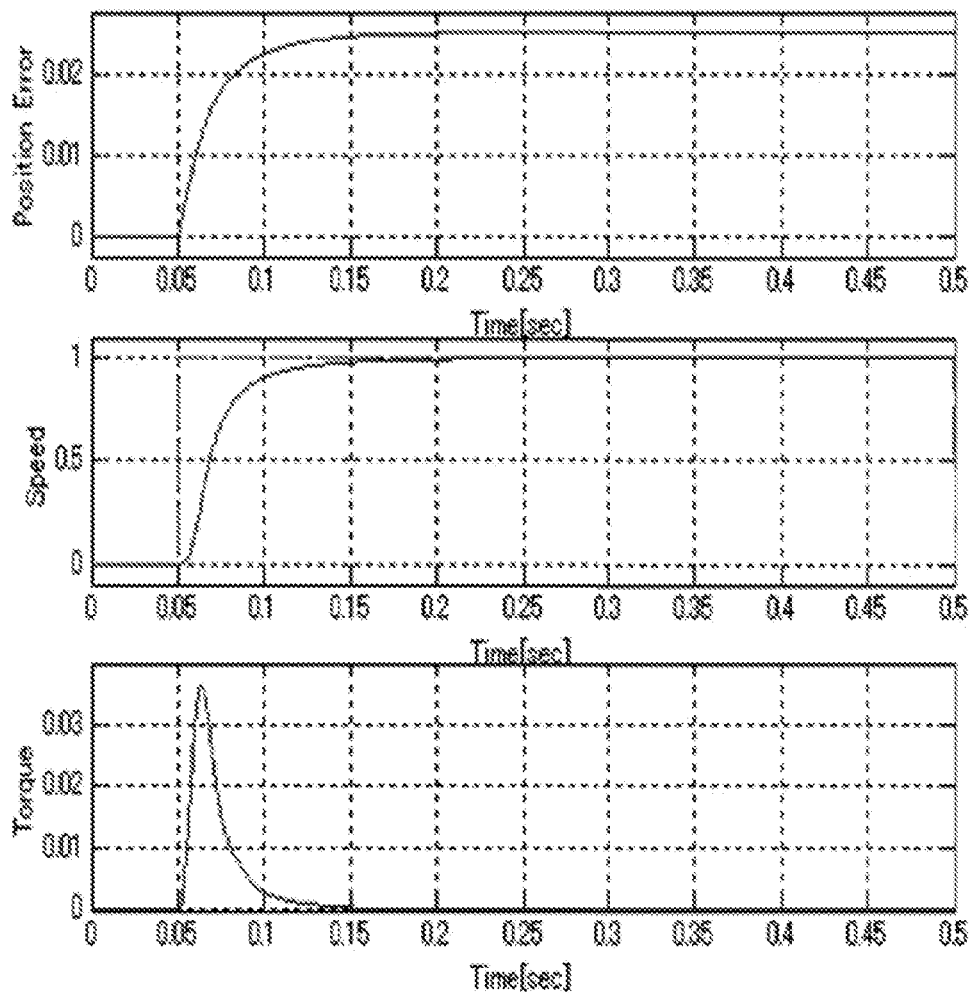
FIG. 32 shows graphs of a simulation conducted at a moment-of-inertia ratio of 30 according to the embodiment.

FIG. 31 shows ideal waveforms in standard P-PI control of a rigid body model of a high moment-of-inertia ratio. FIG. 32 shows graphs of a simulation according to this embodiment under conditions similar to those in FIG. 31. (FIG. 32 is identical to FIG. 30.) A comparison between FIGS. 31 and 32 reveals that the waveforms of this embodiment resemble the ideal waveforms particularly at the parts surrounded by broken lines in FIG. 31, and that this embodiment is preferable in standard P-PI control applications.

Advantageous Effects of this Embodiment

As has been described hereinbefore, the motor control apparatus 100 according to this embodiment has a triple-loop configuration including the loop of the position control system, the loop of the speed control system, and the loop of the current control system. In the loop of the speed control system, the inertia variation inhibitor 3 uses the first disturbance observer 31 to estimate the disturbance torque of the motor 200, adds the estimated disturbance torque to the first torque command, and outputs the sum as the second torque command. This ensures robustness against the control characteristics of the motor 200 even when the moment-of-inertia ratio of the drive mechanism 500 is unknown or changing.

The first phase compensator 7 disposed in the loop of the speed control system works as a phase compensation speed observer to advance the phase, as well as estimating the speed. In this manner, the first phase compensator 7 advances the phase of the speed control system and improves the phase margin of the position control system, thereby improving the response characteristic of the inertia variation inhibitor 3. That is, robustness improves against the moment-of-inertia ratio of the drive mechanism 500.

Further in this embodiment, the first disturbance observer 31 estimates a disturbance torque in the inertia variation inhibitor 3. The first disturbance observer 31 includes the resonance inhibition model 43. The resonance inhibition model 43 outputs an acceleration-deceleration torque signal of an ideal motor in response to the first motor speed of the motor 200. The acceleration-deceleration torque signal has minimal influence of mechanical resonance of the drive mechanism 500. The first disturbance observer 31 uses the acceleration-deceleration torque signal of the ideal motor to estimate the disturbance torque. As a result, the inertia variation inhibitor 3 eliminates or minimizes fluctuation of inertia moment of the drive mechanism without vibration caused by mechanical resonance of the drive mechanism 500. This ensures robustness against the control characteristics of the motor 200 even when the inertia model of the drive mechanism 500 is unknown or changing.

Thus, this embodiment ensures drive control of the motor 200 with high robustness without adjusting various parameters, even when both the inertia moment and multi-inertia model of the drive mechanism 500 are unknown or changing.

This maintains robustness with drive mechanisms 500 having mechanical resonance characteristics, which has been conventionally considered impossible to realize. This embodiment also highly improves resistance against mechanical resonance (that is, eliminates or minimizes the tendency toward vibration), which has been considered difficult to realize by conventional disturbance rejection control systems.

The resonance inhibition model 43 can be fixed in any convenient design, and this ensures use of fixed control systems and fixed parameters to operate control objects of complicated mechanical resonance characteristics without adjustments. Conventional motor control apparatuses involve individual adjustment, manual or automatic, of control gain in accordance with the mechanical characteristics of the drive mechanism 500. It is after this adjustment that the drive mechanism 500 can operate. That is, many conventional motor control apparatuses have been considered high in performance but difficult to handle, which has discouraged their introduction. This embodiment facilitates utilization of motor control apparatuses in a widened range of applications. This embodiment also significantly shortens the time necessary for setting up mechanical machines, which is a significant advantage in the utilization of motor control apparatuses.

It is particularly noted that in this embodiment, the resonance inhibition model 43 is an inverse system relative to the resonance inhibition nominal model proposed in this embodiment. The resonance inhibition nominal model includes a frequency characteristic control device $(1+T_1 s)/(1+T_2 s)$, not shown. The frequency characteristic control device includes the plurality of time constants $T_1$ and $T_2$, which are respectively determined by the plurality of frequency set values $f_1$ and $f_2$ used to change the change rate of gain of the frequency characteristic of the rigid nominal model. Appropriately setting the plurality of time constants of the frequency characteristic control device ensures design of the resonance inhibition nominal model such that the resonance inhibition nominal model is based on the mechanical resonance characteristic of the control object and is deformed to a degree that ensures resonance inhibition. This ensures design of the resonance inhibition nominal model and the resonance inhibition model 43 in accordance with possible control objects (the motor 200 and the drive mechanism 500).

It is particularly noted that in this embodiment, the plurality of time constants $T_1$ and $T_2$ are set to control the resonance inhibition nominal model to maintain, in any frequency band, at least one of the gain margin and the phase margin on the frequency characteristic of the resonance inhibition nominal model against the mechanical resonance characteristics of the motor 200 and the drive mechanism 500.

The plurality of time constants $T_1$ and $T_2$ are determined by the frequency set values $f_1$ and $f_2$. Appropriately setting the time constants $T_1$ and $T_2$ changes the inclination of the rigid body nominal model to result in the resonance inhibition nominal model. Such a resonance inhibition nominal model has generally higher gain than the mechanical resonance characteristic of the control object. Appropriately setting the plurality of time constants $T_1$ and $T_2$ also provides the following advantage. The apex points of some mechanical resonance characteristics might exceed above the resonance inhibition nominal model on the gain characteristic part, thereby reducing its gain margin. In the phase characteristic part, however, the phase characteristic of the resonance inhibition nominal model advances to a large degree in the bands where the resonance inhibition nominal model is exceeded in the gain characteristic part. Thus, the reduced gain margins are compensated for on the part of the phase margin. Thus, the frequency characteristic control device is designed to control the resonance inhibition nominal model to maintain at least one of the gain margin and the phase margin on the frequency characteristic against the mechanical resonance characteristic of the control object. With the resonance inhibition nominal model including this frequency characteristic control device, an inverse system relative to the resonance inhibition nominal model is used as a resonance inhibition model to estimate the disturbance torque. This ensures a gain margin and a phase margin that are sufficient as a whole with respect to any multi-inertia models, in eliminating or minimizing mechanical resonance.

It is particularly noted that in this embodiment, the resonance inhibition model 43 of the first disturbance observer 31 includes the inverse system 51 relative to the frequency characteristic control device $(1+T_2s)/(1+T_1s)$. In the inverse system 51, the plurality of time constants $T_1$ and $T_2$ are set to control the loop transfer characteristic $G_{Loop}$ (Equation (1)) of the contain disturbance rejection control system loop including the inertia variation inhibitor 3, the first current controller 4, the motor 200, and the drive mechanism 500. Specifically, the loop transfer characteristic $G_{Loop}$ is controlled to maintain a phase of minus 180 degrees and a gain of less than 1 in the low-frequency band. In a frequency domain of the high-frequency band providing a gain of equal to or greater than 1, the loop transfer characteristic $G_{Loop}$ is controlled to maintain a phase other than minus 180 degrees. The inverse system 51 relative to the frequency characteristic control device controls the frequency characteristic of the motor speed of the motor 200. The inverse system 51 relative to the frequency characteristic control device outputs a signal corresponding to speed. The signal is multiplied by the inertia moment $J_0$ and differentiated by the operator s, thereby being converted into a signal corresponding to torque. This ensures that the resonance inhibition model 43 outputs an acceleration-deceleration torque signal of the ideal motor, with minimal influence of mechanical resonance.

The inertia moment $J_0$ is an inertia moment of the rotor of the motor 200, and thus the load of the entire drive mechanism 500 can be regarded as a disturbance element. This ensures that at the time of shipment from the factory, the motor control apparatus 100 undergoes adjustment of its parameters (such as time constant, attenuation coefficient, and various kinds of gain) in accordance with what kind of motor 200 to apply as the control object. This eliminates the need for parameter adjustment of the drive mechanism 500 to be driven by the motor 200. The frequency characteristic control device, not shown, is a component of the resonance inhibition nominal model. The frequency characteristic control device is defined by the function $(1+T_1s)/(1+T_2s)$. The function includes the plurality of variable time constants $T_1$ and $T_2$, which are respectively determined by the frequency set values $f_1$ and $f_2$. The disturbance rejection control system according to this embodiment uses the resonance inhibition model, which is an inverse system relative to the resonance inhibition nominal model. This ensures a gain margin and a phase margin that are sufficient as a whole with respect to any multi-inertia models, and eliminates or minimizes fluctuation of inertia moment of the drive mechanism without mechanical resonance.

It is particularly noted that in this embodiment, the first disturbance observer 31 subtracts the acceleration-deceleration torque signal of the ideal motor from the second torque command so as to estimate the disturbance torque. The acceleration-deceleration torque signal is obtained from the resonance inhibition model 43 based on the first motor speed of the motor 200, and has minimal influence of mechanical resonance.

It is particularly noted that in this embodiment, the current loop model 41 of the first disturbance observer 31 processes the second torque command equally with the first current controller 4. This reduces the phase difference between the acceleration-deceleration torque signal of the ideal motor (torque signal calculated from the motor speed) obtained by the resonance inhibition model 43 and the torque signal (as a command) output from the current loop model. This ensures accurate estimation of the disturbance torque, and improves the response characteristic of the inertia variation inhibitor 3. This, in turn, improves the cut-off frequency of the loop of the speed control system up to the high-frequency band, thus accommodating to greater moment-of-inertia ratios. That is, robustness improves against the moment-of-inertia ratio of the drive mechanism 500.

Modifications will be described below.
(1) A Second Phase Compensator as a Phase Advance Filter The above-described embodiment employs the first phase compensator 7 to advance the phase of the speed control system, thereby improving the phase margin of the position control system. It is also possible to employ a second phase compensator to advance the phase in a particular frequency band. This further improves the phase margin of the position control system.

Figure 33:
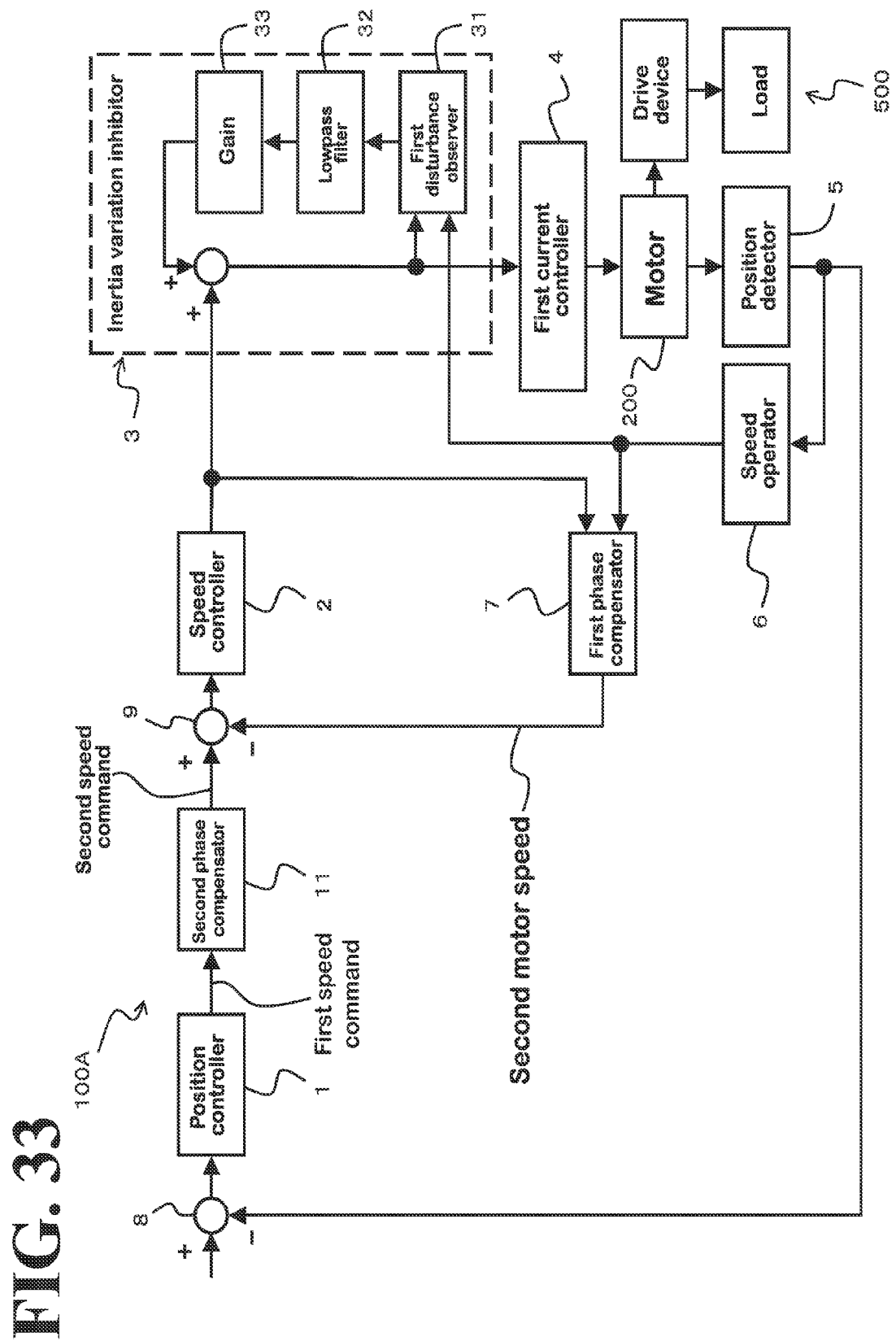
FIG. 33 is a block diagram illustrating a first modification of the motor control apparatus in a transfer function form, where a second phase compensator is provided.

FIG. 33 shows a first modification of the above-described embodiment shown in FIG. 1. A motor control apparatus 100A according to the first modification includes a new, second phase compensator 11 between the position controller 1 and the subtractor 9. The second phase compensator 11 acquires a first speed command output from the position controller 1, advances the phase of the first speed command in a particular frequency band, and outputs a second speed command to the subtractor 9.

Figure 34:
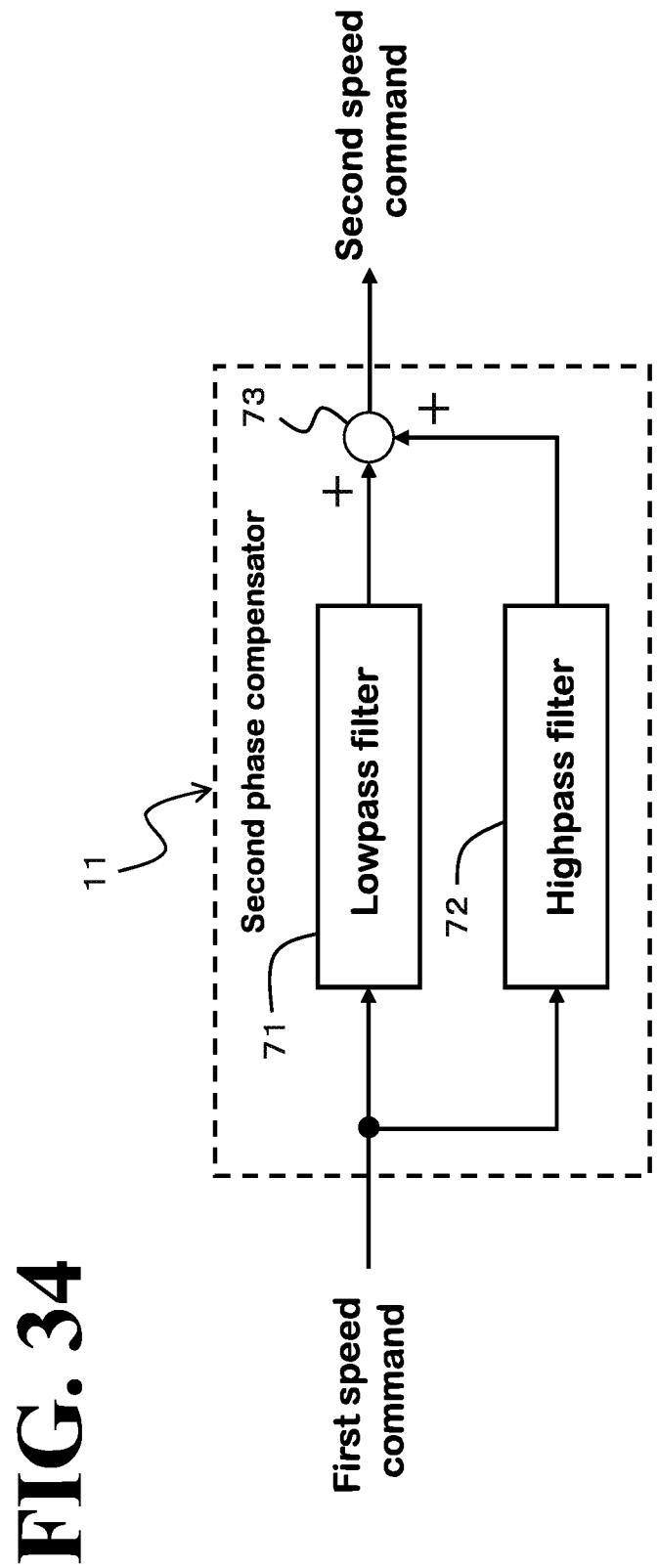
FIG. 34 is a detailed block diagram illustrating the second phase compensator.

An example of the second phase compensator 11 is shown in FIG. 34. The second phase compensator 11 includes a lowpass filter 71, a highpass filter 72, and an adder 73. The outputs of the lowpass filter 71 and the highpass filter 72 are added by the adder 73, which then outputs the sum. Thus, the second phase compensator 11 may be a control block using a phase advance filter.

The phase advance filter has a transfer function G(s) represented by Equation (3). The lowpass filter has a time constant $T_L$, while the highpass filter has a time constant $T_H$. The time constants $T_L$ and $T_H$ are set to satisfy the relationship: $1/T_H < 1/T_L$. More specifically, the lowpass filter has a cutoff frequency $\omega_1 (=1/T_L)$, while the highpass filter has a cutoff frequency $\omega_2 (=1/T_H)$. The cutoff frequencies $\omega_1$ and $\omega_2$ are set to satisfy the relationship: $\omega_2 < \omega_1$. This helps correct phase delay. If these conditions are reversed, a phase delay filter results, providing no phase advance effect.

$$G(s) = (1 + sT_H)/(1 + sT_L) \qquad (3)$$
$$= 1/(1 + sT_L) + sT_H/(1 + sT_L)$$
$$= \omega_L/(\omega_L + s) + T_H \omega_L s/(\omega_L + s)$$

The phase advance filter may also be represented by Equation (4).

$$G(s) = \omega_L/(\omega_L + s) + T_L \omega_H s/(\omega_H + s) \qquad (4)$$

Here, making the cutoff frequency of the lowpass filter 71 higher than the cutoff frequency of the highpass filter 72 results in a phase advance filter.

The second phase compensator 11 inputs the first speed command from the position controller 1 into the lowpass filter 71 and the highpass filter 72, adds the outputs of the lowpass filter 71 and the highpass filter 72 at the adder 73, and outputs the sum as the second speed command. Using the lowpass filter 71 alone might not advance the phase, while using the highpass filter 72 alone might advance the phase in the undesired, low-frequency band. Additionally, the highpass filter 72 might cause decrease of gain in the low-frequency band. The gain in the low-frequency band is inherently compensated for by speed loop gain or speed integration. The second phase compensator 11 according to this embodiment shown in FIG. 34, however, works as a phase advance filter to advance the phase only in a desired frequency band. The lowpass filter 71 corresponds to the second lowpass filter recited in the accompanying claims.

Additionally, when the speed loop gain, not shown, in the speed controller 2 increases, a deviation occurs to the phase to be compensated for at the second phase compensator 11, which can cause vibration to occur. In view of this, the second phase compensator 11 may change the cutoff frequencies of the lowpass filter 71 and the highpass filter 72 in accordance with the speed loop gain in the speed controller 2. Specifically, it is possible to conduct a simulation or an actual machine test so as to plot optimal values of the cutoff frequencies of the lowpass filter 71 and the highpass filter 72 sequentially on a graph against changes in the speed loop gain in the speed controller 2 (the plotted values are not shown). Then, an approximation may be obtained interpolating the plotted measurement data.

For example, in the first modification, which employs the disturbance observer as shown in FIG. 2, the cutoff frequency of the highpass filter 72 may be fixed, while the cutoff frequency, $f_c$, of the lowpass filter 71 may be approximated by the quadratic function: $f_c = a \times K_v^2 + b \times K_v + c$, where $K_v$ denotes the speed loop gain. It is also possible to use a cutoff frequency of the lowpass filter 71 that can be approximated by a linear function such as $f_c = a \times K_v + b$. It is also possible to fix the cutoff frequency of the lowpass filter 71 and to approximate the cutoff frequency, $f_c$, of the highpass filter 72 using a quadratic function or a linear function of the speed loop gain $K_v$. These polynomials of approximation use the speed loop gain $K_v$ as an independent variable. This ensures that for example, when the speed loop gain $K_v$ in the speed controller 2 changes, the above-described functions appropriately change the cutoff frequency of the lowpass filter 71 or the highpass filter 72 of the second phase compensator 11. This, in turn, ensures automatic re-adjustment of the compensation value of the phase. That is, a polynomial of approximation using the speed loop gain $K_v$ as an independent variable may be used to appropriately change the cutoff frequency of the lowpass filter 71 or the highpass filter 72 of the second phase compensator 11. This ensures automatic re-adjustment of the compensation value of the phase.

Figure 22:
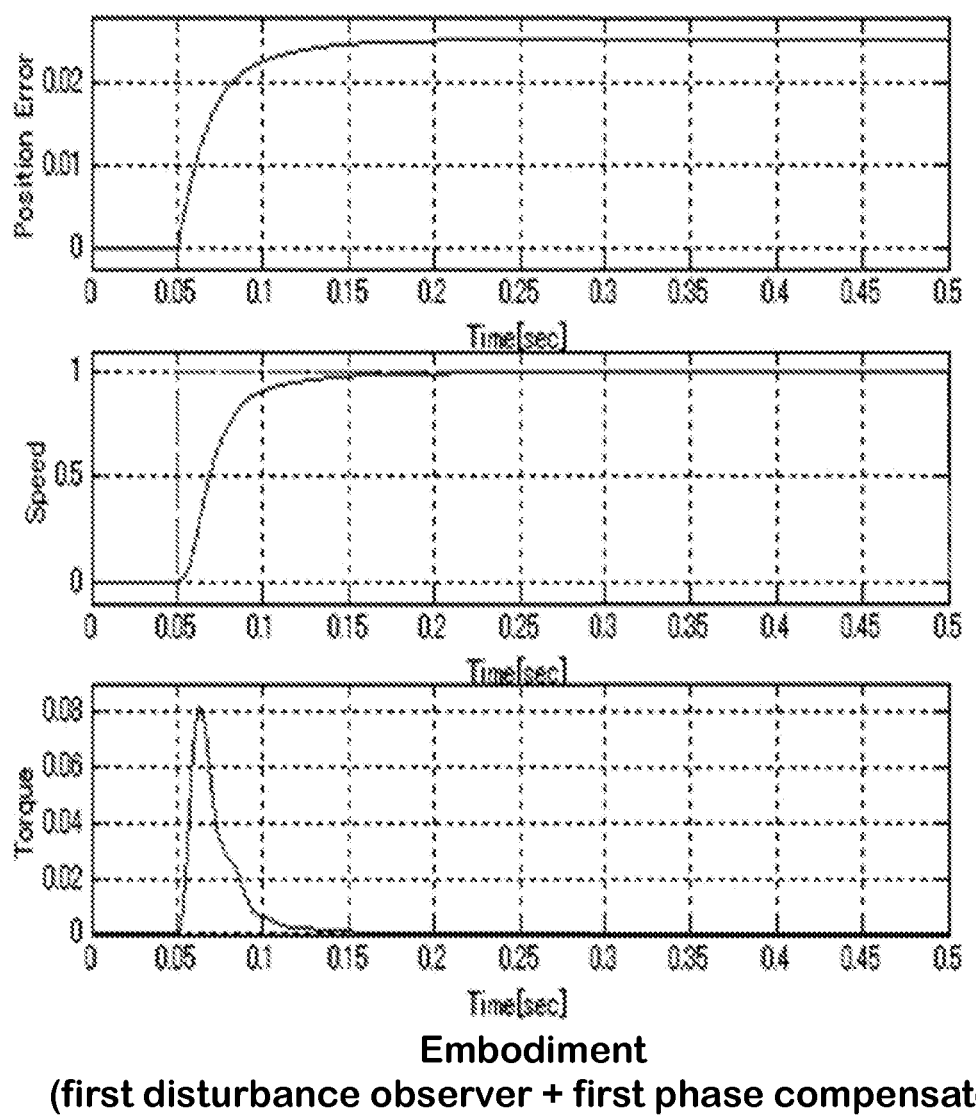
FIG. 22 shows graphs of a simulation using the two-inertia model according to the embodiment.
Figure 23:
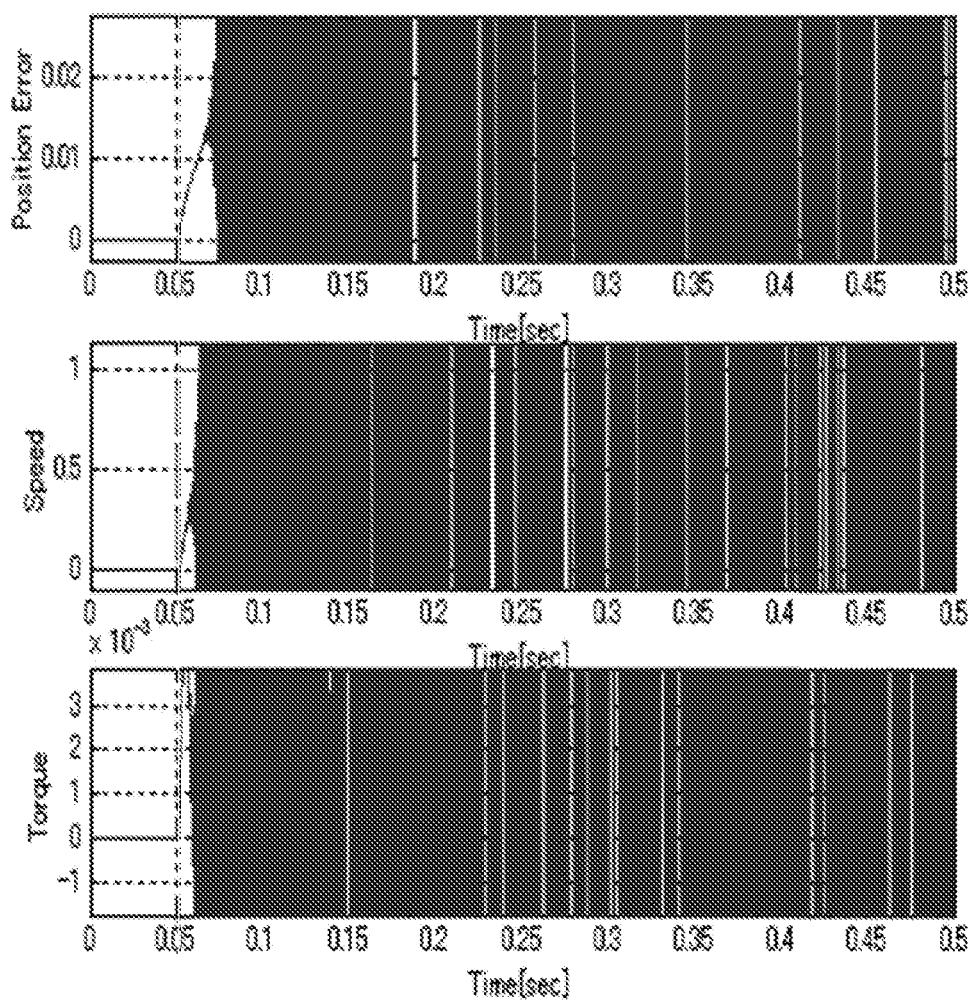
FIG. 23 shows graphs of a comparative simulation using the three-inertia model.
Figure 24:
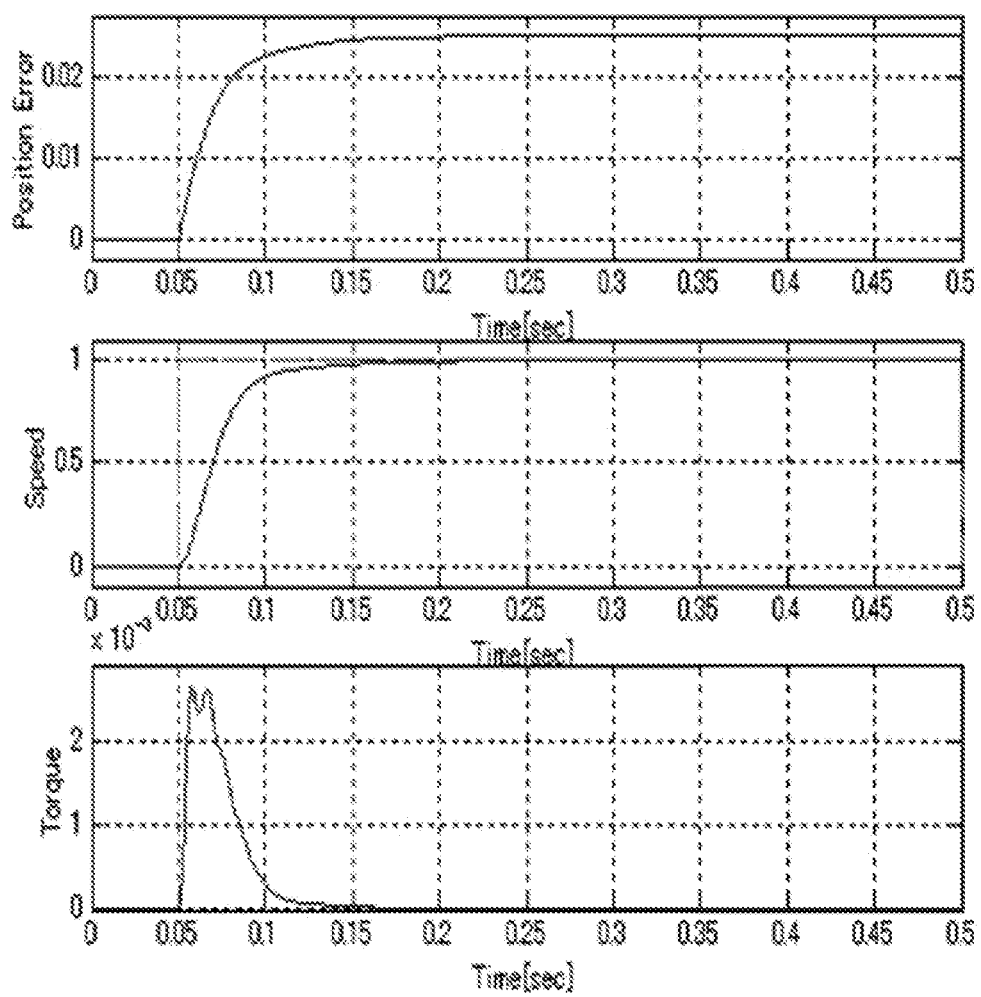
FIG. 24 shows graphs of a simulation using the three-inertia model according to the embodiment.
Figure 25:
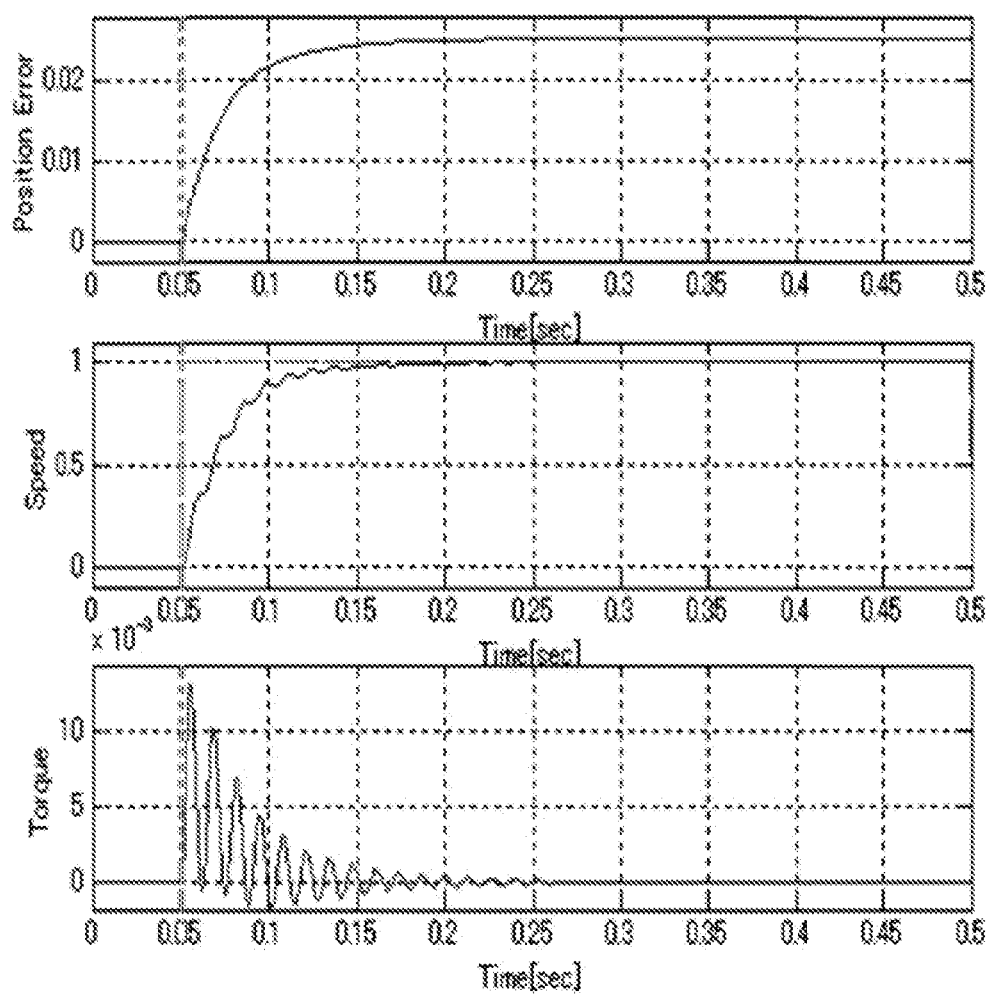
FIG. 25 shows graphs of a comparative simulation using the four-inertia model.
Figure 26:
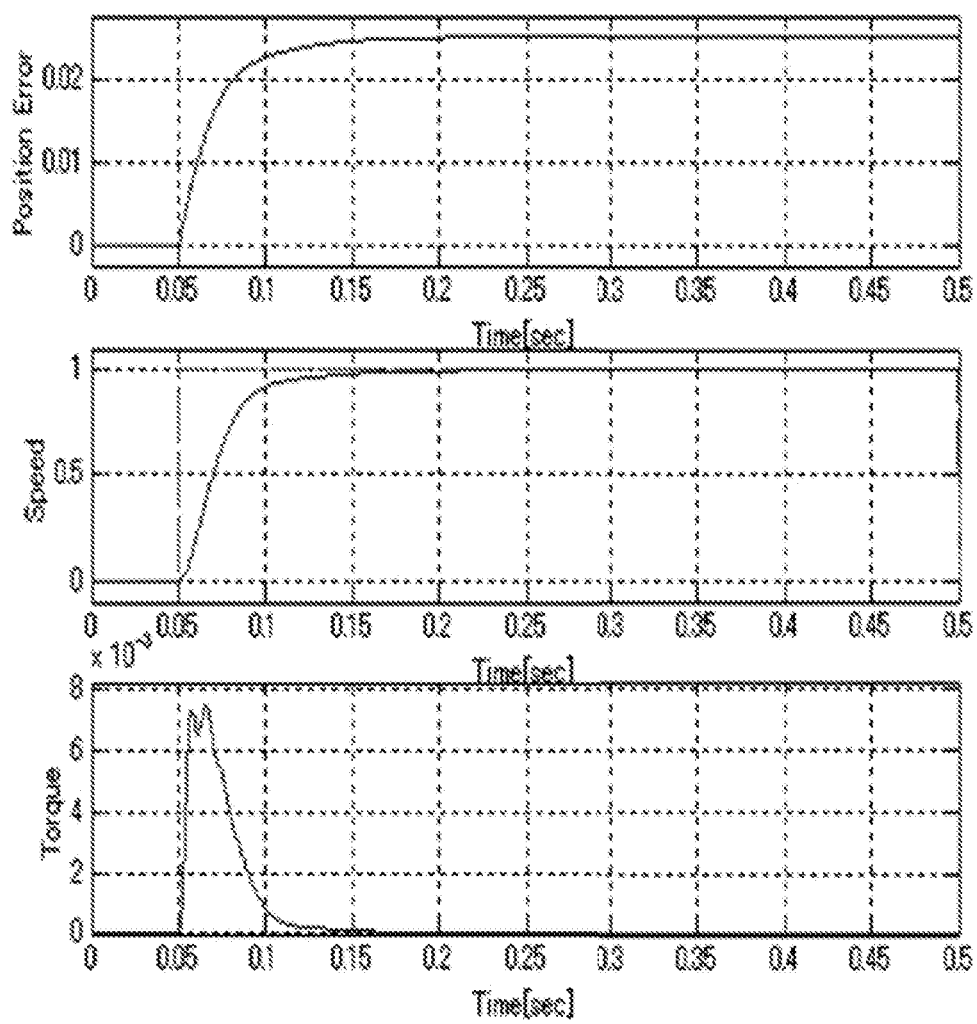
FIG. 26 shows graphs of a simulation using the four-inertia model according to the embodiment.
Figure 27:
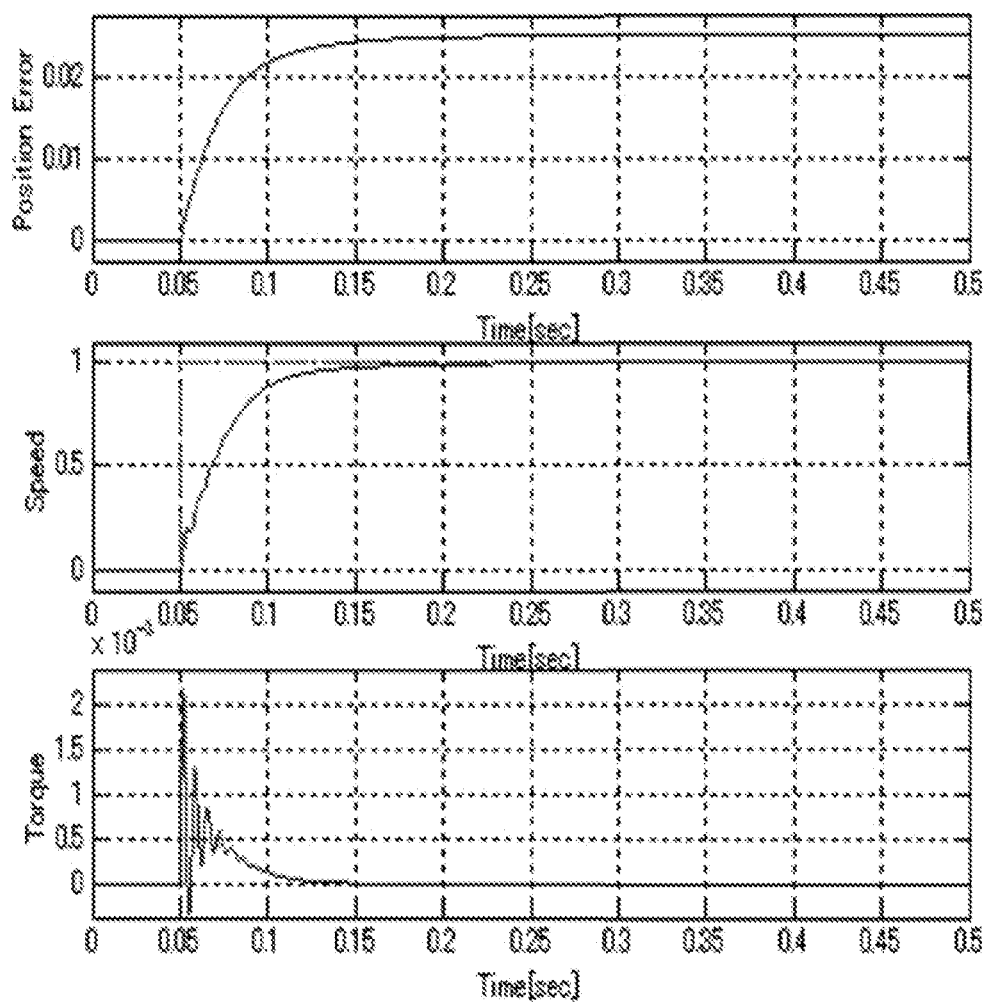
FIG. 27 shows graphs of a comparative simulation conducted at a moment-of-inertia ratio of 0.
Figure 28:
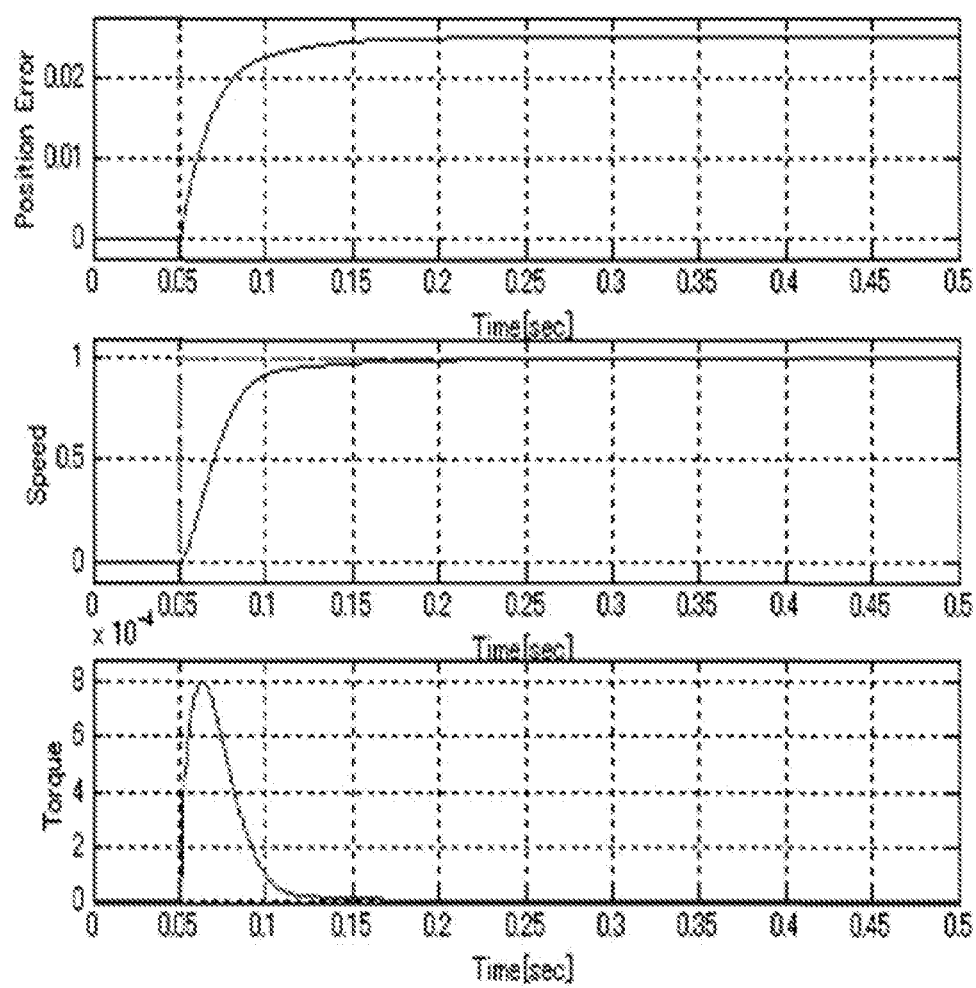
FIG. 28 shows graphs of a simulation conducted at a moment-of-inertia ratio of 0 according to the embodiment.
Figure 29:
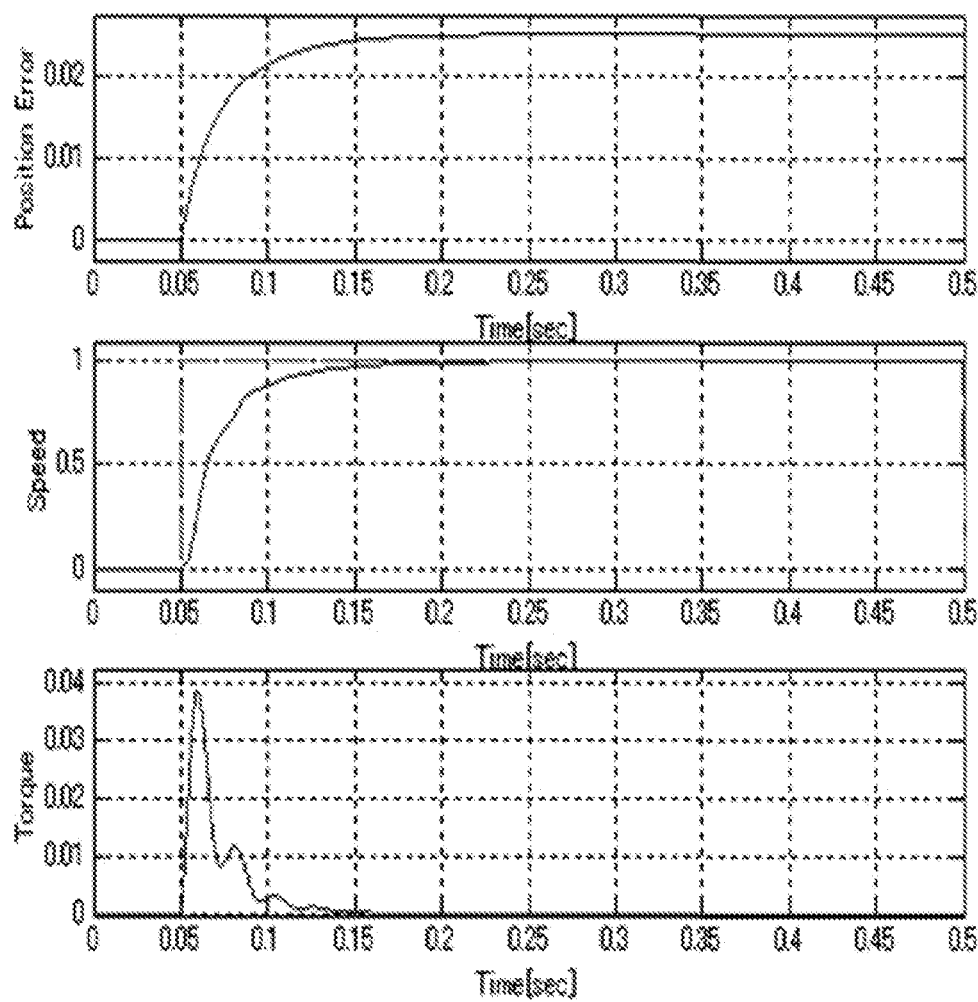
FIG. 29 shows graphs of a comparative simulation conducted at a moment-of-inertia ratio of 30.
Figure 35:
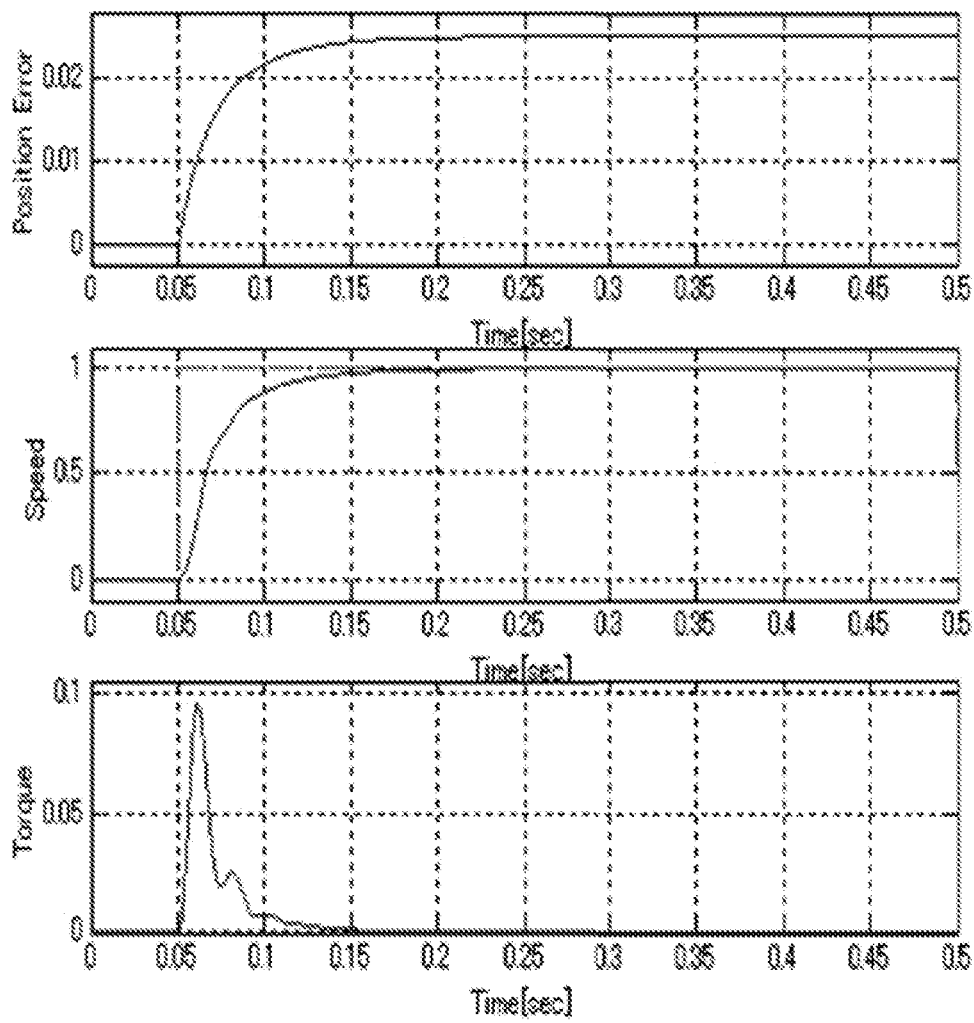
FIG. 35 shows graphs of a simulation using the two-inertia model according to the first modification.
Figure 36:
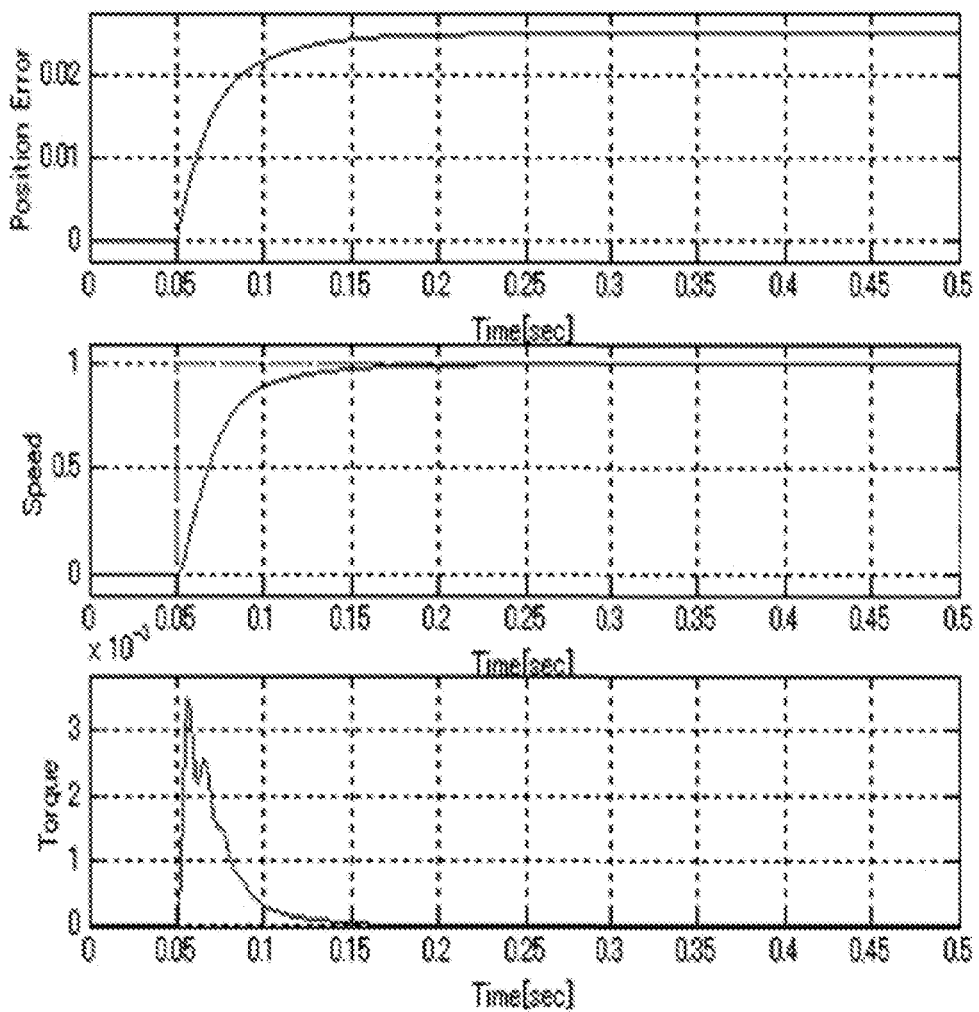
FIG. 36 shows graphs of a simulation using the three-inertia model according to the first modification.
Figure 37:
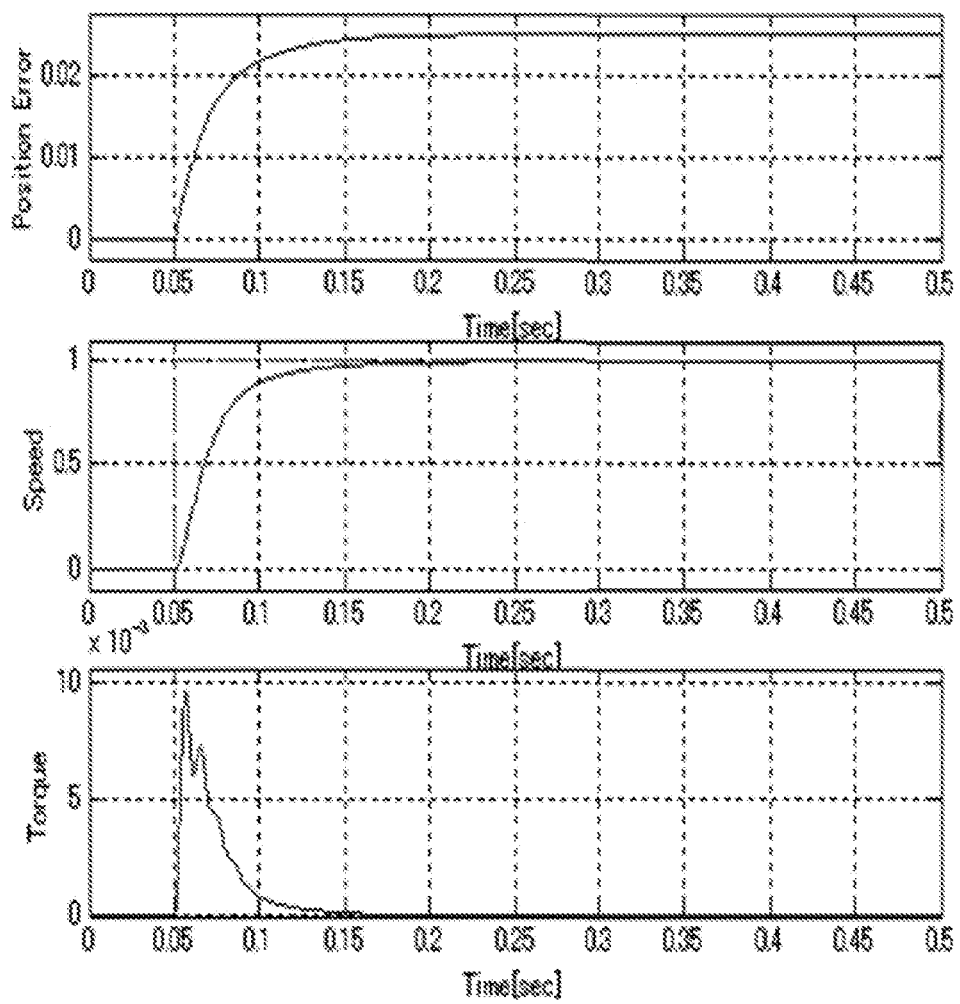
FIG. 37 shows graphs of a simulation using the four-inertia model according to the first modification.
Figure 38:
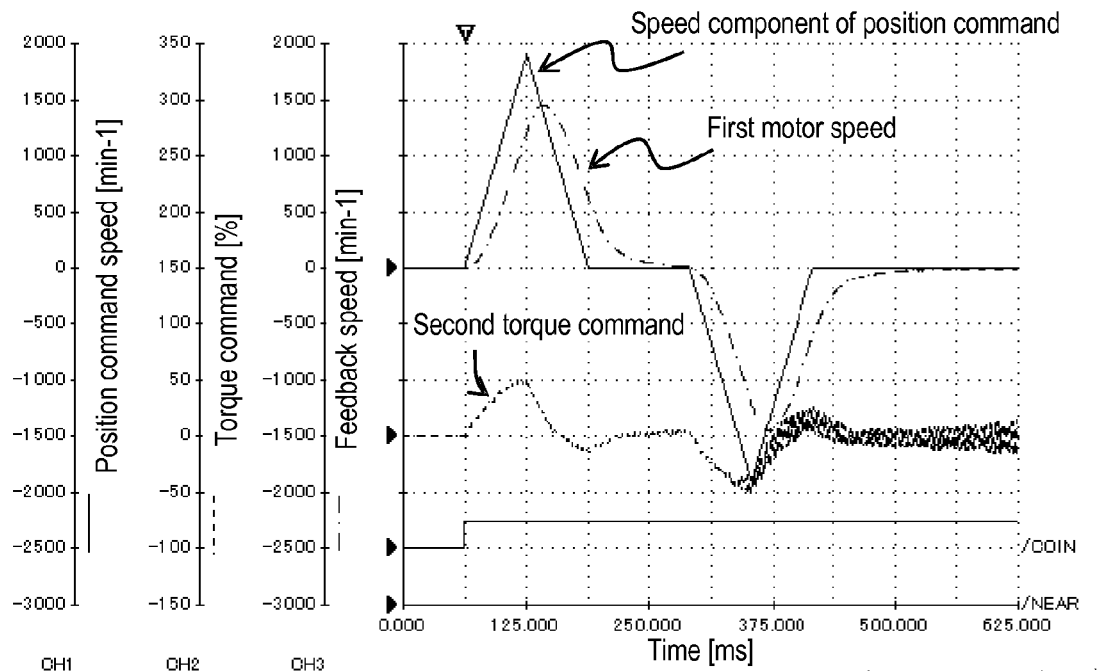
FIG. 38 shows graphs of a comparative simulation conducted at a moment-of-inertia ratio of 2.
Figure 39:
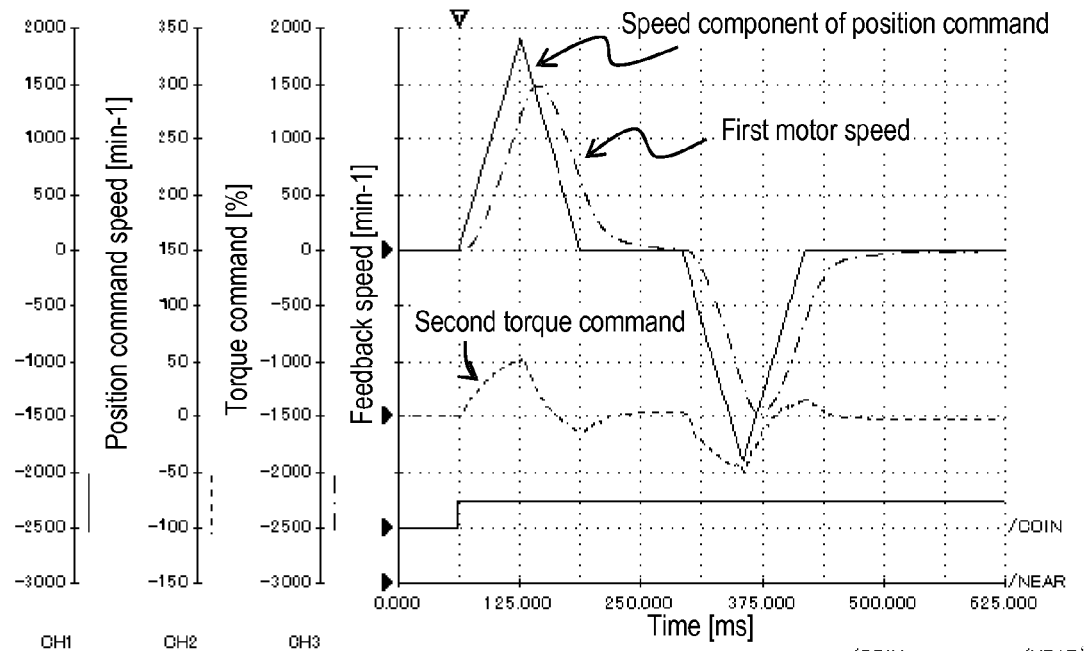
FIG. 39 shows graphs of a simulation conducted at a moment-of-inertia ratio of 2 according to the first modification.
Figure 40:
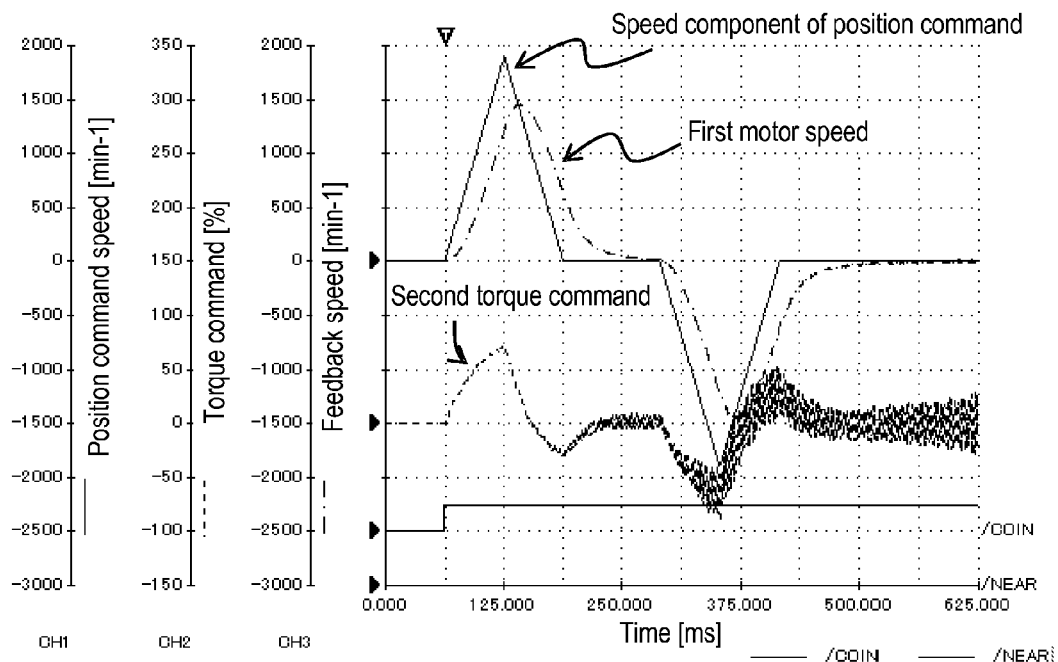
FIG. 40 shows graphs of a comparative simulation at 3.5 times the moment-of-inertia ratio.
Figure 41:
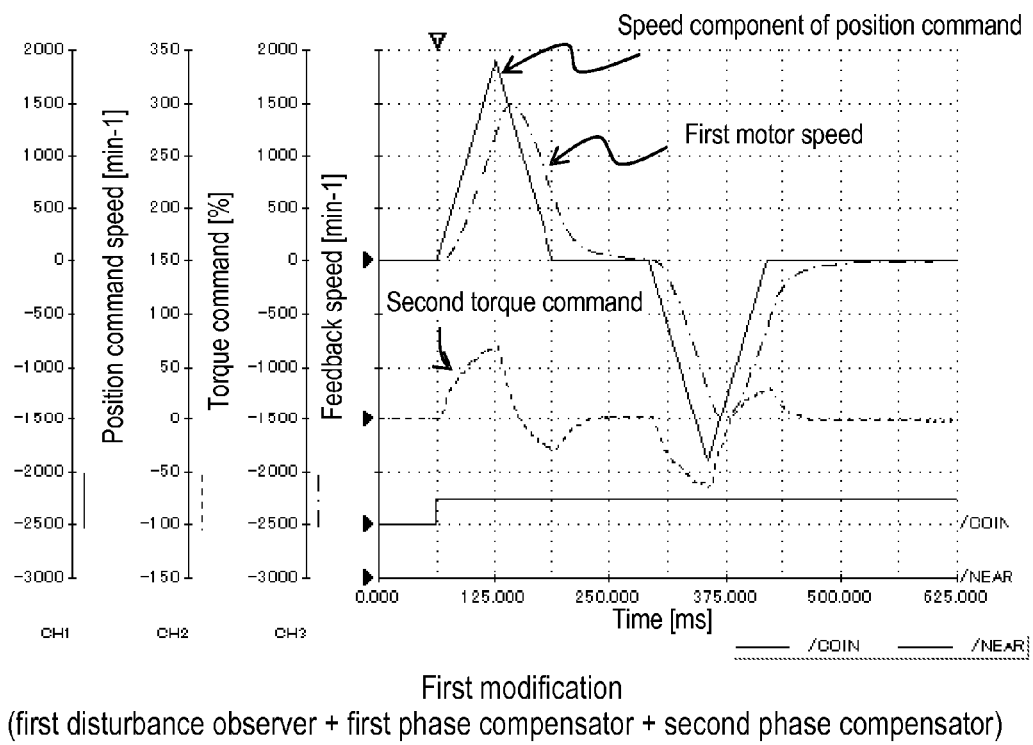
FIG. 41 shows graphs of a simulation at 3.5 times the moment-of-inertia ratio according to the first modification.
Figure 42:
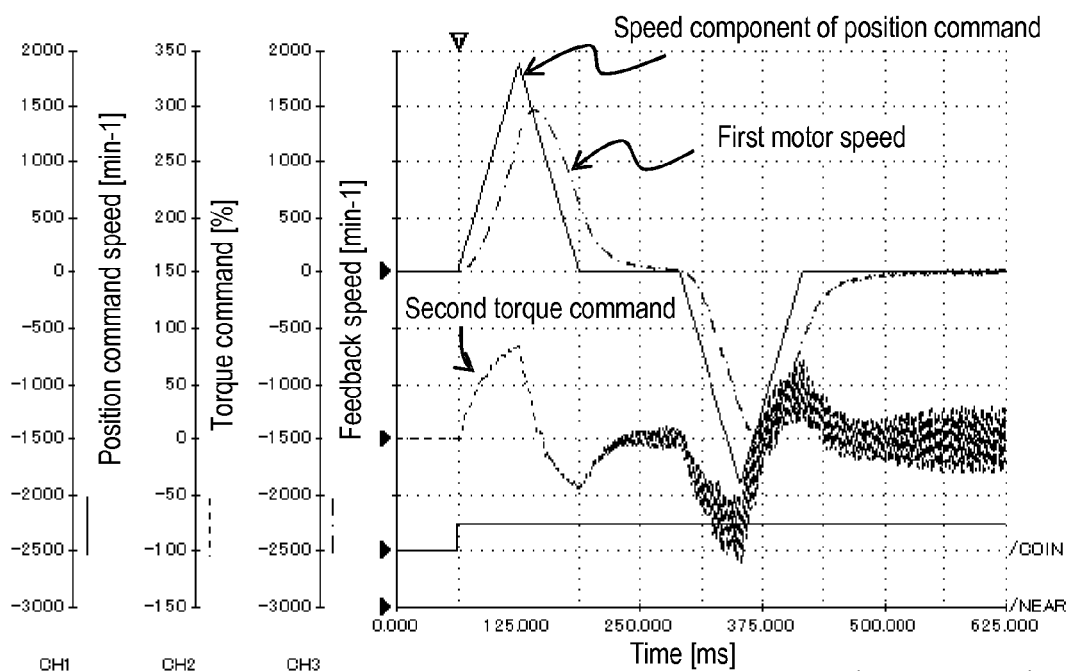
FIG. 42 shows graphs of a comparative simulation conducted at a moment-of-inertia ratio of 5.
Figure 43:
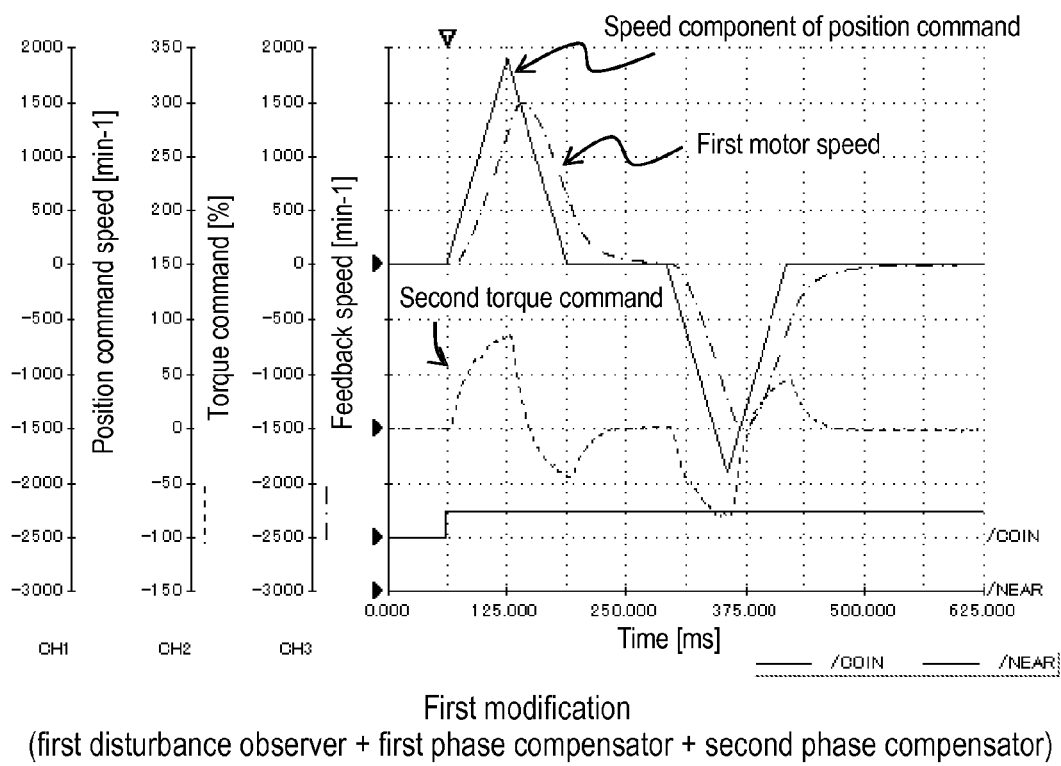
FIG. 43 shows graphs of a simulation conducted at a moment-of-inertia ratio of 5 according to the first modification.

FIGS. 35, 36, and 37 respectively correspond to FIGS. 22, 24, and 26 of the above-described embodiment. As seen from FIGS. 35, 36, and 37, the first modification exhibits a clear change inhibition effect compared with the comparative examples shown in FIGS. 21, 23, and 25. That is, the first modification improves robustness against mechanical resonance with respect to any inertia models.

FIGS. 38 to 43 show graphs of experimental tests conducted at different moment-of-inertia ratios, for comparison between the first modification and comparative examples. In order to implement a position determination operation, the position command is sequentially varied. FIGS. 38 to 43 indicate that in the comparative examples of FIGS. 38, 40, and 42, as the moment-of-inertia ratio becomes greater, the torque command is more likely to vibrate. Whereas, the first modification of FIGS. 39, 41, and 43 exhibits a change inhibition effect with respect to the torque command irrespective of the moment-of-inertia ratio, providing significantly high stability. Thus, the first modification provides high robustness against the moment-of-inertia ratio.

As has been described hereinbefore, the motor control apparatus 100A according to the first modification includes the second phase compensator 11 in the loop of the position control system. The second phase compensator 11 works as a phase advance filter to improve the phase margin of the position control system, which in turn improves the response characteristic of the inertia variation inhibitor 3. That is, robustness improves against the moment-of-inertia ratio of the drive mechanism 500.

In the above-described embodiment, the current loop model 41 is disposed in the first disturbance observer 31 to decrease the delay of the current loop relative to the torque command. This, however, should not be construed in a limiting sense. It is also possible to provide a phase compensation current observer, not shown, in the current controller to decrease the delay of the current loop, so as to improve the response characteristic of the inertia variation inhibitor 3.

(2) A Current Loop Inverse Model in the Disturbance Observer

Figure 44:
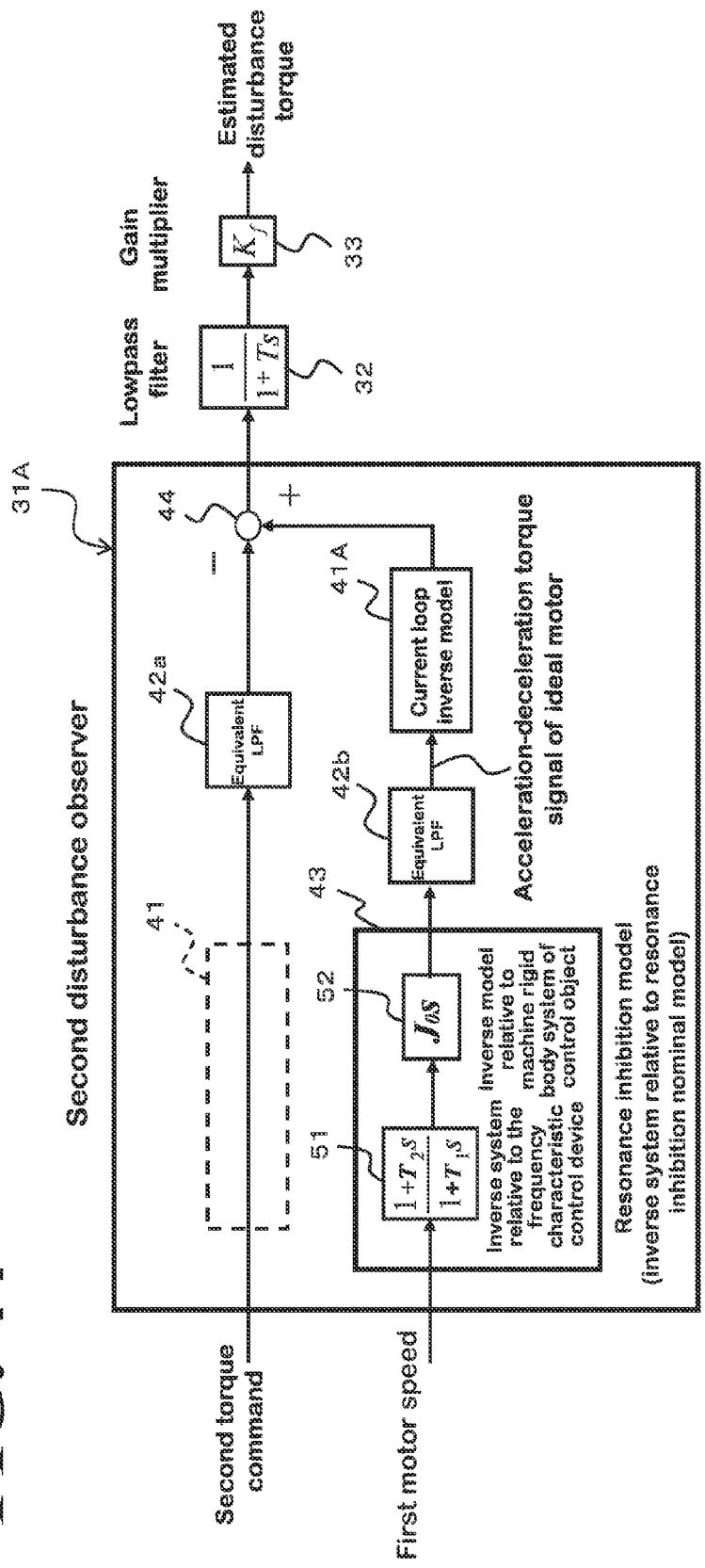
FIG. 44 is a detailed block diagram illustrating a second disturbance observer according to a second modification.

FIG. 44 shows a second disturbance observer 31A. The second disturbance observer 31A is different from the first disturbance observer 31 shown in FIG. 2 in that no current loop model 41 is provided (as indicated by the broken line). Instead, a current loop inverse model 41A is provided on the output side of the resonance inhibition model 43. The current loop inverse model 41A is an inverse system relative to the current loop model 41. If, for example, the denominator and the numerator of the transfer function are reversed, the operator s of the numerator has a higher order than the order of the denominator, making it impossible to implement the current loop inverse model 41A. To take this situation into consideration in actual installation, the lowpass filter 32 outside the second disturbance observer 31A and an additional lowpass filter 32, not shown, may be moved inside the second disturbance observer 31A and disposed along the respective two paths on the input side of the subtractor 44. One of the lowpass filters 32 may multiply the current loop inverse model 41A to reduce the order of the numerator of the transfer function of the inverse model. The current loop inverse model 41A advances the phase of the acceleration-deceleration torque signal of the ideal motor (the phase of the torque signal calculated from the motor speed) output from the resonance inhibition model 43. In this manner, the current loop inverse model 41A reduces the phase difference between the second torque command (a torque signal as a command) and the acceleration-deceleration torque signal of the ideal motor (the torque signal calculated from the motor speed) obtained by the resonance inhibition model 43. This ensures accurate estimation of the disturbance torque.

When a high response characteristic is necessary for the disturbance rejection control system, this necessitates adding a model of the current controller to the control object, which was disregarded in the design of the disturbance observer, as described above. This, however, is impractical in terms of software installment since the order of the disturbance observer significantly increases. Even if there are ample hardware resources enough to incorporate a model of the current controller into the design of the disturbance observer, the resulting disturbance observer has a narrow control band compared with the control band of a low-order disturbance observer. This can decrease robustness against changes in the inertia moment change, to the detriment of the attempt to improve robustness.

A solution is to improve the delay of the current controller. In view of this, the current loop model 41 according to the second modification has a function of phase advance compensation. An ideal current loop inverse model 41A relative to an actual current control system $P_i(s)$ is $P_i^{-1}(s)$. However, since the actual current control system $P_i(s)$ is complicated, a phase advance compensator as simple as $(1+T_4s)/(1+T_3s)$ is used. Since this is the case of advance compensation, the time constants satisfy: $T_3<T_4$. This decreases the delay of the actual current control system $P_i(s)$ and approximates the transfer function to its ideal form "1". Even when the transfer function of the current loop inverse model 41A of the disturbance observer approximates to "1 (×phase advance compensation)", the error with respect to the actual current control system $P_i(s)$ is small. This ensures a wide band design of the disturbance observer, and improves the robust performance of the disturbance rejection control system.

In this case, the loop transfer function $G_{Loop}$ corresponding to Equation (1) is:

$$G_{Loop}(s) = -K_f g(s)\left(1 - P_i(s)R(s)\frac{J_m}{(J_m+J_L)s}\frac{1+T_2s}{1+T_1s}J_m s P_i^{-1}(s)\right) \quad (5)$$

$$= -K_f g(s)\left(1 - R(s)\frac{1+T_2s}{1+T_1s}\frac{1+T_4s}{1+T_3s}\frac{J_m}{J_m+J_L}\right)$$

The closed loop transfer function $G_{Close}$ corresponding to Equation (2) is:

$$G_{Close}(s) = \frac{P_i(s)R(s)\frac{1}{(J_m+J_L)s}}{1-K_f g(s)\left(1-R(s)\frac{1+T_2s}{1+T_1s}\frac{1+T_4s}{1+T_3s}\frac{J_m}{J_L+J_m}\right)} \quad (6)$$

Figure 45:
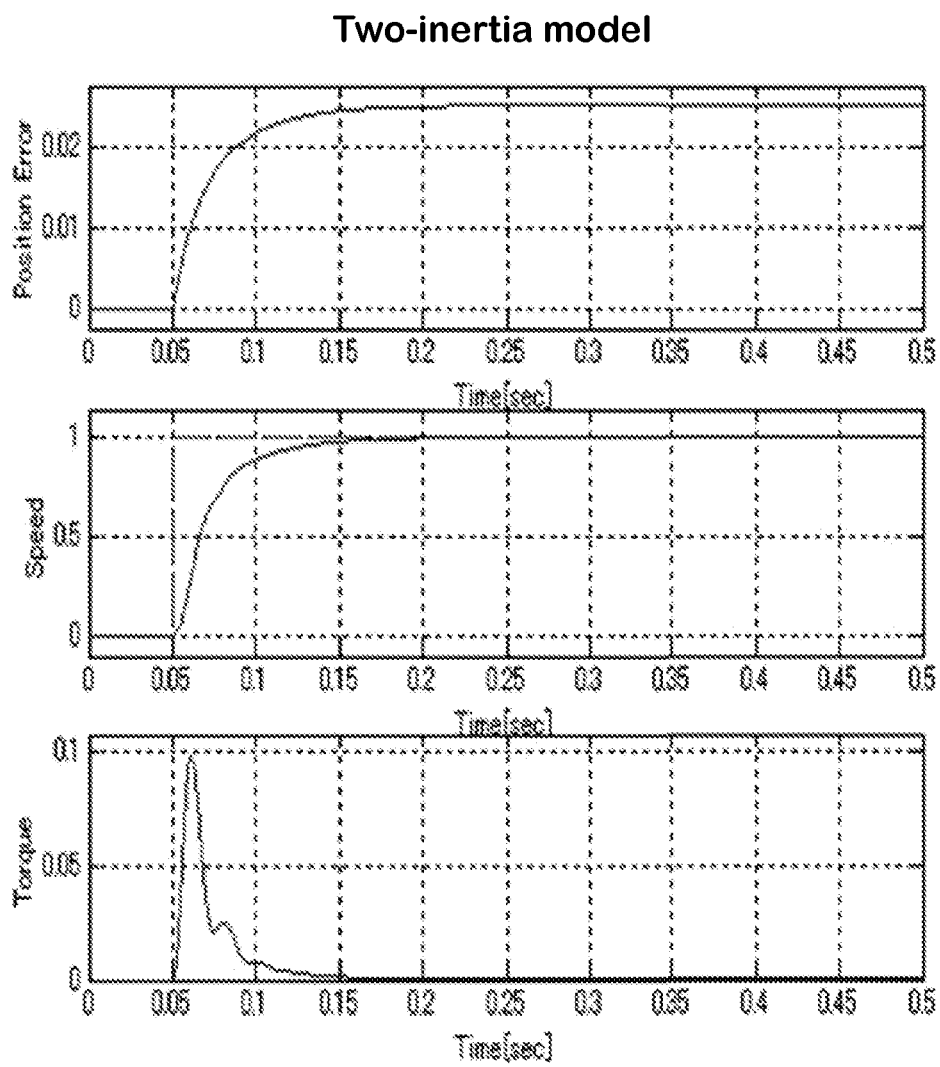
FIG. 45 shows graphs of a simulation using the two-inertia model according to the second modification.
Figure 46:
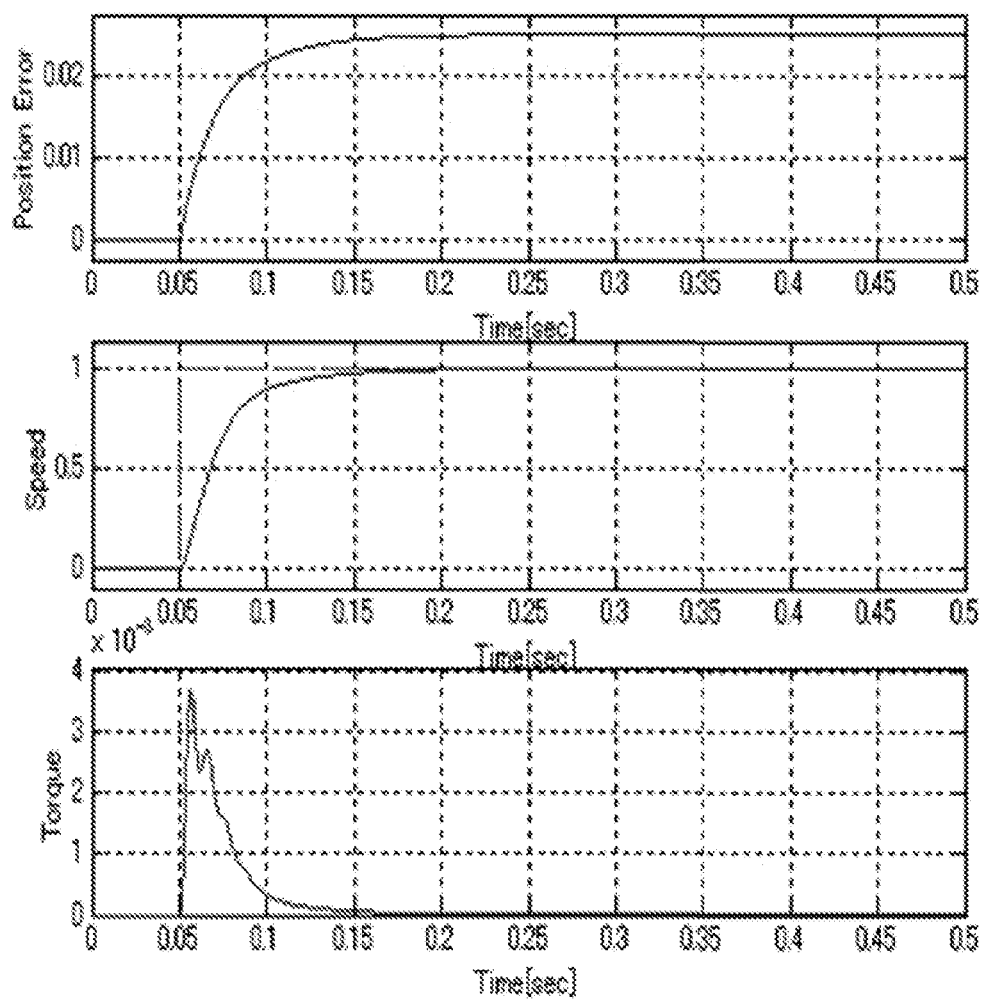
FIG. 46 shows graphs of a simulation using the three-inertia model according to the second modification.
Figure 47:
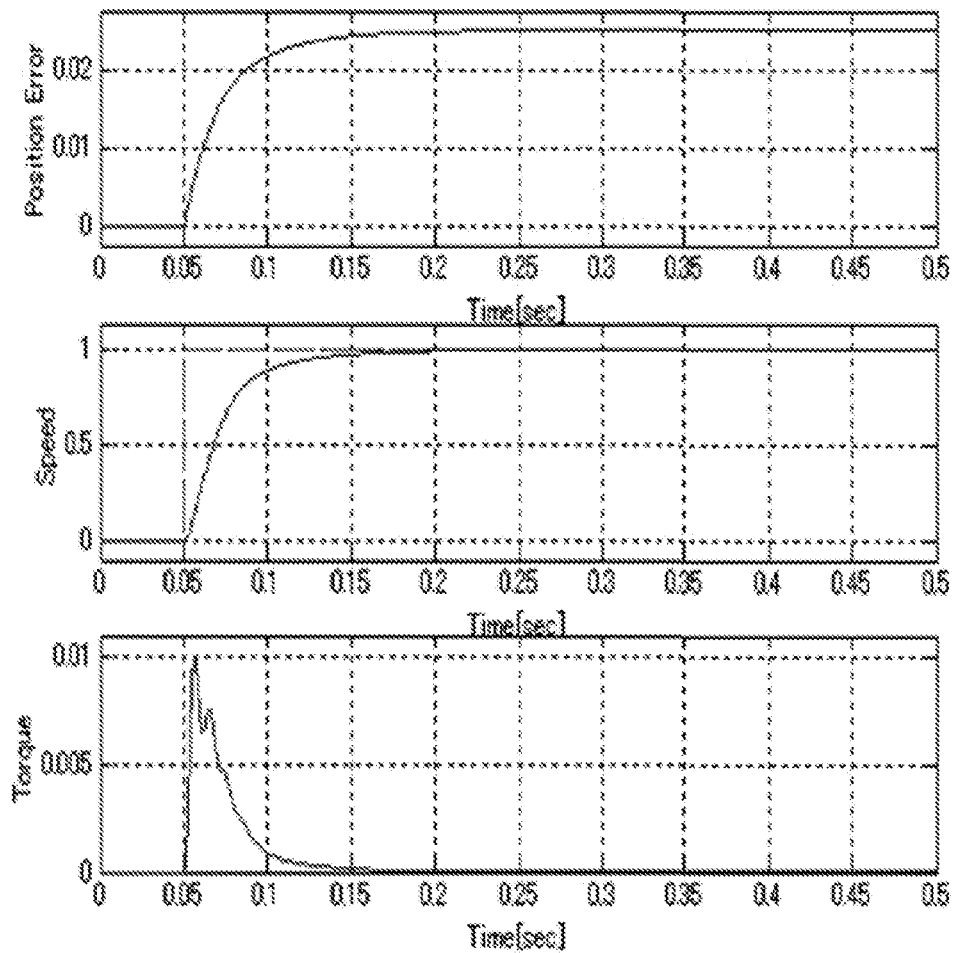
FIG. 47 shows graphs of a simulation using the four-inertia model according to the second modification.
Figure 48:
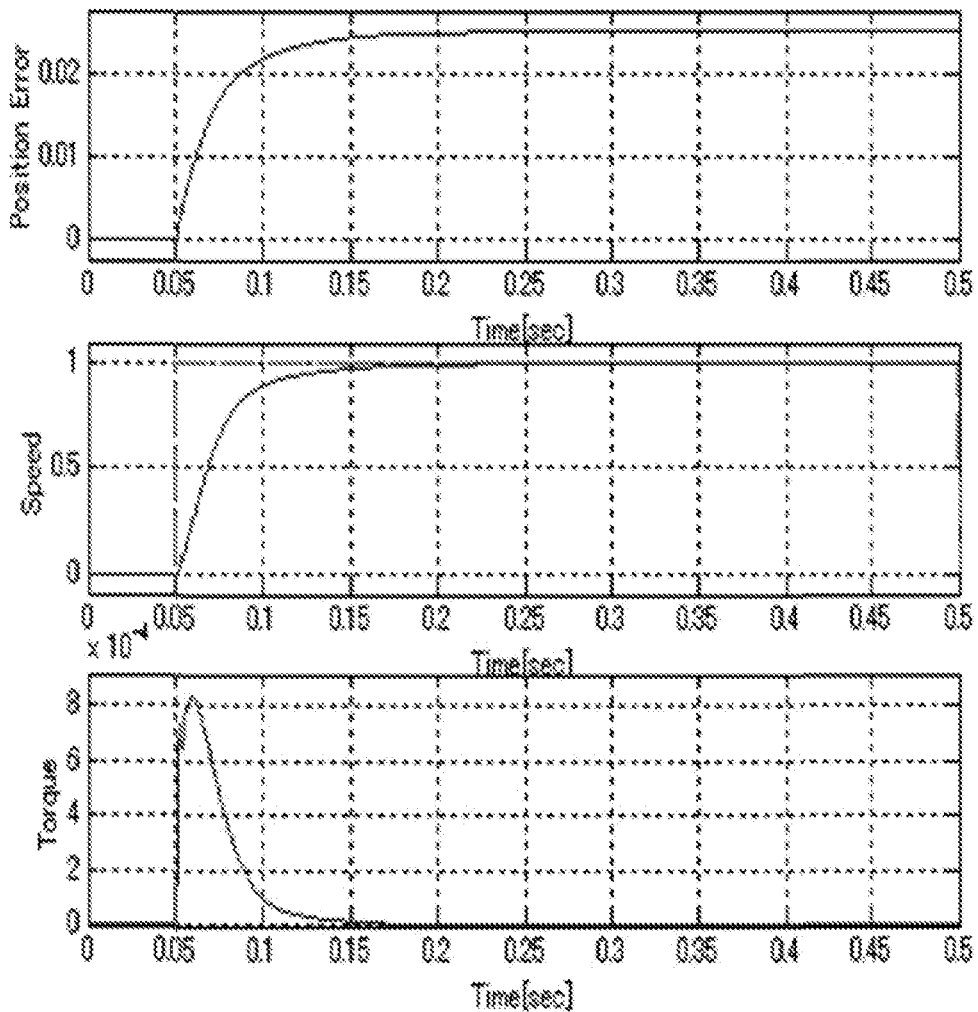
FIG. 48 shows graphs of a simulation conducted at a moment-of-inertia ratio of 0 according to the first modification.
Figure 49:
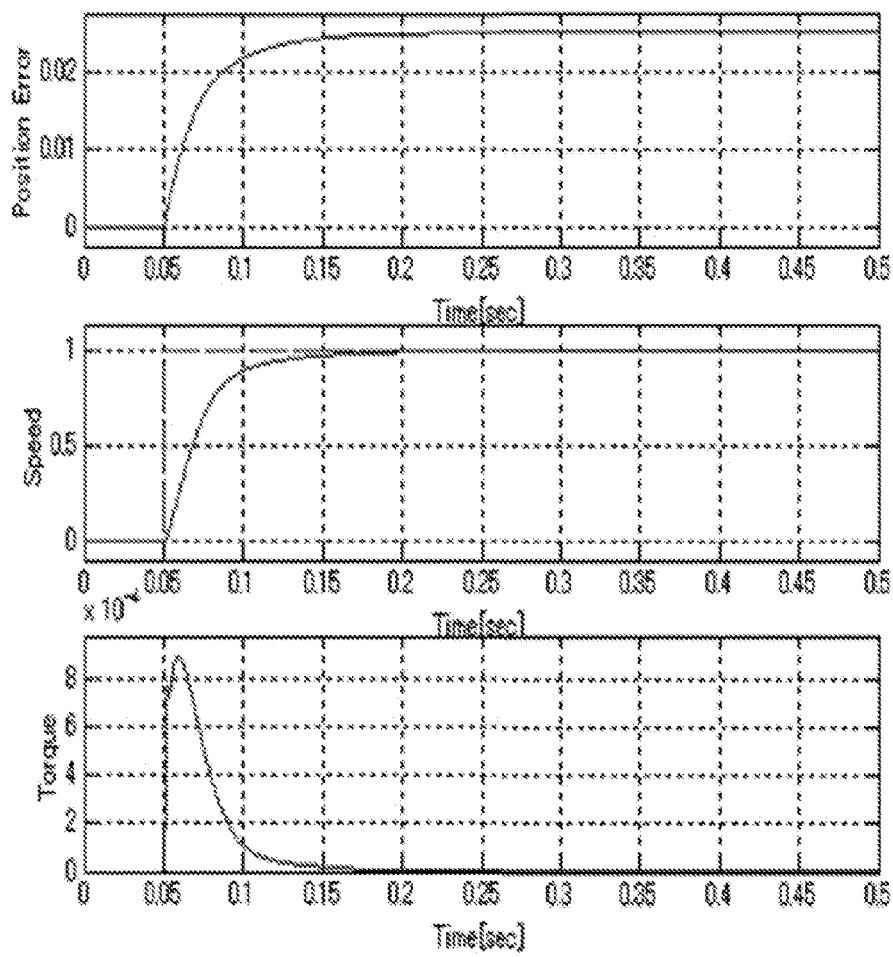
FIG. 49 shows graphs of a simulation conducted at a moment-of-inertia ratio of 0 according to the second modification.
Figure 50:
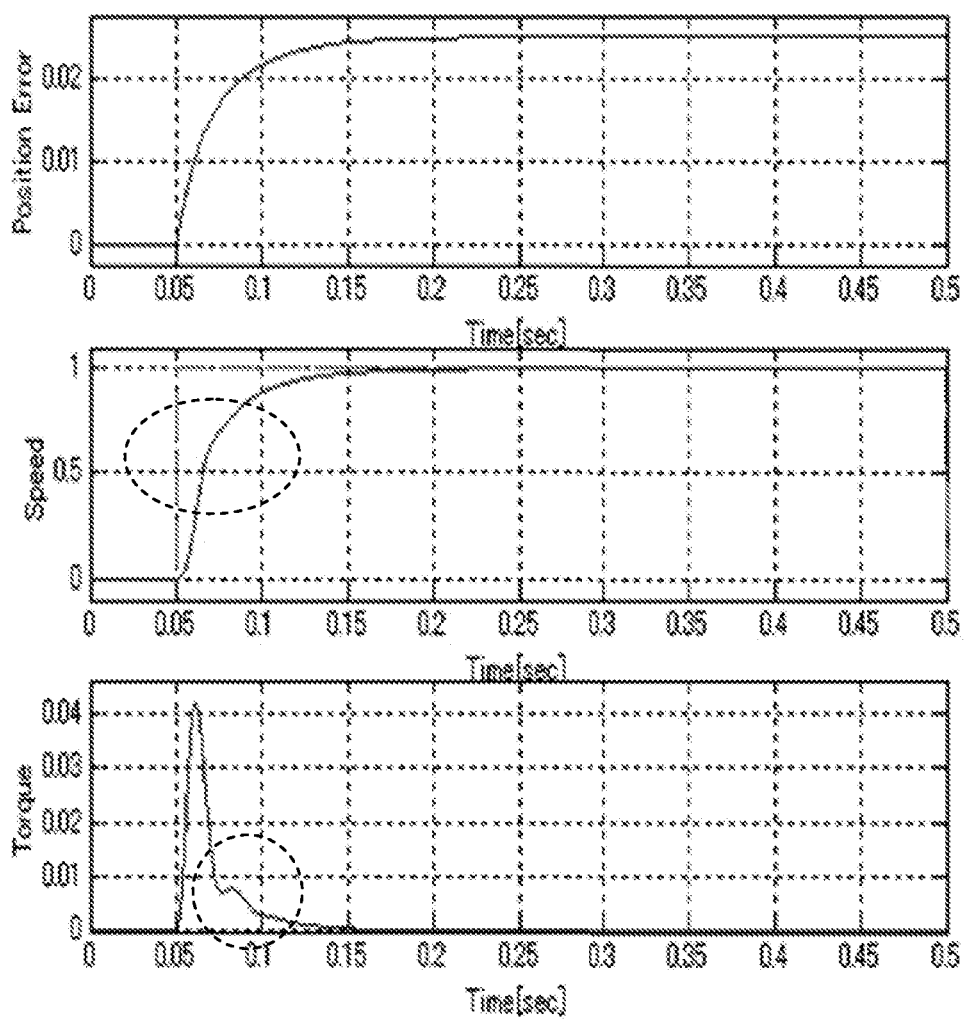
FIG. 50 shows graphs of a simulation conducted at a moment-of-inertia ratio of 30 according to the first modification.
Figure 51:
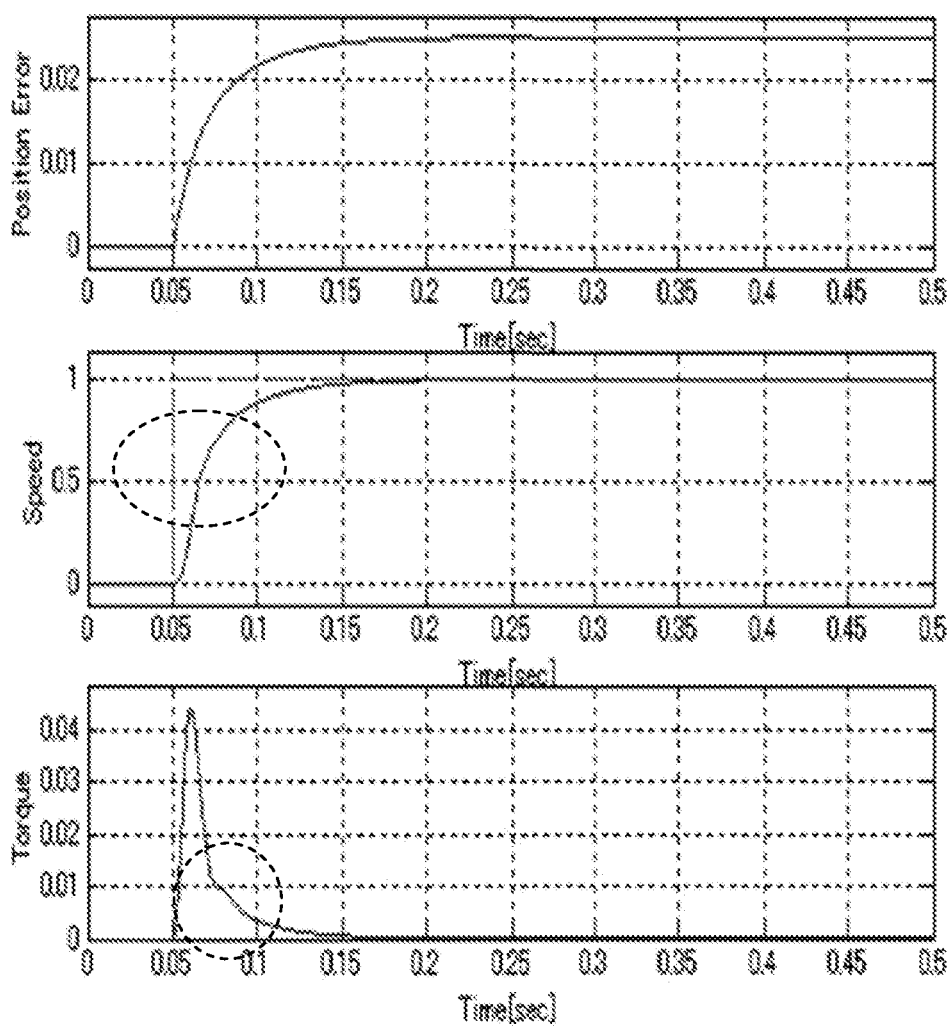
FIG. 51 shows graphs of a simulation conducted at a moment-of-inertia ratio of 30 according to the second modification.
Figure 52:
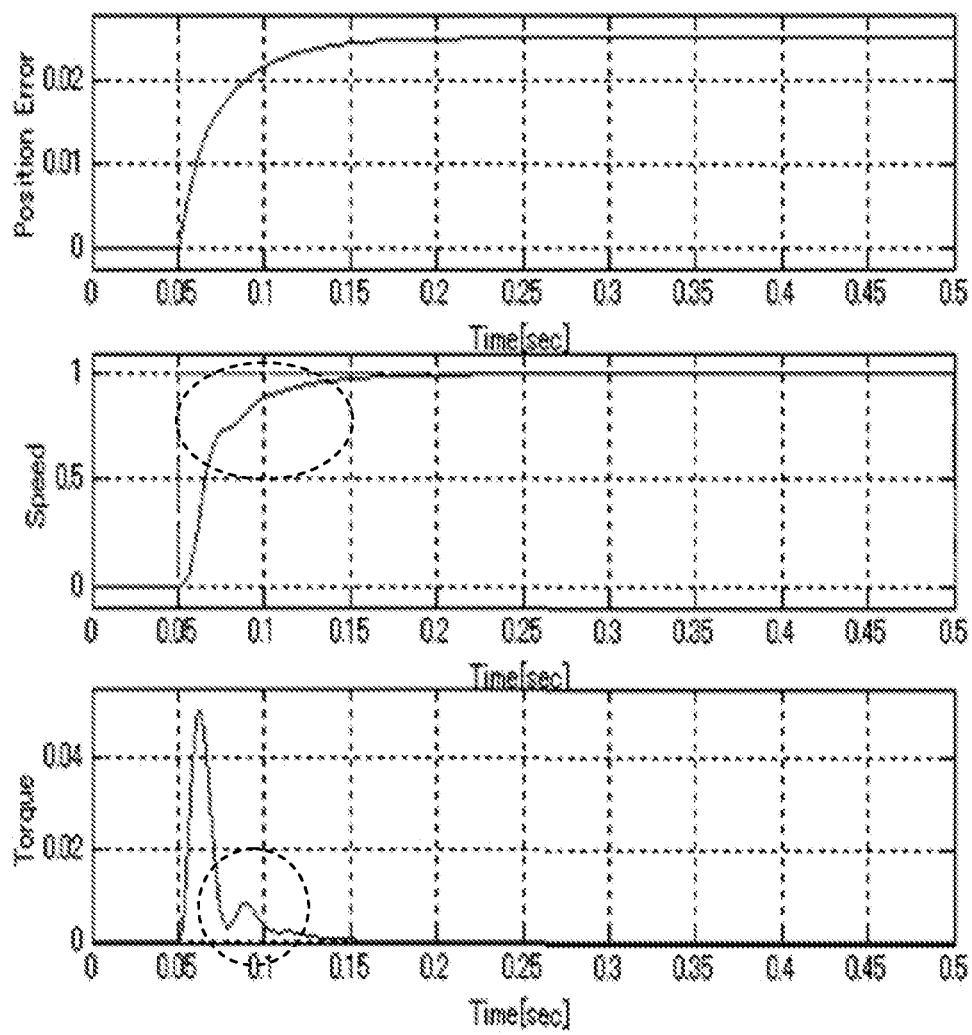
FIG. 52 shows graphs of a simulation conducted at a moment-of-inertia ratio of 35 according to the first modification.
Figure 53:
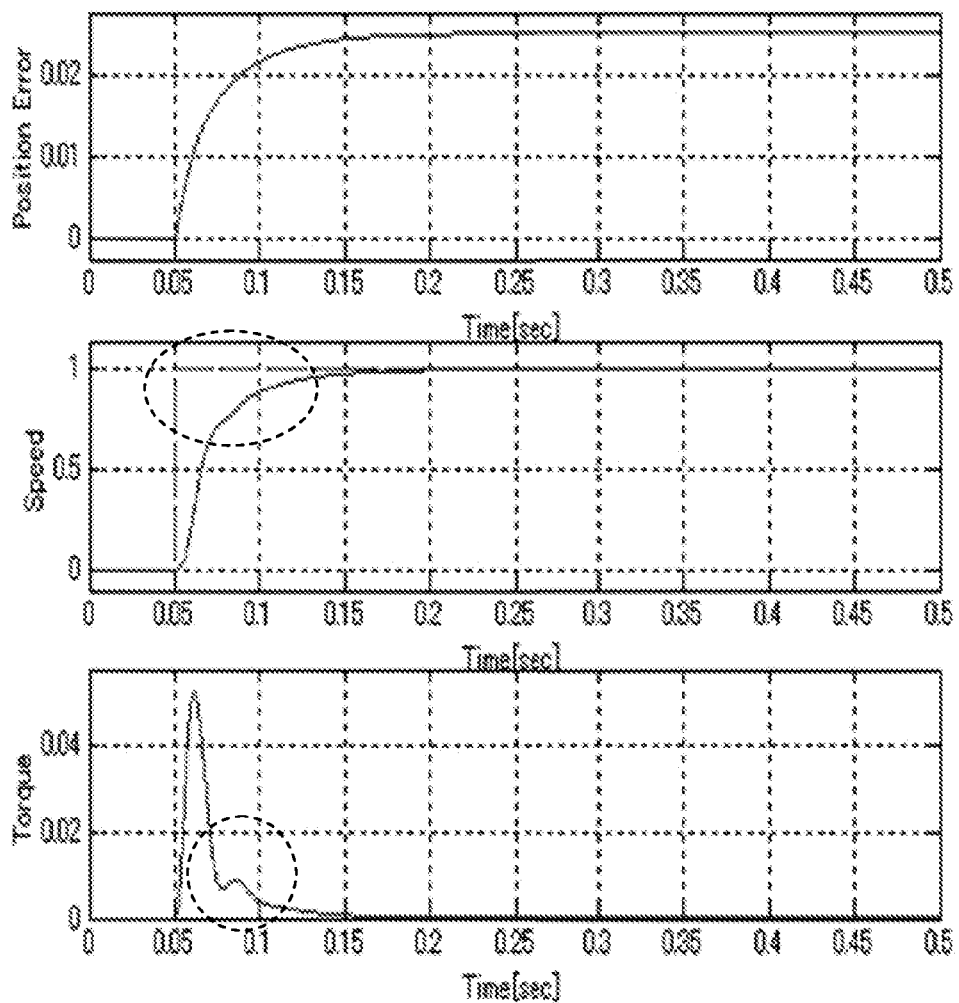
FIG. 53 shows graphs of a simulation conducted at a moment-of-inertia ratio of 35 according to the second modification.

FIGS. 45, 46, and 47 respectively correspond to FIGS. 22, 24, and 26 of the above-described embodiment. As seen from FIGS. 45, 46, and 47, the second modification exhibits a clear change inhibition effect compared with the comparative examples shown in FIGS. 21, 23, and 25. That is, the second modification improves robustness against mechanical resonance with respect to any inertia models. The second modification employs both the first phase compensator 7 and the second phase compensator 11, similarly to the first modification.

FIGS. 48 to 53 show graphs of simulations conducted at different moment-of-inertia ratios, for comparison between the first modification and the second modification. FIGS. 48 to 53 indicate that as the moment-of-inertia ratio becomes greater, FIGS. 49, 51, and 53 of the second modification is superior to FIGS. 48, 50, and 52 of the first modification in terms of the change inhibition effect with respect to the motor speed of the motor 200 and the torque command (particularly at the parts surrounded by broken lines).

As has been described hereinbefore, the motor control apparatus 100B according to the second modification employs the current loop inverse model 41A to carry out phase advance compensation. This decreases the delay of the actual current control system and approximates the transfer function to its ideal form. This ensures that even when the transfer function of the current loop of the second disturbance observer 31A approximates to "1", the error with respect to the actual current control system is small. This ensures a wide band design of the second disturbance observer 31A, and improves the response characteristic of the inertia variation inhibitor 3. That is, robustness further improves against the moment-of-inertia ratio of the drive mechanism 500.

While in the above-described embodiment and modifications the motor 200 is a rotation motor, this should not be construed in a limiting sense. It is also possible to employ a linear motor. The above description applies here, with the exception that the torque-related terminology is replaced with thrust, the inertia moment-related terminology is replaced with inertial mass, the rotary encoder is replaced with linear scale, the integration rotation position is replaced with integration motion position, and the rotor is replaced with mover.

Otherwise, the above-described embodiment and modifications may be combined in any manner deemed suitable.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A motor control apparatus comprising:
a position detector configured to detect a position of a motor configured to drive a drive mechanism;
a speed operator configured to acquire the position of the motor so as to calculate a first speed of the motor;
a position controller configured to acquire a difference between the position of the motor and a position command so as to generate and output a first speed command;
a speed controller configured to acquire a difference between the first speed command and a second speed of the motor so as to generate and output at least one of a first torque command and a first thrust command, the second speed of the motor comprising a phase advanced relative to a phase of the first speed of the motor;
a first phase compensator comprising a first lowpass filter used to advance the phase of the second speed of the motor relative to the phase of the first speed of the motor, the first phase compensator being configured to acquire the first speed and the at least one of the first torque command and the first thrust command so as to output the second speed of the motor, the first lowpass filter comprising a time constant calculated using a polynomial comprising a speed loop gain of the speed controller as an independent variable;
an inertia variation inhibitor comprising a disturbance observer comprising a resonance inhibition model configured to inhibit a mechanical resonance of the drive mechanism, the disturbance observer being configured to estimate at least one of a disturbance torque and a disturbance thrust, the inertia variation inhibitor being configured to acquire the first speed and at least one of a second torque command and a second thrust command, configured to add the disturbance torque to the first torque command so as to generate the second torque command or configured to add the disturbance thrust to the first thrust command so as to generate the second thrust command, and configured to output at least one of the second torque command and the second thrust command; and
at least one of a torque controller and a thrust controller, the torque controller being configured to acquire the second torque command so as to control a torque of the motor, the thrust controller being configured to acquire the second thrust command so as to control a thrust of the motor.

2. The motor control apparatus according to claim 1, wherein the resonance inhibition model of the disturbance observer comprises an inverse system relative to a resonance inhibition nominal model, the resonance inhibition nominal model comprising a frequency characteristic control device comprising a plurality of time constants determined based on a plurality of frequency set values, the plurality of frequency set values being used to change a change rate of a gain of a frequency characteristic of a rigid body nominal model.

3. The motor control apparatus according to claim 2, wherein the plurality of time constants of the frequency characteristic control device are set to control the resonance inhibition nominal model to maintain, in any frequency band, at least one of a gain margin and a phase margin on a frequency characteristic relative to a mechanical resonance characteristic of the motor and the drive mechanism.

4. The motor control apparatus according to claim 2,
wherein the resonance inhibition model of the disturbance observer comprises an inverse system relative to the frequency characteristic control device,
wherein the inertia variation inhibitor, the at least one of the torque controller and the thrust controller, the motor, and the drive mechanism together define a disturbance rejection control system loop comprising a loop transfer characteristic,
wherein the plurality of time constants of the frequency characteristic control device are set to control the loop transfer characteristic to comprise a phase of minus 180 degrees and a gain of less than 1 in a low-frequency band and to comprise a phase other than minus 180 degrees in a frequency domain of a high-frequency band providing a gain of equal to or greater than 1, and
wherein the resonance inhibition model of the disturbance observer is configured to acquire a value of the first speed of the motor through the inverse system relative to the frequency characteristic control device, configured to multiply the acquired value by at least one of an inertia moment and an inertial mass of the motor, and configured to differentiate a product obtained by the multiplication.

5. The motor control apparatus according to claim 1, wherein the disturbance observer is configured to subtract an acceleration-deceleration torque signal of an ideal motor from the second torque command and configured to output a difference obtained by the subtraction as the disturbance torque, or the disturbance observer is configured to subtract an acceleration-deceleration thrust signal of the ideal motor from the second thrust command and configured to output a difference obtained by the subtraction as the disturbance thrust, the acceleration-deceleration torque signal and the acceleration-deceleration thrust signal being calculated based on the first speed using the resonance inhibition model.

6. The motor control apparatus according to claim 1,
wherein the disturbance observer further comprises a current loop model simulating a current control loop of the at least one of the torque controller and the thrust controller, and
wherein the disturbance observer is configured to acquire a value of the second torque command through the current loop model, configured to subtract an acceleration-deceleration torque signal of an ideal motor from the acquired value, and configured to output a difference obtained by the subtraction as the disturbance torque, or the disturbance observer is configured to acquire a value of the second thrust command through the current loop model, configured to subtract an acceleration-deceleration thrust signal of the ideal motor from the acquired value, and configured to output a difference obtained by the subtraction as the disturbance thrust, the acceleration-deceleration torque signal and the acceleration-deceleration thrust signal being calculated based on the first speed using the resonance inhibition model.

7. The motor control apparatus according to claim 1,
wherein the disturbance observer further comprises a current loop inverse model comprising an inverse model relative to a current control loop of the at least one of the torque controller and the thrust controller, and
wherein the disturbance observer is configured to acquire a value of an acceleration-deceleration torque signal of an ideal motor through the current loop inverse model, configured to subtract the acquired value from the second torque command, and configured to output a difference obtained by the subtraction as the disturbance torque, or the disturbance observer is configured to acquire a value of an acceleration-deceleration thrust signal of the ideal motor through the current loop inverse model, configured to subtract the acquired value from the second thrust command, and configured to output a difference obtained by the subtraction as the disturbance thrust, the acceleration-deceleration torque signal and the acceleration-deceleration thrust signal being calculated based on the first speed using the resonance inhibition model.

8. The motor control apparatus according to claim 1, further comprising a second phase compensator comprising a second lowpass filter, the second lowpass filter comprising a cutoff frequency calculated using a polynomial comprising the speed loop gain of the speed controller as an independent variable, the second phase compensator being configured to acquire the first speed command so as to generate and output a second speed command comprising a phase that is advanced relative to a phase of the first speed command based on the second lowpass filter,
wherein the speed controller is configured to acquire, instead of the first speed command, a difference between the second speed command and the second speed of the motor, and configured to output at least one of the first torque command and the first thrust command.

9. The motor control apparatus according to claim 3,
wherein the resonance inhibition model of the disturbance observer comprises an inverse system relative to the frequency characteristic control device,
wherein the inertia variation inhibitor, the at least one of the torque controller and the thrust controller, the motor, and the drive mechanism together define a disturbance rejection control system loop comprising a loop transfer characteristic,
wherein the plurality of time constants of the frequency characteristic control device are set to control the loop transfer characteristic to comprise a phase of minus 180 degrees and a gain of less than 1 in a low-frequency band and to comprise a phase other than minus 180 degrees in a frequency domain of a high-frequency band providing a gain of equal to or greater than 1, and
wherein the resonance inhibition model of the disturbance observer is configured to acquire a value of the first speed of the motor through the inverse system relative to the frequency characteristic control device, configured to multiply the acquired value by at least one of an inertia moment and an inertial mass of the motor, and configured to differentiate a product obtained by the multiplication.

10. The motor control apparatus according to claim 2, wherein the disturbance observer is configured to subtract an acceleration-deceleration torque signal of an ideal motor from the second torque command and configured to output a difference obtained by the subtraction as the disturbance torque, or the disturbance observer is configured to subtract an acceleration-deceleration thrust signal of the ideal motor from the second thrust command and configured to output a difference obtained by the subtraction as the disturbance thrust, the acceleration-deceleration torque signal and the acceleration-deceleration thrust signal being calculated based on the first speed using the resonance inhibition model.

11. The motor control apparatus according to claim 3, wherein the disturbance observer is configured to subtract an acceleration-deceleration torque signal of an ideal motor from the second torque command and configured to output a difference obtained by the subtraction as the disturbance torque, or the disturbance observer is configured to subtract an acceleration-deceleration thrust signal of the ideal motor from the second thrust command and configured to output a difference obtained by the subtraction as the disturbance thrust, the acceleration-deceleration torque signal and the acceleration-deceleration thrust signal being calculated based on the first speed using the resonance inhibition model.

12. The motor control apparatus according to claim 4, wherein the disturbance observer is configured to subtract an acceleration-deceleration torque signal of an ideal motor from the second torque command and configured to output a difference obtained by the subtraction as the disturbance torque, or the disturbance observer is configured to subtract an acceleration-deceleration thrust signal of the ideal motor from the second thrust command and configured to output a difference obtained by the subtraction as the disturbance thrust, the acceleration-deceleration torque signal and the acceleration-deceleration thrust signal being calculated based on the first speed using the resonance inhibition model.

13. The motor control apparatus according to claim 9, wherein the disturbance observer is configured to subtract an acceleration-deceleration torque signal of an ideal motor from the second torque command and configured to output a difference obtained by the subtraction as the disturbance torque, or the disturbance observer is configured to subtract an acceleration-deceleration thrust signal of the ideal motor from the second thrust command and configured to output a difference obtained by the subtraction as the disturbance thrust, the acceleration-deceleration torque signal and the acceleration-deceleration thrust signal being calculated based on the first speed using the resonance inhibition model.

14. The motor control apparatus according to claim 2,
wherein the disturbance observer further comprises a current loop model simulating a current control loop of the at least one of the torque controller and the thrust controller, and
wherein the disturbance observer is configured to acquire a value of the second torque command through the current loop model, configured to subtract an acceleration-deceleration torque signal of an ideal motor from the acquired value, and configured to output a difference obtained by the subtraction as the disturbance torque, or the disturbance observer is configured to acquire a value of the second thrust command through the current loop model, configured to subtract an acceleration-deceleration thrust signal of the ideal motor from the acquired value, and configured to output a difference obtained by the subtraction as the disturbance thrust, the acceleration-deceleration torque signal and the acceleration-deceleration thrust signal being calculated based on the first speed using the resonance inhibition model.

15. The motor control apparatus according to claim 3,
wherein the disturbance observer further comprises a current loop model simulating a current control loop of the at least one of the torque controller and the thrust controller, and
wherein the disturbance observer is configured to acquire a value of the second torque command through the current loop model, configured to subtract an acceleration-deceleration torque signal of an ideal motor from the acquired value, and configured to output a difference obtained by the subtraction as the disturbance torque, or the disturbance observer is configured to acquire a value of the second thrust command through the current loop model, configured to subtract an acceleration-deceleration thrust signal of the ideal motor from the acquired value, and configured to output a difference obtained by the subtraction as the disturbance thrust, the acceleration-deceleration torque signal and the acceleration-deceleration thrust signal being calculated based on the first speed using the resonance inhibition model.

16. The motor control apparatus according to claim 4,
wherein the disturbance observer further comprises a current loop model simulating a current control loop of the at least one of the torque controller and the thrust controller, and
wherein the disturbance observer is configured to acquire a value of the second torque command through the current loop model, configured to subtract an acceleration-deceleration torque signal of an ideal motor from the acquired value, and configured to output a difference obtained by the subtraction as the disturbance torque, or the disturbance observer is configured to acquire a value of the second thrust command through the current loop model, configured to subtract an acceleration-deceleration thrust signal of the ideal motor from the acquired value, and configured to output a difference obtained by the subtraction as the disturbance thrust, the acceleration-deceleration torque signal and the acceleration-deceleration thrust signal being calculated based on the first speed using the resonance inhibition model.

17. The motor control apparatus according to claim 9,
wherein the disturbance observer further comprises a current loop model simulating a current control loop of the at least one of the torque controller and the thrust controller, and
wherein the disturbance observer is configured to acquire a value of the second torque command through the current loop model, configured to subtract an acceleration-deceleration torque signal of an ideal motor from the acquired value, and configured to output a difference obtained by the subtraction as the disturbance torque, or the disturbance observer is configured to acquire a value of the second thrust command through the current loop model, configured to subtract an acceleration-deceleration thrust signal of the ideal motor from the acquired value, and configured to output a difference obtained by the subtraction as the disturbance thrust, the acceleration-deceleration torque signal and the acceleration-deceleration thrust signal being calculated based on the first speed using the resonance inhibition model.

18. The motor control apparatus according to claim 5,
wherein the disturbance observer further comprises a current loop model simulating a current control loop of the at least one of the torque controller and the thrust controller, and
wherein the disturbance observer is configured to acquire a value of the second torque command through the current loop model, configured to subtract an acceleration-deceleration torque signal of an ideal motor from the acquired value, and configured to output a difference obtained by the subtraction as the disturbance torque, or the disturbance observer is configured to acquire a value of the second thrust command through the current loop model, configured to subtract an acceleration-deceleration thrust signal of the ideal motor from the acquired value, and configured to output a difference obtained by the subtraction as the disturbance thrust, the acceleration-deceleration torque signal and the acceleration-deceleration thrust signal being calculated based on the first speed using the resonance inhibition model.

19. The motor control apparatus according to claim 10,
wherein the disturbance observer further comprises a current loop model simulating a current control loop of the at least one of the torque controller and the thrust controller, and
wherein the disturbance observer is configured to acquire a value of the second torque command through the current loop model, configured to subtract an acceleration-deceleration torque signal of an ideal motor from the acquired value, and configured to output a difference obtained by the subtraction as the disturbance torque, or the disturbance observer is configured to acquire a value of the second thrust command through the current loop model, configured to subtract an acceleration-deceleration thrust signal of the ideal motor from the acquired value, and configured to output a difference obtained by the subtraction as the disturbance thrust, the acceleration-deceleration torque signal and the acceleration-deceleration thrust signal being calculated based on the first speed using the resonance inhibition model.

20. The motor control apparatus according to claim 11,
wherein the disturbance observer further comprises a current loop model simulating a current control loop of the at least one of the torque controller and the thrust controller, and
wherein the disturbance observer is configured to acquire a value of the second torque command through the current loop model, configured to subtract an acceleration-deceleration torque signal of an ideal motor from the acquired value, and configured to output a difference obtained by the subtraction as the disturbance torque, or the disturbance observer is configured to acquire a value of the second thrust command through the current loop model, configured to subtract an acceleration-deceleration thrust signal of the ideal motor from the acquired value, and configured to output a difference obtained by the subtraction as the disturbance thrust, the acceleration-deceleration torque signal and the acceleration-deceleration thrust signal being calculated based on the first speed using the resonance inhibition model.

\* \* \* \* \*